(12) United States Patent
Lui et al.

(10) Patent No.: US 10,389,592 B2
(45) Date of Patent: Aug. 20, 2019

(54) METHOD, SYSTEM AND PROGRAM PRODUCT FOR ALLOCATION AND/OR PRIORITIZATION OF ELECTRONIC RESOURCES

(71) Applicant: Knoa Software, Inc., New York, NY (US)

(72) Inventors: Philip Lui, New York, NY (US); David Rayna, Malverne, NY (US); Anthony Sypniewski, New York, NY (US)

(73) Assignee: Knoa Software, Inc., New York, NY (US)

( * ) Notice: Subject to any disclaimer, the term of this patent is extended or adjusted under 35 U.S.C. 154(b) by 216 days.

(21) Appl. No.: 15/636,299

(22) Filed: Jun. 28, 2017

(65) Prior Publication Data

US 2017/0302521 A1  Oct. 19, 2017

Related U.S. Application Data

(60) Division of application No. 14/981,316, filed on Dec. 28, 2015, now Pat. No. 9,705,817, which is a
(Continued)

(51) Int. Cl.
*G06F 15/16* (2006.01)
*H04L 12/24* (2006.01)
(Continued)

(52) U.S. Cl.
CPC ......... *H04L 41/0886* (2013.01); *G06F 9/505* (2013.01); *H04L 41/046* (2013.01);
(Continued)

(58) Field of Classification Search
CPC ........ G06F 9/505; H04L 41/147; H04L 67/10
(Continued)

(56) References Cited

U.S. PATENT DOCUMENTS 5,251,381 A  10/1993 Turner et al.
5,257,381 A  10/1993 Cook
(Continued)

FOREIGN PATENT DOCUMENTS

EP   1 270 725 A1   1/2003
JP   2006-319193 A  11/2006
(Continued)

OTHER PUBLICATIONS

Bearden et al., "User-Centric QoS Policies, or Saying What and How", dated May 12, 2000, XP002688001. Retrieved from the Internet: URL:http://www.beardens.net/mark/pubs/dsom00.pdf.
(Continued)

*Primary Examiner* — Bryan Lee
(74) *Attorney, Agent, or Firm* — Foley & Lardner LLP

(57) ABSTRACT

A method, system and program product, the method comprising determining a first rule set comprising a plurality of patterns of run-time data; obtaining a second rule set comprising a respective priority assigned to respective of the application context IDs and/or user IDs and/or business priorities or combinations of two or more thereof; receiving run-time data for a first plurality of the user IDs; determining application context IDs running on desktops; generating allocation data and/or prioritization data for allocation of electronic resources for user IDs, based at least in part on the second rule set; and sending signals, based on the allocation data and/or the prioritization data.

5 Claims, 25 Drawing Sheets

Related U.S. Application Data continuation of application No. 13/626,238, filed on Sep. 25, 2012, now Pat. No. 9,225,772.

(60) Provisional application No. 61/539,306, filed on Sep. 26, 2011, provisional application No. 61/646,779, filed on May 14, 2012.

(51) Int. Cl.
*H04L 29/08* (2006.01)
*G06F 9/50* (2006.01)
*H04L 12/911* (2013.01)
*H04L 12/26* (2006.01)

(52) U.S. Cl.
CPC ............ *H04L 41/147* (2013.01); *H04L 41/20* (2013.01); *H04L 41/22* (2013.01); *H04L 43/045* (2013.01); *H04L 43/065* (2013.01); *H04L 43/0817* (2013.01); *H04L 43/14* (2013.01); *H04L 47/70* (2013.01); *H04L 67/10* (2013.01)

(58) Field of Classification Search
USPC ........................................................ 709/226
See application file for complete search history.

(56) References Cited

U.S. PATENT DOCUMENTS

| | | | |
|---|---|---|---|
| 5,566,339 | A | 10/1996 | Perholtz et al. |
| 5,581,684 | A | 12/1996 | Dudzik et al. |
| 5,671,351 | A | 9/1997 | Wild et al. |
| 5,867,659 | A | 2/1999 | Otteson |
| 5,923,881 | A | 7/1999 | Fujii et al. |
| 5,964,839 | A | 10/1999 | Johnson et al. |
| 5,991,705 | A | 11/1999 | Klein et al. |
| 6,078,956 | A | 6/2000 | Bryant et al. |
| 6,099,317 | A | 8/2000 | Bullwinkel et al. |
| 6,108,700 | A | 8/2000 | Maccabee et al. |
| 6,189,047 | B1 | 2/2001 | Ball |
| 6,202,036 | B1 | 3/2001 | Klein et al. |
| 6,219,826 | B1 | 4/2001 | De Pauw et al. |
| 6,282,701 | B1 | 8/2001 | Wygodny et al. |
| 6,338,159 | B1 | 1/2002 | Alexander, III et al. |
| 6,340,977 | B1 | 1/2002 | Lui et al. |
| 6,714,976 | B1 | 3/2004 | Wilson et al. |
| 6,748,555 | B1 | 6/2004 | Teegan et al. |
| 6,769,117 | B2 | 7/2004 | Moore |
| 6,854,120 | B1 | 2/2005 | Lo et al. |
| 6,857,120 | B1 | 2/2005 | Arnold et al. |
| 7,047,498 | B2 | 5/2006 | Lui et al. |
| 7,250,297 | B1 | 7/2007 | Beste et al. |
| 7,275,098 | B1 | 9/2007 | Becher et al. |
| 7,585,940 | B2 | 9/2009 | Skerra et al. |
| 7,861,178 | B2 | 12/2010 | Lui et al. |
| 8,079,037 | B2 | 12/2011 | Lui et al. |
| 2002/0118220 | A1 | 8/2002 | Lui et al. |
| 2003/0095527 | A1 | 5/2003 | Shanbhag |
| 2004/0083453 | A1 | 4/2004 | Knight et al. |
| 2004/0109030 | A1 | 6/2004 | Farrington et al. |
| 2004/0199663 | A1 | 10/2004 | Horvitz et al. |
| 2005/0027860 | A1 | 2/2005 | Benson et al. |
| 2005/0071813 | A1 | 3/2005 | Reimer et al. |
| 2005/0132336 | A1 | 6/2005 | Gotwals et al. |
| 2005/0144150 | A1 | 6/2005 | Ramamurthy et al. |
| 2005/0147946 | A1 | 7/2005 | Ramamurthy et al. |
| 2005/0283765 | A1 | 12/2005 | Warren et al. |
| 2006/0184410 | A1 | 8/2006 | Ramamurthy et al. |
| 2007/0050719 | A1 | 3/2007 | Lui et al. |
| 2007/0083818 | A1 | 4/2007 | Drucker et al. |
| 2007/0224633 | A1 | 9/2007 | Skerra et al. |
| 2008/0016214 | A1 | 1/2008 | Galluzzo et al. |
| 2009/0089749 | A1 | 4/2009 | Day et al. |
| 2009/0282414 | A1 | 11/2009 | Branda et al. |
| 2010/0131957 | A1 | 5/2010 | Kami |
| 2012/0047509 | A1* | 2/2012 | Ben-Itzhak ............... G06F 9/50 718/103 |
| 2012/0166624 | A1 | 6/2012 | Suit |

FOREIGN PATENT DOCUMENTS

| | | |
|---|---|---|
| WO | WO-99/06873 A2 | 2/1999 |
| WO | WO-2005/008531 A2 | 1/2005 |
| WO | WO-2005/019256 A2 | 3/2005 |
| WO | WO-2006/056464 A2 | 6/2006 |
| WO | WO-2007/107563 A2 | 9/2007 |

OTHER PUBLICATIONS

Beste et al., "Small antibody-like proteins with prescribed ligand specificities derived from the lipocalin fold," Proc. Natl. Acad. Sci. USA, Mar. 2, 1999, 96(5):1898-1903.

Breustedt et al., "The 1.8-Å Cyrstal Structure of Human Tear Lipocalin Reveals and Extended Branched Cavity with Capacity for Multiple Ligands," J. Biol. Chem.., Jan. 7, 2005, 280(1):484-493.

Gasymov et al., "Site-Directed Tryptophan Fluorescence Reveals the Solution Structure of Tear Lipocalin: Evidence for Features That Confer Promiscuity in Ligand Binding,"Biochemistry, Dec. 11, 2001, 40(49):14754-14762.

http://www.vmware.com/pdf/virtualization.pdf, "Virtualization Overview." White Paper, (2006), VMware, Inc., 11 pages.

Http://www.vmware.com/support/pubs/sdk_pubs.html, "VMware API and SDK Documentation." (2012), VMware, Inc., 2 pages.

International Search Report dated Dec. 10, 2012 issued in connection with PCT/US2012/056994.

International Search Report issued in PCT/US2006/39998, dated Feb. 26, 2008.

Kaufman et al.; Blood 94; pp. 3178-3184; 1999.

Kazi et al., "JaViz: A client/server Java profiling tool," IBM Systems Journal, vol. 39, No. 1, Jan. 1, 2000, pp. 96-117.

Lazar et al., "Transforming Growth Factor α: Mutation of Aspartic Acid 47 and Leucine 48 Results in Different Biological Activities," Molecular and Cellular Biology, Mar. 1988, 8(3):1247-1252.

Murphy, A., "Virtualization Defined—Eight Different Ways." F5 White Paper, (2007), 3 pages.

Notice of Allowance issued in U.S. Appl. No. 11/248,981, dated Aug. 18, 2011.

Notice of Reasons for Refusal issued in Japan Application No. 2008-535693, dated Dec. 12, 2011, with translation.

Office Action from related Chinese Application No. 200680046515.9, along with an English translation, dated Jul. 4, 2012.

Office Action from related Chinese Application No. 200680046515.9, along with an English translation, dated Nov. 18, 2011.

Office Action issued in U.S. Appl. No. 11/248,981, dated Oct. 13, 2010.

Office Action issued in U.S. Appl. No. 11/248,981, dated Oct. 20, 2009.

Office Action issued in U.S. Appl. No. 11/248,981, dated Apr. 2, 2009.

Office Action issued in U.S. Appl. No. 11/248,981, dated Apr. 27, 2010.

Schlehuber et al., "Anticalins as an alternative to antibody technology," Expert Opinion on Biological Therapy, Jan. 1, 2005, 5(11):1453-1462.

Schlehuber et al., "Anticalins in drug development," Biodrugs, Jan. 1, 2005, 19(5):279-288.

Schlehuber et al., "Tuning ligand affinity, specificity, and folding stablity of an engineered lipocalin variant—a so-called 'anticalin'—using a molecular random approach," Biophysical Chemistry, May 2, 2002, 96(Feb. 2003):213-228.

Skerra, Arne, "'Anticalins': a new class of engineering ligand-binding proteins with antibody-like properties," Reviews in Molecular Biotechnology, Jun. 2001, 74(4):257-275.

Supplementary European search report and search opinion dated Jun. 8, 2010 in corresponding European Application No. 06825877.1.

(56) References Cited

OTHER PUBLICATIONS

U.S. Office Action dated Oct. 19, 2012 issued in connection with U.S. Appl. No. 13/299,032.
U.S. Notice of Allowance dated Sep. 24, 2015.
Wang et al., Nuc. Acids Res. vol. 27; pp. 4609-4618; 1999.
Wells, James A., "Additivity of Mutational Effects in Proteins," Biochemistry, Sep. 18, 1990, 29(37):8509-8517.
Wikipedia.org., "Port mirroring." Retrieved Sep. 18, 2012, 1 page.
Wikipedia.org., "Radix tree." Retrieved Sep. 18, 2012, 6 pages.
Written Opinion of the International Searching Authority dated Dec. 10, 2012 issued in connection with PCT/US2012/056994.

* cited by examiner

| START | IDENTIFY | PRIORITIZE | | USER ADMINISTRATION | LOGOUT | vSYNAPSE |
|---|---|---|---|---|---|---|
| UNDO | REDO | SEARCH ACTIVITES ▼ | 🔍 | ⚙ PROCESSES | 🗔 WINDOWS | 🌐 WEBS |

| EXPLORE | 4 ACTIVITES ASSIGNED 4 NAMETAGS | ★ 1 ACTIVITES STARRED | SORT COUNT DESC ▼ |
|---|---|---|---|
| WORKFLOW | 0 ACTIVITES ADDED TO 0 GROUPS | | |

| | ACTIVITES | OPEN SEQUENCES | COUNT | |
|---|---|---|---|---|
| ☆ | *INTRANET/FDB/ ☆ | ⌫ ADD NAME TAG | 24 | ⌄ |
| ☆ | *INTRANET/QA/TEST ☆ | ⌫ ADD NAME TAG | 10 | ⌄ |
| ☆ | *INTRANET/PROJECTS/ ☆ | ⌫ ADD NAME TAG | 8 | ⌄ |
| ☆ | *INTRANET/PRODUCTMG/ | ⌫ ADD NAME TAG | 3 | ⌄ |
| ☆ | *INTRANET/MARKETING/ | ⌫ ADD NAME TAG | 3 | ⌄ |
| ☆ | *INTRANET/QA/COMPUTERS.ASP | ⌫ ADD NAME TAG ⊙ COUNT  PRIORITY  AVG DURATION TOT.DURATION<br>2  ADD TO GROUP LOW (INHERITED) ▼  00:00:07  00:00:14 | 1 | ⌄ |
| ☆ | *INTRANET/PARTNERS | ⌫ ADD NAME TAG | 1 | ⌄ |
| ☆ | *INTRANET/LOGIN/DEFAULT.ASP? | ⌫ ADD NAME TAG | 1 | ⌄ |
| ☆ | *INTRANET/HOME/DEFAULT.ASP | ⌫ ADD NAME TAG | 1 | ⌄ |
| ☆ | *INTRANET/CORPORATE/ | ⌫ ADD NAME TAG | 1 | ⌄ |

FIG.13

FIGURE USABILITY METRIC:
"RESPONSE TIME INDICATOR"

DSL PROJECTIONS

STEP ORDER VARIATION 1

STEP ORDER VARIATION 2

STEP KIND VARIATION

TASK MODEL

EMISSION PROBABILITIES EXAMPLE 1

EMISSION PROBABILITIES EXAMPLE 2

METHOD, SYSTEM AND PROGRAM PRODUCT FOR ALLOCATION AND/OR PRIORITIZATION OF ELECTRONIC RESOURCES

CROSS-REFERENCE TO RELATED PATENT APPLICATIONS

This application is a Divisional of U.S. application Ser. No. 14/981,316, filed Dec. 28, 2015, which is a Continuation of U.S. application Ser. No. 13/626,238, filed Sep. 25, 2012, which claims priority from Provisional U.S. Application 61/539,306, filed Sep. 26, 2011, and from Provisional U.S. Application 61/646,779, filed May 14, 2012. All of the aforesaid applications are incorporated herein by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

This invention relates to systems and methods for monitoring a user's interaction with a computer application, and more particularly to monitoring and analyzing the user/application interaction during a session along with the application's performance and behavior as it affects the User, and transforming detected events on one or more levels of processing and then directly or indirectly controlling resources in an infrastructure.

U.S. application Ser. No. 11/248,981 filed Oct. 11, 2005, is hereby incorporated by reference in its entirety for all purposes.

BACKGROUND OF THE INVENTION

Statement of the Problem

The allocation of electronic resources within systems and networks is coarse, static, and results in the over provisioning of precious computer resources. This leads to significant problems when electronic resources are limited.

SUMMARY

A method, system and program product is disclosed. In embodiments, the method comprises: determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications; obtaining or receiving, by the one or more computers, a second rule set comprising a respective priority assigned to respective of the application context IDs and/or user IDs and/or business priorities or combinations of two or more thereof; receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer; determining, by the one or more computers, respective application context IDs for respective applications and/or respective locations within applications running on the respective user IDs of a second plurality of the user IDs, based at least in part on the first rule set; generating allocation data and/or prioritization data by the one or more computers, for a respective allocation of electronic resources for the first plurality of the respective user IDs, based at least in part on the second rule set; and sending signals, by one or more computers, based at least in part on the allocation data and/or the prioritization data.

In embodiments, the first rule set and the second rule set are comprised in a single comprehensive rule set and the determining or obtaining or receiving a first rule set step and the obtaining or receiving a second rule set step comprise a single step, and the determining respective application context IDs step and the generating allocation data and/or prioritization data step may be performed in a single step.

In embodiments, operations may be performed of obtaining a level of the electronic resources currently provided by respective network infrastructure components to a third plurality of the user IDs; obtaining a level of the electronic resources currently being used directly or indirectly by the third plurality of the user IDs; determining, by the one or more computers, difference data based at least in part on a difference between the electronic resources currently available and the electronic resources currently being used; and providing or making accessible, by the one or more computers, this difference data.

In embodiments, an operation may be performed of sending signals to automatically distribute dynamically a respective level of one or more of the electronic resources to facilitate user application combinations, with a respective one of the user application combinations comprising a respective application context ID and a respective user ID.

In embodiments, an operation may be performed of sending signals, by the one or more computers, to a graphical user interface of an administrator display screen, based at least in part on the allocation data, to facilitate decision-making and/or feedback on a dynamic distribution of the electronic resources to facilitate the user ID application and/or task to each of a respective third plurality of the user IDs.

In embodiments, the run-time data comprises a detected user action and system state change in response to the detected user action for a third plurality of the user IDs; an operation may be performed of operations may be performed of calculating, by the one or more computers, response time data for each of the third plurality of the respective user IDs, the response time data for a respective one of the user IDs based at least in part on the detected user action and system state change in response to the detected user action for the respective user ID; determining, by the one or more computers, current application response data for each of the third plurality of the user IDs, wherein the current application response data for a respective one of the third plurality of the user IDs comprises performing a calculation on the application response data for all applications used by the respective user ID or for all detected user actions within an application, over a period of time; and comparing, by the one or more computers, the application response data for a respective one of the third plurality of the user IDs to prior application response data for the respective one of the third plurality of the user IDs.

In embodiments, the signals are sent or made available on the allocation data when selected changes in application response data occur.

In embodiments, the second rule set comprises a set of relative priorities for respective of the user IDs based on one or more selected from the group of user role, department, function, geography, and which market served, associated with the respective user ID.

In embodiments, the second rule set comprises a set of respective applications that are to receive a higher relative priority compared to other of the applications.

In embodiments, the second rule set comprises a set of relative priorities for user application combinations, with a respective one of the user application combinations comprising a respective application context ID and a respective one of the user IDs, so that selected applications performed by respective of the user ID's are provided priority for the electronic resources relative to other of the user IDs.

In embodiments, the second rule set comprises a set of relative priorities for respective of the user IDs based on a specific task to be carried out by selected ones of the user IDs in a given time frame.

In embodiments, the run-time data is normalized from the run-time instantiations of objects occurring on the monitored computer for the respective user ID, with the objects comprising one or more selected from the group of methods, object events, dynamic GUI objects, wherein the object events and dynamic GUI objects comprise at least one selected from the group of operating system events, application events, and web browser events generated or affecting directly or indirectly the respective monitored computer and network events.

In embodiments, an agent associated with one of the monitored computers, comprising a set of programming code stored on a computer-readable medium, configured for executing by the one or more computers, at run-time, performs the step of normalizing the run-time data associated with the respective monitored computer.

In embodiments, an agent, comprising a set of programming code stored on a computer-readable medium, configured for executing by the one or more computers, at run-time, wherein the agent performs the steps: monitoring, by the one or more computers, a monitored computer of a respective one of the monitored computers to obtain the run-time data; detecting, by the one or more computers, whether a pattern in the run-time data corresponds to a rule in the first rule set that designates a respective one of the application context IDs; and determining, by the one or more computers, whether a rule in the second rule set applies based at least in part on respective application context ID.

In embodiments, the agent further performs the step of generating and sending, by the one or more computers, actuation requests to change priorities and/or levels of the electronic resources provided or providable to or associated with the monitored computer which one or more electronic resources are locally controllable by the agent.

In embodiments, the agent further performs the step generating and sending, by the one or more computers and one or more electronic networks, actuation requests to change priorities and/or levels of the electronic resources provided or providable to monitored computer, to an actuation manager program running on one of the one or more other of the computers, which actuation manager program oversees control of electronic resources outside of control of the respective agent.

In embodiments, the generating allocation data step comprises: developing, by one or more computers, a matrix of the respective user IDs versus the electronic resources used by the respective user IDs; and allocating, the electronic resources, by one or more computers, change the matrix based at least in part on the second rule set.

In embodiments, an operation may be performed of generating and sending or making accessible, by the one or more computers, for an administrator graphical user interface, data for each of a plurality of the user IDs, the data for a respective one of the user IDs providing an indication of a level of the electronic resources allocated to the respective user ID.

In embodiments, an operation may be performed of generating and sending or making accessible data, by the one or more computers, for a user graphical user interface for a respective one of the user IDs showing an indication of an electronic resource level allocated to the respective one user ID.

In embodiments, an operation may be performed of generating and sending or making accessible data, by the one or more computers, for a user graphical user interface for a respective one of the user IDs providing an electronic ability to generate and send an electronic resource actuation request and/or a complaint.

In embodiments, operations may be performed of determining, by the one or more computers, a label or other indication for a relative level of importance or priority, based at least in part on the application context ID determined for a respective one of the user IDs; and generating and sending or making accessible, by the one or more computers, data for a user graphical user interface for a respective one of the user IDs, for the label or other indication for the relative importance or priority of current activity, based at least in part on the run-time data, performed by the respective user ID.

In embodiments, an operation may be performed of generating data to redistribute dynamically, by the one or more computers, the electronic resources allocated to a respective application server that serves a particular one of the applications based at least in part on a number of the user IDs currently accessing the application server and running the particular one application and/or based at least in part on a number of the user IDs currently accessing a different application server.

In embodiments, operations may be performed of generating, by the one or more computers, user ID profile data for each of a third plurality of users, the user ID profile data for a respective one of the third plurality of the user IDs based at least in part on the respective application context IDs detected from the run-time data for the respective one user ID aggregated over a period of time; and making this user ID profile data accessible electronically, by the one or more computers.

In embodiments, operations may be performed determining a relative allocation level for two or more of the electronic resources selected from the group of CPU cycle allocation, disk input/output bandwidth allocation and memory allocation, to obtain a level of application performance; and generating adjustments in the allocation levels of the electronic resources, by the one or more computers, to optimize overall performance of a respective one of the monitored computers.

In embodiments, an operation may be performed of sending, by the one or more computers, the allocation data to a plurality of nested-sub-controllers that each control an allocation of the electronic resources to a different respective infrastructure electronic component.

In embodiments, operations may be performed of detecting, by the one or more computers, a pattern comprising one or more selected from the group of an application, a combination of applications, and a combination of an application used by a specified one of the user IDs; determining a prediction rule for the determined pattern, by the one or more computers, from a prediction rule set, wherein the respective prediction rule in the prediction rule set is based at least in part on a past history of usage of the electronic resources when the pattern is detected; determining, by the one or more computers, a prediction of electronic resources that may be used at a future time or during a window of time when the pattern is detected based at least in part on the prediction rule set; and using the prediction of electronic resources, by the one or more computers, in one selected from the group of generating of the allocation data for the electronic resources and providing data or making the data accessible electronically that indicates a need for additional electronic resources.

In embodiments, use of the prediction of electronic resources in generating the allocation data or providing of the data indicating a need for additional electronic resources is performed only when a predicted level of electronic resources exceeds a current level of the electronic resources or exceeds the current level of the electronic resources by an amount.

In embodiments, an operation may be performed of generating by agents the allocation data taking into account at least in part the prediction of electronic resources to increase or to decrease a level of the electronic resources allocated to be allocated, wherein a respective one of the agents comprises a set of programming code stored on a computer-readable medium, configured for executing at run-time, on a monitored infrastructure component.

In embodiments, operations may be performed of aggregating, by the one or more computers, predictions of electronic resources that may be used at the future time or in the window of time, for shared electronic resource pools, to obtain a predicted shared resource total; generating and sending or making accessible, by the one or more computers, data for an administrator graphical user interface showing an indication of electronic resource needs based at least in part on the predicted shared resource totals.

In embodiments, operations may be performed of accessing, by the one or more computers, memory storing correlations from a past history of user ID interactions with applications correlated with electronic resource usage over time associated with use of the respective applications or application patterns; and generating, by the one or more computers, the prediction rule set from these correlations, by the one or more computers, for detected applications based on one or more parameters, wherein a respective one of the rules in the prediction rule set comprises a predicted level of one or more of the electronic resources when a respective application or application pattern is detected.

In embodiments, an operation may be performed of filtering out, by the one or more computers, data that does not correspond to a pattern of run-time data corresponding a rule in the first rule set.

In embodiments, the filtering step may be performed by agents, wherein a respective one of the agents comprises a set of programming code stored on a computer-readable medium, configured for executing at run-time, on a monitored infrastructure component.

In embodiments, an operation may be performed of controlling, by the one or more computers, software agents disposed to monitor a plurality of virtual machines, to distribute over time the run-time data from the plurality of the virtual machines so that times for receipt of the run-time data from the different respective virtual machines is distributed over time.

In embodiments, operations may be performed of setting, using the one or more computers, a respective resource cap or caps for one or more of the electronic resources, to be allocated to respective ones of the monitored electronic computers or systems; obtaining a level of the electronic resources currently being used directly or indirectly by one or more of the monitored computers or systems; and changing, using the one or more computers, one or more of the caps, based at least in part on the level of the electronic resources currently being used directly or indirectly by the one or more of the monitored computers or systems.

In embodiments, operations may be performed of generating one or more rules of the first rule set and/or the second rule set and/or a single comprehensive rule set that comprises a combination of the first and the second rule sets by identifying, by the one or more computers, respective identification strings in the run-time data; reordering, by the one or more computers, the elements in one or more of the strings based at least in part on one or more rules in a tokenizing rule set to obtain reordered identification strings; sorting, by the one or more computers, the reordered identification strings to create hierarchal groups of adjacent related strings; receiving and/or determining, by the one or more computers, a selection of one or more of the reordered identification strings; and creating a rule in at least one selected from the group of the first rule set or the second rule set or the single comprehensive rules, based at least in part on the selected one or more of the reordered identification strings.

In embodiments, operations may be performed of identifying, by the one or more computers, respective identification strings in the run-time data; hierarchically grouping, by the one or more computers, the identification strings using a hierarchy algorithm; generating presentation data, by the one or more computers; and sending or making accessible the presentation data, by the one or more computers, for selection of certain of the identification strings for use in generating one or more rules for the first rule set and/or for the second rule set and/or for a single comprehensive rule set that comprises a combination of the first and the second rule sets.

In embodiments, a method, system, and program product are disclosed of determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications; receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer; determining, by the one or more computers, respective application context IDs for applications and/or respective locations within applications running on the respective user IDs of a second plurality of the user IDs, based at least in part on the first rule set; detecting, by the one or more computers, a pattern comprising one or more selected from the group of an application, a combination of applications, and a combination of an application used by a specified one of the user IDs; determining a prediction rule for the determined pattern, by the one or more computers, from a prediction rule set, wherein the respective prediction rule in the prediction rule set is based at least in part on a past history of usage of the electronic resources when the pattern is detected; determining, by the one or more computers, prediction data for of electronic resources that may be used at a future time or during a window of time when the pattern is detected based at least in part on the prediction rule set; and using the prediction data for electronic resources, by the one or more computers, in one selected from the group of generating of the allocation data for the electronic resources and providing data or making the data accessible electronically that indicates a need for additional electronic resources.

In embodiments, an agent, comprising a set of programming code stored on a computer-readable medium, configured for executing by the one or more computers, at run-time, may perform the steps: monitoring, by the one or more computers, a monitored computer of a respective one of the user IDs to obtain the run-time data; and detecting, by the one or more computers, whether a pattern determined from the run-time data corresponds to a prediction rule in the prediction rule set.

In embodiments, the agent may further perform the step generating and sending, by the one or more computers, actuation requests to change selected priorities or levels of the electronic resources provided or providable to or associated with the monitored computer which one or more electronic resources are locally controllable by the agent.

In embodiments, the agent may further perform the step generating and sending, by the one or more computers and one or more electronic networks, actuation requests to change selected priorities or levels of the electronic resources provided or providable to a respective monitored computer, to an actuation manager program running on one of the one or more other of the computers, which actuation manager program oversees control of electronic resources outside of control of the respective agent.

In embodiments, operations may be performed of receiving or obtaining, by the one or more computers, slowdown data indicating a slow down of a first one of the monitored computers, wherein the prediction data for electronic resources further includes resource shift data, and further comprising generating, by the one or more computers, the allocation data to increase the electronic resources to the first monitored computer and to decrease the electronic resources to one or more other of the monitored computers on a temporary basis and then to return the electronic resources to those monitored computers to previous levels.

Embodiments of a method, system and program product are comprising: receiving or obtaining, by the one or more computers, slowdown data indicating a slow down of a first one of the monitored computers; determining, by the one or more computers, a resource shift rule applicable at a time of receiving or obtaining the slowdown data, the resource shift rule for taking electronic resources from one or more other monitored computers, the resource shift rule comprising a shift pattern comprising one or more selected from the group of a time of day, a day of the month, a company department, an application, wherein the respective resource shift rule in the resource shift rule set is based at least in part on a past history of usage of the electronic resources when the shift pattern is detected; determining, by the one or more computers, using the resource shift rule the one or more other of the monitored computers from which to take the electronic resources; and generating automatically allocation data, by the one or more computers, for shifting additional of the electronic resources to the first monitored computer, to be taken at least in part from the one or more other monitored computers only on a temporary basis and then returning the electronic resources allocated to the first monitored computer and the other monitored computers to previous levels before the shifting.

In embodiments, an operation may be performed of monitoring, by one or more computers, a plurality of monitored computers; and detecting from a plurality of the monitored computers, by the one or more computers, respective data patterns, with each data pattern comprising one or more selected from the group of an application context ID, a combination of application context IDs, and a combination of an application used by a specified user ID, wherein the generating automatically allocation data for shifting additional electronic resources is performed only when predetermined data patterns from the plurality of the data patterns are detected.

In embodiments, a method, system, and program product are disclosed of creating or receiving, by one or more computers, a language syntax to define at least in part, a plurality of rules for assigning token types to a stream of messages to obtain a stream of contextualized token instances; plurality of production rules for detecting deterministic event instances from the stream of contextualized token instances; a plurality of state type rules for detecting state type instances, wherein a state type rule comprises one or more deterministic event types with respective probability weights, wherein a probability weight is the likelihood that, detecting the deterministic event type that results in the system, the respective state type is executed; and a plurality of respective pattern rules to define respective Markov chains, with each of the pattern rules comprising a set of state types and transition probability weights between the state types; receiving or obtaining or being presented, by the one or more computers, with the run-time data comprising a stream of messages for systems of a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer; parsing, by the one or more computers, to apply the language syntax to the stream of messages to extract a stream of the contextualized token instances from the stream of messages based at least in part on the language syntax; detecting, by the one or more computers, from the stream of the token instances, a stream of the deterministic user event instances, based at least in part on the language syntax; selecting, by the one or more computers, a plurality of the Markov chains containing one or more of the state type instances that are implied from the stream of messages, based at least in part on the respective probability weights of the state types from the deterministic user event instances that were detected; computing, by the one or more computers, a probability that the observed system is executing the respective pattern type for each of the respective Markov chains selected; and determining, by the one or more computers, based at least in part on one or more of the selected Markov chains and next state transitions in the respective Markov chains selected and/or one or more of predicted states in the respective Markov chains selected, predicted prioritization data for electronic resources for the observed system and/or a predicted level of electronic resources that may be needed by the system generating the messages.

In embodiments, operations may be performed of accessing, by the one or more computers, a database containing a plurality of the respective Markov chains; and associating, by the one or more computers, a priority and/or a level of electronic resources to be allocated for the Markov chain that was selected.

In embodiments, the determining step determines a predicted level of electronic resources that may be needed by the system generating the messages, and the operation may be performed of generating data, by the one or more computers, for display based at least in part on the predicted level of electronic resources for the system generating the messages.

In embodiments, the determining step may determine a predicted level of electronic resources that may be needed by the system generating the messages, and an operation may be performed of generating data, by the one or more computers, to adjust available electronic resources in the system generating the messages, based at least in part on the predicted level of electronic resources for the system generating the messages.

In embodiments, operations may be performed of receiving or obtaining, by the one or more computers, a ranking rule set for ranking applications and/or user IDs; generating ranking data providing a ranking of a plurality of the user IDs, by the one or more computers, based at least in part on the ranking rule set; and sending or making accessible, by the one or more computers, the ranking data.

In embodiments, operations may be performed of generating, by the one or more computers, based at least in part on the ranking data for a second plurality of the systems of user IDs, a predicted level of electronic resources that may be needed by the second plurality of the systems of user IDs; obtaining, by the one or more computers, a level of electronic resources allocated to the second plurality of the systems of the user IDs; comparing, by the one or more computers, the level of electronic resources allocated to the second plurality of the systems of the user IDs with the predicted level of the electronic resources that may be needed by a second plurality of the systems of user IDs to obtain comparison data; and generating and sending or making accessible electronic resource change data, by the one or more computers, based at least in part on the comparison data.

BRIEF DESCRIPTION OF THE FIGURES

FIG. 13 illustrates an example Synapse Application User Interface "Application Resource Profiles Configuration" in accordance with an embodiment of the invention;

DETAILED DESCRIPTION OF THE ILLUSTRATED EMBODIMENTS

Definition of Terms

Figure 1:
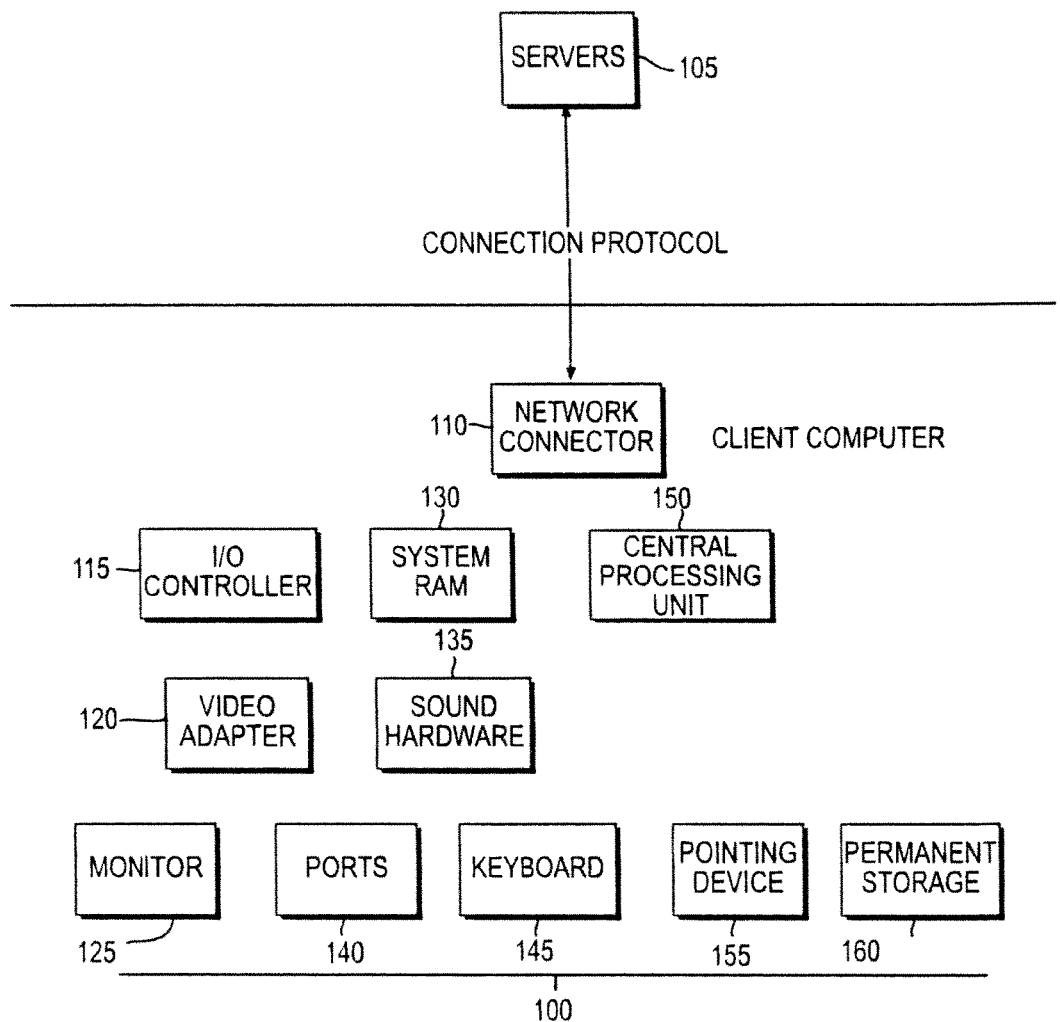
FIG. 1 illustrates a computer and Client and Server Hardware in accordance with an embodiment of the invention.

The terms used in this specification generally have their ordinary meanings in the art, within the context of the invention, and in the specific context where each term is used. Certain terms are discussed below, or elsewhere in the specification, to provide additional guidance to the practitioner in describing the devices and methods of the invention and how to make and use them. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to the preferred embodiments.

"Actuation" is a control or action triggered by the run time Synapse System and executed in a targeted virtual infrastructure;

"Actuation Types" are different classifications of resources mapped to or derived from physical computer hardware resources associated with Actuation;

"Activity" is a generic term describing a detectable (by some other component) generated data stream;

"Activity Type" classifies different data streams as separate categories "Agent" means a primary code unit which can be comprised of an executable with one or more running instances of a single engine DLL.

"Infrastructure," external to the Synapse System, is the Synapse System targeted corporate enterprise controlled environment delivering software applications whether physical (non-virtual) or virtual. In the Synapse System the Infrastructure is controlled, managed, and driven by end user and application activity via Synapse System components. Infrastructure for this discussion always means virtual infrastructure. Note that the Synapse System is capable of controlling components of both physical as well as virtual environments.

"Persistent User Context Identifier" (PUCI) is the primary data structure created at the user activated point of origination (UPO) derived from user and application activity which is preserved throughout all stages of processing for finding direct or derived user contexts created at the UPO.

"Synapse Agent" or (SynAgent) is a code unit that monitors and correlates events within an operating system, performs method interception, and many other monitoring target types including the GUI layer of applications. The SynAgent is described in the GMGD Application. Refer to the Reference section.

"Synapse Run Time Mode" (SRTM) is the operating run time mode in which virtual infrastructure optimization is executed;

"Synapse Evaluation Mode" (SEM) is the evaluation mode which collects, analyzes, builds application profiles, and configures Actuation in preparation for the Synapse Run Time Mode;

"Synapse Simulation Mode" is a mode where resource profiles collected from a previous recording session are replayed using resource methods to reproduce equivalent resource profile consumption in a virtual environment;

"Synapse Reflection Mode" is the reflection mode which enables iterative improvement of optimization based at least in part on continually collected and sampled data "Synapse System" is the entire system comprised of tools, their components, and run time components that perform infrastructure optimization;

"Synapse System Framework" is the framework that may provide the means of the development of Synapse applications based at least in part on the optimization capabilities.

| Term | Abbr. | Definition |
| --- | --- | --- |
| Application Data Set | ADS | Collectively |
| Response Time Metric | | An approximate measure of the time between a user's interaction with a computer system and the system's response to that action. The metric is approximate because the detection of the interaction and response may vary somewhat from the actual times of those events. |
| Response Time Indicator | RTI | An indicator derived by calculating a moving average of the Response Time Metrics. It is possible to have multiple RTIs for different metric sets in the same system. |
| Synapse Evaluation Mode (Suggest System Evaluation Phase) | SEM | The phase of interaction with the system where metrics are gathered and evaluated to create plans for optimizing during Synapse Run Time Mode. |
| Synapse Run Time Mode | SRTM | The phase where optimization Plans are evaluated against real-time metrics to optimized the use to total system resources to achieve the goals of the plan. |
| Actuation Optimization Plan Package | AOPP | A plan for changing the operational characteristics of a target system based on observations of the system's Response Time Indicators coupled with goal oriented priorities. The plan represents instructions to a controller that will make changes to the system characteristics based on real-time RTIs. |
| Metric Engine Real Time System | MERTS | A real-time user configurable analytic engine that transforms incoming real-time events from a variety of sources into a specified collection of metrics and conditions. The system provides a means to collect events over time and persist the derived metrics and conditions. The system includes a user definable set of functions for performing the transformation, which include features for correcting anomalies in the incoming data stream like missing data, incorrect ordering and unexpected termination of data flow. |
| Unprocessed Monitor Streams | UMS | |
| Application Location | AppLoc | This is the context of the events of the user interaction. Basically the monitored object. Could be a page or a button. |
| App Context Id | | An Id tied to the app context which is a set containing App Locs |
| Assess Models Plan Policy | | Application Classification, Application Location The Usability and Productivity metric objectives, i.e. what level usability and productivity are desired. |
| Assessment | | The Categorization rules, Application Locations, Applications Contexts |
| Observer | | A component that correlates data from multiple systems. |

| Term | Abbr. | Definition |
| --- | --- | --- |
| Policy Manager Model | | Business rules (at least some declarative) |
| Assess Profile | | Input for Users, Roles, Application Profiles, App Resource Requirements |
| Actuation App Context | AAC | A structure created by the planning process, that identifies an Application Context and provides a place to collect data about that context. This may also contain configuration for details of how to execute actuation on different components as well as limits to actuation values(IOC). It contain rules for detecting triggering actuation behavior based on the incoming data stream. |

In a software environment, user activity results in application activity. The Synapse System, in embodiments, qualifies and then connects user driven application activity to infrastructure, e.g., virtual infrastructure, for the optimization of infrastructure resources in the delivery of application service levels.

Conceptual Overview of the Synapse System

In embodiments, an object is to provide a system, method and program product for dynamically allocating computer resources (e.g., CPU cycles, disk input/output bandwidth and memory) to users on a substantially real-time basis based at least in part on determining an application context or State at the user desktop from a first rule set, and based at least in part on a second rule set based at least on priorities for applications and/or tasks and/or user IDs and/or a combination of two or more selected from the group of application context IDs, tasks, and user ID priorities.

Figure 27:
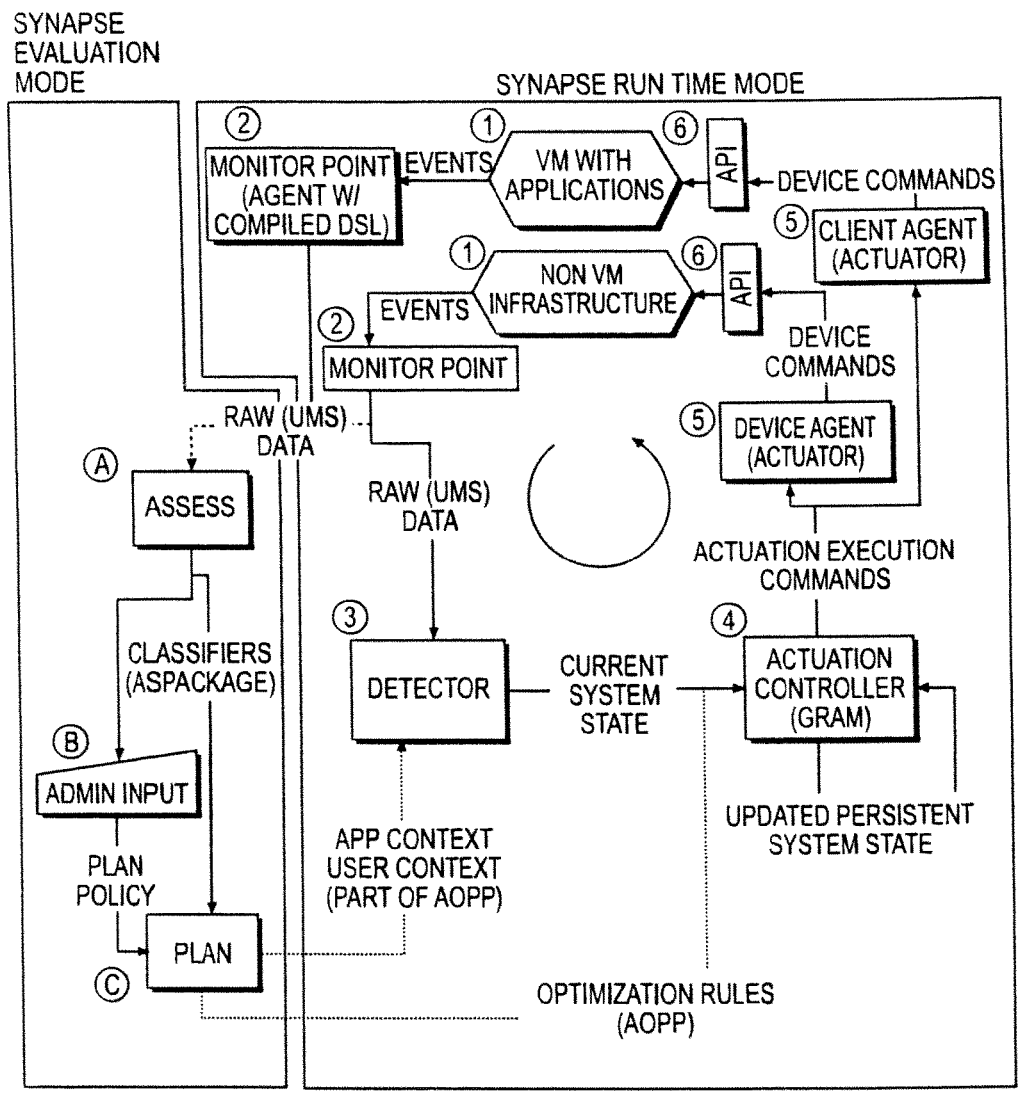
FIG. 27 illustrates a conceptual overview of one embodiment.

Refer to FIG. 27 "Conceptual Overview of the Synapse System." The diagram is divided vertically into sections that represent the Synapse Evaluation Mode and the Synapse Run-Time Mode. The Evaluation Mode provides input to the Run-Time mode.

In embodiments, in either mode, the running systems and applications (1) may be monitored by Monitor components (2) that have the ability to detect low level system events e.g. mouse or keyboard presses, as well as inspect the monitored component's logical structure, e.g. the tree of controls that make up the User Interface (GUI). The Monitors(2) process the events and structure and produce a stream of normalized raw data in the form of Unprocessed Monitor Streams (UMS) that can processed by downstream components.

Synapse Evaluation Mode

During Evaluation mode the raw data (UMS) is fed to the Synapse Assess module (A). The Assess module analyzes the data stream to recognize patterns and use the patterns to define models (e.g., a first rule set) that can later be used to automatically recognize information about users, events and the structure of applications and provide a classification of the user state, e.g., an application context ID. The dynamic construction of the model is what allows the Synapse system to monitor and control systems for which, in some cases, it may have no prior knowledge. The raw data may be coming in from a large universe of monitored computers or from a more limited number of monitored computers. In embodiments, the more limited number of monitored computers may be determined based on a time parameter or based at least part on a particular network parameter or may be based on a predetermined level of raw data or on another parameter.

In embodiments, the Planning module(C) uses the models (e.g., the first rule set) provided by the Assessment (Assess Module) to create classifiers that can attach IDs e.g., an application context ID, to the Users, Events and Application Contexts that the Models recognize in a data stream. Additionally, the planning module uses input from the Admin(B), system definition profiles, and business priorities to develop an optimization plan (a second rule set for priorities). An example of a plan rule might be, "If the User ID is associated with a user who is in the Accounting Group and that user is interacting with an Application Context that is an accounting application and it is currently the end of the quarter, then raise the priority of that application for that user for resources". Highly sophisticated rules sets (e.g., the second rule set) and configurations can be defined to allow an arbitrary level of optimization across a large virtual environment.

During evaluation, the models (e.g., first rule set) and plans (e.g., second rule set) are developed using sample raw data provided by the Monitors. During the run-time mode these developed models (e.g., first rule set) and plans (e.g., second rule set) are applied to the real data being observed in a much wider audience. This evaluation process can be repeated as the systems, users, applications or understanding change over time.

Synapse Run Time Mode

During Run-time mode, the raw data from the Monitors (2) is fed into the Detectors(3). The Detectors use the Models (e.g., first rule set) produced by the Assess and Plan modules to classify the run-time data stream. The classification process applying the first rule set results in the identification of localized changes to the state of the system or application, and is associated with a User Id and/or an Application Context Id, e.g., an application context ID. An example might be, a user had previously submitted a query in an application (this query happens to be a long running query and so will play into the optimization decision in the next step).

The state changes observed by the Detectors are pasted on to the Actuation Controller (4) which evaluates the state changes from all detectors in the context of a current global system state (e.g., its current use of electronic resources), and applies the Optimization Rules (e.g., second rule set) to determine if the change in states representing the current global system state, warrants a change to the system and/or application configuration to reallocate electronic resources. To follow the query example for the previous paragraph, the state associated with the query submission in the past has a high probability of requiring significant resources and has a high business importance, as reflected in the second rule set. The recognition of this need for significant resources, in conjunction with the association of this query with an application that is of high business importance, per the second rule set, may warrant a change in resources allocated for this system. If a change is required, activation requests are sent to actuators (5) which make appropriate changes to priorities and resource allocation via system specific APIs.

The run-time mode is a continuous iterative process of evaluation and adjustment. The Evaluation mode may be iterative, or may be continuous, or may be set manually one time, or may be set periodically or aperiodically.

Roles of the Knoa Agent in the Synapse Solution

Monitor

The Knoa Agent for a respective one of the computers to be monitored, e.g., a monitored computer, has the ability to interrogate the structure of the objects that make up the Graphical User Interface (GUI) on the monitored computer, as well as events generated by many types of software applications on the monitored computer. The information derived is transformed into a normalized form which may undergo further processed within the Agent before optionally being passed on.

Detector

In embodiments, among the capabilities of the Knoa Agent in the Synapse system may be to serve as a Detector. In this capacity, the Agent interprets patterns of run-time data and compares them to patterns of run-time data in a 1st Rule Set, which had been earlier derived from the monitored raw data stream elsewhere, to interpret the current stream of data and to derive at least an application context ID that designate respective applications and/or respective locations within applications.

Using this derived application context ID data and the User ID, the Agent, in embodiments, may apply a second rule set of priorities, to thereby initiate Actuation Requests for electronic resources that may be locally controlled by the Agent. In embodiments, the Agent may initiate Actuation Requests to other components of the Synapse system or elsewhere for processing, for electronic resources outside of local control.

Actuation

In embodiments, the Agent may have the ability to manipulate applications and operating environments. The Agent may do this in response to electronic resources Actuation Requests which originate either within the Agent itself, (its Detector behavior), or from elsewhere. In the event that the Actuation Request is of local origin, the immediate proximity of the Detector to the Actuator may allow for near instantaneous optimization of the Applications and enclosing environment that the Agent has been configured to manipulate.

The translation of an electronic resources Actuation Request to the appropriate system manipulation, via APIs or other mechanism, may be accomplished through additional configuration (2nd Rule Set) which may be created elsewhere.

The Synapse System, Assesses infrastructure environment running applications using Monitoring Points. A Monitoring Point could be a Synapse Agent that monitors targeted Infrastructure components, e.g., virtual machines, that use Reflection Application Models to derive events and extract an Application Data Set. Another Monitoring Point could be an agentless network protocol monitor, e.g., connected to network switch's mirror port. Both these Monitoring Points capture Unprocessed Monitor Streams (UMS). Within the captured UMS is an Application Location Set generated through, e.g., user business or non business related activity. The Application Location Set is identified through Assess Analytical Engines, e.g., UMS Classifiers. These Analytical Engines produce application categorizations, Assess Contextualized Application Activity, and Infrastructure Resource Profiles, to construct Assess Models. These Assess Models identify Application Classifications and Application Locations and Infrastructure Application Reflective Data that is mapped to Assess Contextualized Application Activity through an initial correlating mechanism in preparation for Plan processing.

The Plans Processing stage uses Plan Analytical Engines that interactively or automatically designate application priorities for the identification of application structures in a stream of monitored data to construct user and Application Contexts. An example of an Application Context is a filtered set of URL's that reflects a user's application activity when executing some business task. App Contexts are used to create Usability and Productivity metrics to quantify acceptable application performance as perceived by a user to measure productive work related to application interaction and for producing configuring Actuation Detection Agent, Network, and other Syn Component rule sets (ACRS). The ACRS are a run time mechanism detecting application contexts, anticipation structures, and consequent actions, actuation executions (ActX) and produce an Actuation Optimizing Plan Package (AOPP). The AOPP includes a persistent Application Context Identifier (ACI) Set for the purpose of persistent tracking at any level of the Centralized Processing Tier(s), as well as a User Application Context structure (UAC).

In embodiments, the Actuation Processing stage uses Detecting Agents or other Detecting Monitor Types within virtual machines or other Infrastructure locations, e.g., a Switch Monitor [refer to the References section], based at least in part on both run time monitored or detected input as well as contents of the AOPP. AOPP contents is used for detecting run time persistent, location based, derived user and application contexts (ACI structures) as a basis for generating actuation requests using Centralized Processing Tier(s) which use the received AOPP Actuation Optimizing Plan Package. Its contents provides user and application contexts (AAC's), Prediction & Anticipation (Profiling) Rule Sets, Infrastructure Optimization Classes, and Actuation Component Rule Sets that process the AAC's with, e.g., Planned Prediction or Anticipation Profiling. The Prediction and its sub component Anticipation Profiling merges its structures with run time data and events from various Detection Points and evaluates feedback (for example, RTI measurements, to be discussed) from infrastructure and distributed Monitoring Points. Examples of Monitoring Points are Agents that evaluate detected AAC's and Anticipation Profiling Structures (APS) to generate Actuation Request Tokens (ART) which are prepared and deposited into the Global Resource Allocation Map (GRAM). The GRAM creates and maintains a multi dimensional Global, e.g., all the active Vm's, perspective Resource Actuation Map. The GRAM maintains records of Vm Actuated Resources, Vm Queued Actuation Requests, current Infrastructure state, e.g., contention measurement for the purpose of Moderating and Controlling the interaction with infrastructure via a filtering mechanism that maintains an equilibrium and alerts for potential adverse conditions while evaluating error conditions.

In the Synapse System, in embodiments, there may be a range of Actuation Types. For example, within the virtual machine, the Synapse System uses Vm OS Actuating or Application Actuating Agents to dynamically control (within the virtual machine), OS and Application features and behaviors. Furthermore, the Synapse System uses Infrastructure Actuating Agents for dynamically controlling (within the infrastructure) OS or Infrastructure Application features and behaviors using Virtual Infrastructure Interfaces that influence the dynamic allocation and distribution of resources directly affecting or controlling a single or a set of Vms or infrastructure components.

In embodiments, control may be performed, by the one or more computers, using software agents disposed to monitor a plurality of virtual machines, to distribute over time the run-time data from the plurality of the virtual machines so that times for receipt of the run-time data from the different respective virtual machines is distributed over time.

Additionally Synapse System components can also Actuate Infrastructure through published or proprietary interfaces to redistribute resources based at least in part on user and application activity. Furthermore, Feedback Mechanisms are also being concurrently collected from the infrastructure VM OS via the Agent Detection Point applications via the Agent Detection Point Actuation Targets resulting from user or system activity or through interfaces to Infrastructure, e.g., a Virtual Sensor. The feedback data and metrics are distributed to Evaluating Units within the Centralized Processing Tier.

The foregoing Assess, Plan, and Actuation processing forms a basis and framework for embodiments to deliver a set of Synapse System applications.

An example Synapse application is the User Virtualization Self Service Application that provides a User UI for a virtual system that collects user experience and performance feedback, user requests for service, and the receipt of infrastructure resource levels.

Another example, an Automated Administrative Application, provides automated administrative tasks by provisioning prioritization and contracted SLA levels for application and user support as an optimization and prioritization system for delivering resources to a Vm. Another example is a Virtualization Infrastructure Resource Optimizing Application that dynamically redistributes a server's Vm application resources as a function of user and application activity as detected by one or more Detection Points of the Synapse System. For example server Vm resources are incrementally adjusted per user such that as users enter and leave a particularly resource demanding application section, the Synapse System will change dynamically to accordingly adjust a server's resources. There are a wide range of functions that can control the rates and their scheduled changes. In this scenario server resources are increased based at least in part on user activity volume by increasing resource allocation based at least in part on the number of users sharing the same app server access & usage, e.g., Server Boost and other Synapse System Application Types.

Accordingly, in embodiments, data may be generated to redistribute dynamically, by the one or more computers, the electronic resources allocated to a respective application server that serves a particular one of the applications based at least in part on a number of the user IDs currently accessing the application server and running the particular one application and/or based at least in part on a number of the user IDs currently accessing a different application server. In embodiments, this data on the number of users may be obtained by counting the number of user IDs associated with a detected application context ID.

Accordingly, in embodiments, a method in accordance with the invention may aggregate application context IDs and/or task labels to obtain user desktop profile data, by one or more computers, for each of a plurality of users, the user desktop profile data for a respective one of the user desktops based at least in part on the respective application context IDs and/or task labels for applications and/or tasks running on the respective one user desktop aggregated over a period of time, and then may make this user desktop profile data accessible electronically, by the one or more computers.

Synapse System Benefits

The following are all potential contributors to the Synapse System value proposition, whose benefits will vary according to the deployment environments and user workflow.

In embodiments, the Synapse System may provide Capacity planning which is able to identify specific business and non-business activities and associate resource-use profiles with individual activities. In embodiments, Synapse resource profiles may provide a high-level view into the resource needs of an organization, and an effective means of projecting, allocating, and charging back resource use.

In embodiments, a further step may be performed of generating, by the one or more computers, user ID profile data for each of a third plurality of users, with the user ID profile data for a respective one of the third plurality of the user IDs based at least in part on the respective application context IDs detected from the run-time data for the respective one user ID aggregated over a period of time; and making this user ID profile data accessible electronically, by the one or more computers. In embodiments, this user ID profile data may comprise a listing of data based on application context IDs detected for the respective user ID, and/or may comprise a measure of time that each respective application context ID is detected over some period, e.g., a week, a month, to name a few.

In embodiments, the Synapse System may provide VDI (virtual desktop infrastructure) and/or virtual machine Optimization which leverages different monitoring and detection technologies and especially the Synapse Agent technology's deep insight into the client OS and application to optimize settings for efficient operation. Operating systems have existing mechanisms for dealing with resource-constrained machines, such as netbooks, or devices operating on battery power. For example, in these devices the Synapse Agent can tune the OS for more optimal VDI operation.

In embodiments, the run-time data may be normalized. The run-time data may, in embodiments, comprise and/or be derived from run-time instantiations of objects occurring on the monitored computer for the respective user ID. In embodiments, the objects comprise one or more selected from the group of methods, system objects, object events, dynamic GUI objects, network component objects, wherein the object events comprise at least one selected from the group of operating system events, application events, and web browser events and network events generated or affecting directly or indirectly the respective monitored computer. In essence, the observed objects and components and associated events and state changes are transformed to a form consistent for consumption by the Synapse system, e.g., in accordance with an accepted protocol for objects and attribute data in Synapse. In embodiments, the agent collecting the run-time data may perform the normalization process on the raw collected data. In embodiments, the normalization process may be performed by a server computer. In embodiments, the normalization process converts the run-time data to a preferred way of referring to the various objects, components, events and state changes reflected in the raw data.

In embodiments, the agent, may comprise a set of programming code stored on a computer-readable medium, configured for executing by the one or more computers, at run-time, wherein the agent performs the steps: monitoring, by the one or more computers, a monitored computer of a respective one of the user IDs; detecting, by the one or more computers, whether a pattern in the run-time data corresponds to a rule in the first rule set that designates a respective one of the application context IDs; and determining, by the one or more computers, whether a rule in the second rule set applies based at least in part on respective application context ID.

In embodiments, the respective agent may send an actuation request to increase or to decrease availability or a level of a locally controllable electronic resource, e.g., a network adapter, an operating environment. In this instance, the agent may be considered to be acting autonomously with respect to these locally controlled electronic resources. Note also that the agents may be dispersed throughout the system, agents may be on respective desktops for user IDs, and/or may be on the host computer, and/or may be monitoring a virtual machine, and/or may be at the network level. For example, an agent monitoring a desktop, may send an actuation request signal (e.g., ACTX, or ACTREQ) to the Windows™ program, or to an operating system, to name a few, to change a level of electronic resources being provided for an application currently running on the monitored computer.

Accordingly, in embodiments, the agent may be further configured to generate and send, by the one or more computers, an actuation request to provide or to modify one or more of the electronic resources provided or providable to or associated with the monitored computer and that is locally controllable by the agent. In embodiments, this may be important to provide a quick control loop (rather than sending the information out to a network). This operation allows rapid and repeated resource control without involvement of the rest of the system for many situations.

In embodiments where a host or a virtual machine on a server computer must be contacted to effect a respective electronic resource level, then the agent may generate and send, by the one or more computers, an actuation request to change a level of the electronic resources provided or providable to the monitored computer, to an actuation manager program running on the host or virtual machine server or other computer, which actuation manager program oversees control of electronic resources outside of control of the respective agent.

In embodiments, the actuation request to change a level of the electronic resources may be generated and sent from a higher level agent or from a higher level actuation manager program, e.g., at the host level or virtual machine level, down to the agent on a monitored desktop, to change the level (e.g., to increase or to decrease the level) of the electronic resources provided to that monitored desktop computers, e.g., the actuation request signals may be bidirectional.

In embodiments, the Synapse System may provide Advanced monitoring and reporting such as the means to capture profiles of individual user activity and present that data in a form that enhances decision making and workforce management.

In embodiments, the Synapse System may provide the Prioritization of business tasks by dynamically associating user and application activity with task profiles and can prioritize high-value business tasks while mitigating adverse effects on other less-valuable tasks.

In embodiments, the Synapse System may provide Enhanced productivity by maintaining a consistent service level, and enables the effective use of the UI and applications while reducing user frustration. During periods of high resource contention, Synapse's user-feedback user interface mechanism can influence users to switch to work tasks that help to mitigate the resource shortage.

In embodiments, the Synapse System may provide Increased density by offering a level of service adequate to user, role, and task, dynamically without over provisioning. Synapse's optimization algorithms can increase the density of VMs, while maintaining productivity. Synapse's monitoring and pro-active feedback mechanisms can also mitigate the risks of swapping, network congestion, and other extreme non-linear effects of high resource contention.

FIG. 1 Hardware

FIG. 1 illustrates an embodiment of a configuration of a client computer 100 and server 105] capable of implementing and operating the Generic GUI Method Monitoring system and method. The gMg System and method can be an application program or software executed by a client computer 100, which may be a personal computer, workstation, or other computing platforms (, e.g., personal desktop assistants (PDA), or personal electronic devices (PED), which can include: cell phones, MP3 players, still and video digital cameras, and personal video recorders, etc.). The Server 105, another computer distinguished by its server software, collects data from many client computers and complements client processing tasks. The Network Connector 110 provides connectivity to external computers, e.g., servers. A standard connection protocol transmits and receives data in any format between remote computers. The client computer 100 can include subsystems connected together by an internal system bus. Instructions included in the System RAM 130 are executed by the Central Processing Unit 150.

Numerous external devices are connected to the Input/Output (I/O) Controller 115 via Ports 140 which provide a connection to external peripherals such as a modem on a serial port (not shown). The display of 2D and 3D graphics and video, or any form of moving images, is handled by the Video Adapter 120 that displays the contents of the graphics buffer on the Monitor 125. Sound processing is performed by the sound hardware 135. The Pointing Device 155 and Keyboard 145 transform user inputs into input data, with such user inputs generated from a user interacting with visual information as displayed. Permanent Storage 160 retains data between computer power off states, and is accessible, as needed, at run-time.

Figure 2:
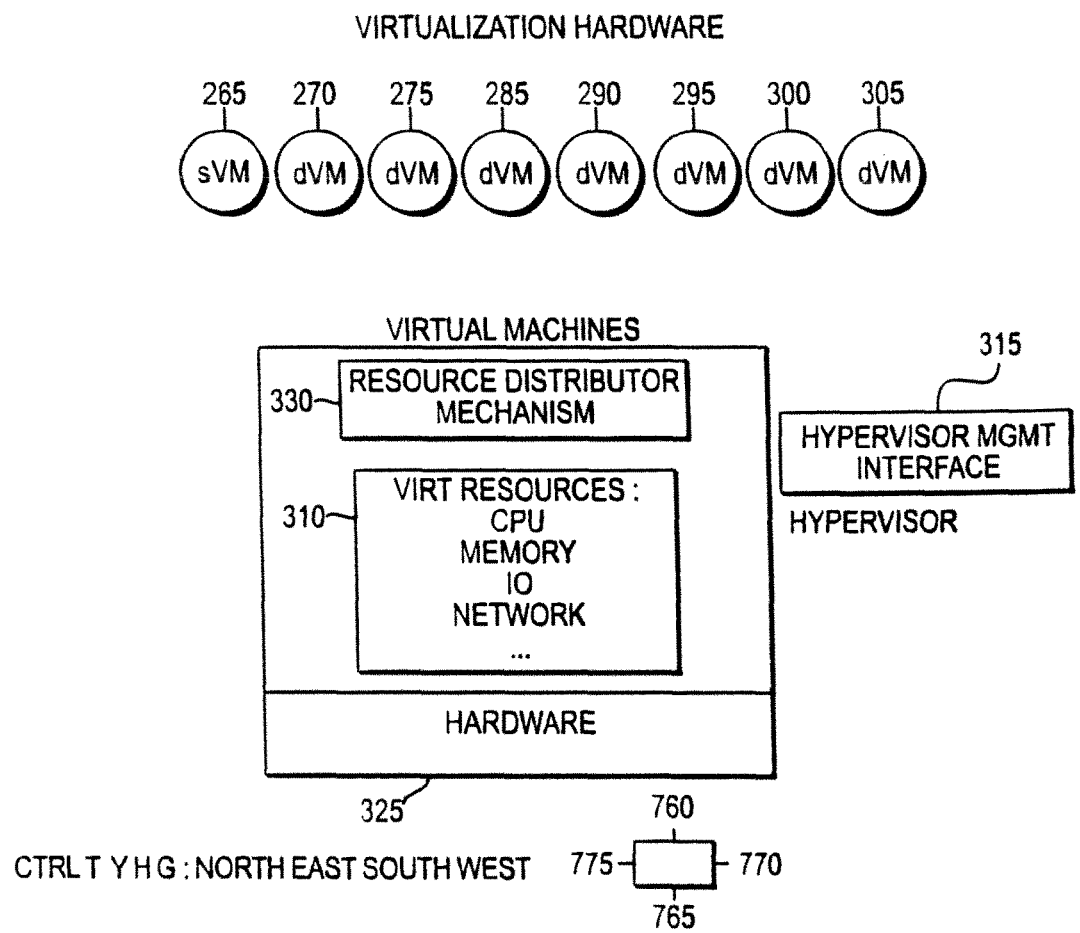
FIG. 2 illustrates an example of infrastructure in particular a virtualized infrastructure in accordance with an embodiment of the invention.

FIG. 2 Virtual Infrastructure

Virtual Infrastructure is a software layer that overlays and virtualizes physical hardware with operating systems which run applications. The figure shows a mix of desktop virtual machines (dVM) and server virtual machines (sVM) running in a conceptual hypervisor. Within the hypervisor is a controlling Resource Distributor Mechanism that controls and enables the redistribution of allocated resources to the virtual machines based at least in part on interfaces made available to external programs by the hypervisor management system. Refer to the references provided in the Reference section titled "Virtualization Defined" and the "Virtualization" PDF from VMware.

Figure 3:
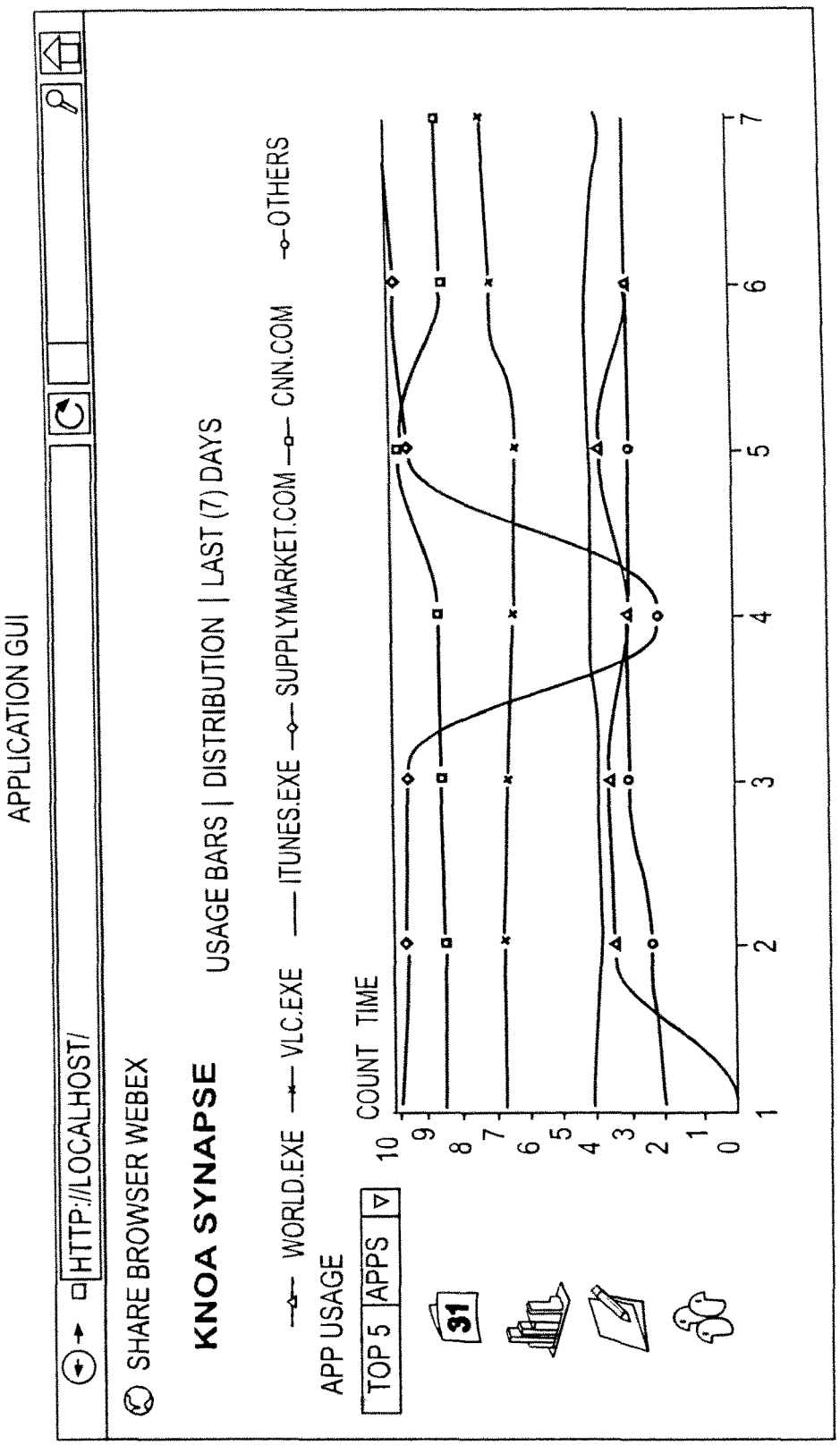
FIG. 3 illustrates a generic graphic user interface of a client application in accordance with an embodiment of the invention.

FIG. 3 Graphic User Interface

The "GUI," an abbreviation for graphical user interface, is controlled by a Host Application and is the primary interface between the user, device IO, e.g., pointing device and/or keyboard and a Host Application. "GUI object" is a type of object that is part of a programmed GUI structure that comprises the user interface that is displayed or reacts to and is controlled by computer input devices through Host Application code.

FIG. 3 illustrates an example GUI, which in this example is part of a web application. Typically with any browser there may be different object types, e.g., Win32 or Win64, or the container's embodiment, as well as Web IE controls which control web pages. The main window contains all subsection GUI structures that comprise the web page and include both the browser container application, e.g., an .exe and components, as well as the web pages and their contents, e.g., html elements. The browser container application is built using libraries of the operating system, e.g., Win64 elements such as the main window, controls, or tab items as shown in the figure.

Figure 4:
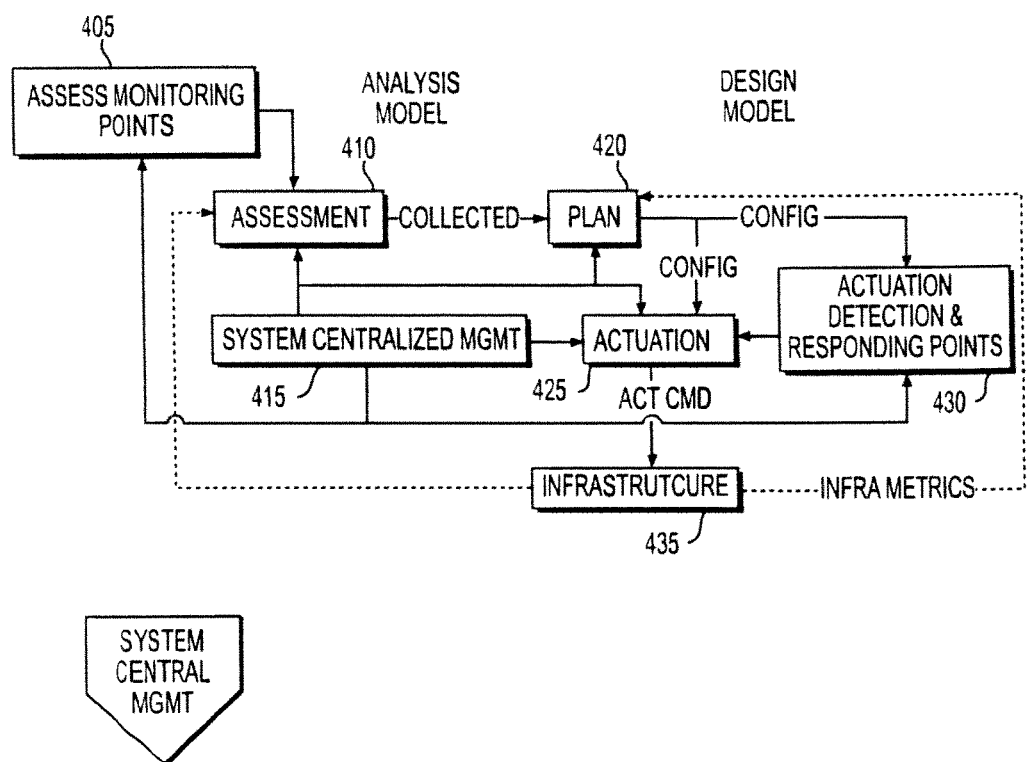
FIG. 4 illustrates an overview of the Synapse System Component Overview in accordance with an embodiment of the invention.

FIG. 4 Synapse System

FIG. 4 shows an overview of the Synapse System from a high level Processing Mode aspect. Note that while this example shows a simple view of a linear 3 modes of operation, an enterprise deployment could have different groupings and combinations of Vm's running in an Infrastructure where different Vm groups could be concurrently executing in different modes. For example, some Vm's could be Assessing while Vm's are in Actuating mode.

Synapse combines metrics and analytics with knowledge and command of OS and hypervisor internals and applies it to the needs of virtual infrastructure management. Synapse extends beyond the passive monitoring and reporting of other systems to a new realm: Actuation. By closing the automation loop from monitoring to actuation, Synapse provides a real-time management platform driven by user and business application activity.

To enable actuation, Synapse provides a powerful monitoring foundation, capable analytics, and flexible policy management. Of necessity, each of these other components must be more robust than would otherwise be required for reporting alone.

Note that in the following sections, the abbreviations within ( . . . )'s namely, As, P, A, and "all" stand for Assess, Plan, Actuate, and "applies to all Assess, Plan, and Actuate modes" respectively.

Monitoring (As) Operation

Synapse monitors and correlates (at least) four classes of data; the class of data influences how it is aggregated and joined with other data such as Settings, Levels, Statistics, and Events. See also the Data View for a detailed description of these data classes. Data collection occurs at multiple monitoring points: for example, Infrastructure, VM, Guest OS, Applications, or the Synapse Server, e.g., management. The sampling frequencies and other aspects of Synapse monitoring may be fine-tuned by the planning stage, or left at their defaults.

Assessment Operation

The Synapse Assessment Analytical Engines, via its Contextual Analyzer, performs contextual differentiation to relate user activity to variable resource requirements.

A context is a subset of the observable state of the system, usually made concrete by specifying a range of acceptable values for each of the state variables of interest, e.g., user id, VM id, application id, URL. In systems modeling, contexts may be selected for their generalizability: as past is prelude, a useful context is one which is likely to recur, and is readily distinguished from other contexts. A valuable perspective is to consider what changes and what is held invariant when defining (and contrasting) contexts.

Contextual differentiation is the process of identifying specific recurring contexts and classifying (, e.g., partitioning) them in a manner amenable to differential treatment, e.g., in the allocation of resources (be it temporal or atemporal).

There may be several goals of Assessment Analysis in Synapse: for example, to estimate environmental parameters ("constant" and "variable") associated with the global system model and its various submodels. Another is to determine the set of relevant observable attributes required for contextual differentiation given the workflow mix. Another is to use the relevant attributes to partition data into separate contexts. Another is to associate contexts with higher-level groupings. Another is to prepare the analysis results for Reporting and Planning.

Planning Operation

The purpose of planning in Synapse is to combine the results of the Assessment Analysis with an administrator-efined Policy in order to determine the control parameters/rules to be applied to the controllable elements—including the Synapse System itself.

Planning requires an objective, and the usability metric and the productivity metric may be central to the planning function.

The usability metric measures the quality of the end-user experience, as perceived by the user. While the user's degree of satisfaction with the end-user experience is not observable, various proxies may be employed, such as direct user feedback (, e.g., via a "complaint button"), or a combination of system-level metrics, such as latencies associated with application launch, window and menu (re-)draw, scrolling, character echo, disk and network i/o, etc.

The productivity metric measures the business priority or value of completing a given task. The expected productivity associated with a given task may be configured "by hand", by an administrator, or could be correlated with some direct measure of value, such as task completions, or waste, such as time spent on non-productive web browsing. The value associated with an activity may depend critically on the user engaged in that activity; social media web sites may hold little value for a firm's engineering team, but be of primary importance to the public relations team. Thus, in embodiments, a second rule set may comprise one or more combination rules comprising a priority for a respective role of a respective one of the user desktops and a respective one of the tasks. The usability metric determines minimum resource thresholds below which the user would be better served by switching or abandoning tasks, as well as resource levels above which the additional resources offer relatively little improvement in usability. It is this characterization of usability that provides the basis for (1) maintaining a consistent user experience, and (2) fully utilizing the available resources. The productivity metric is used in concert with the usability metric to determine how to allocate resources so as to enhance business value. In embodiments, productive users may be rewarded with a greater share of resources; unproductive users may be penalized.

Accordingly, in embodiments, the second rule set may comprise a set of relative priorities for respective of the user IDs based on one or more selected from the group of user role, department, function, geography, and which market served, associated with the respective user ID.

In embodiments, the second rule set may comprise a set of respective applications that are to receive a higher relative priority compared to other of the applications. For example, business software applications may be given a higher priority compared to gaming software.

In embodiments, the second rule set may comprise a set of relative priorities for user application combinations, with a respective one of the user combinations comprising a respective application context ID and a respective one of the user IDs, so that selected applications performed by respective of the user ID's are provided priority for the electronic resources relative to other of the user IDs.

In embodiments, the second rule set may comprise a set of relative priorities for respective of the user IDs based on a specific task to be carried out by selected ones of the user IDs in a given time frame, Actuation Operation Actuation (beyond self-tuning of Synapse itself) is the Infrastructure (refer to the definition of the term in the Terms section) optimizing feature of Synapse. Actuation may range from fully manual (requiring Administrator approval for all settings) to full automation of Infrastructure management operations controlling virtual and hence physical resources.

The Synapse Controller applies the control parameters/rules to the controllable elements of the Infrastructure, VM, Guest OS, and Applications.

Accordingly, in embodiments, a sending signals step for actuation comprises sending signals to automatically dynamically distributing dynamically a respective level of one or more of the electronic resources to facilitate the user desktop application and/or task to each of the respective third plurality of the user desktops. Alternatively, in embodiments, the sending signals step may comprise sending signals to a graphical user interface of an administrator display screen, by one or more computers, based at least in part on the allocation data, to dynamically distribute a respective level of one or more of the electronic resources to facilitate the user desktop application and/or task to each of a respective third plurality of the user desktops.

Reporting (all) Operation

Synapse leverages its real-time Monitoring and Assessment Analysis capabilities to present multiple views of the state of the virtual infrastructure that may be tailored to the needs of business management, IT management, and individual end-users. This is possible because Synapse captures and identifies end-user activity. Sophisticated analytics relate high-level identifiers and metrics to the low-level infrastructure utilization.

Figure 5:
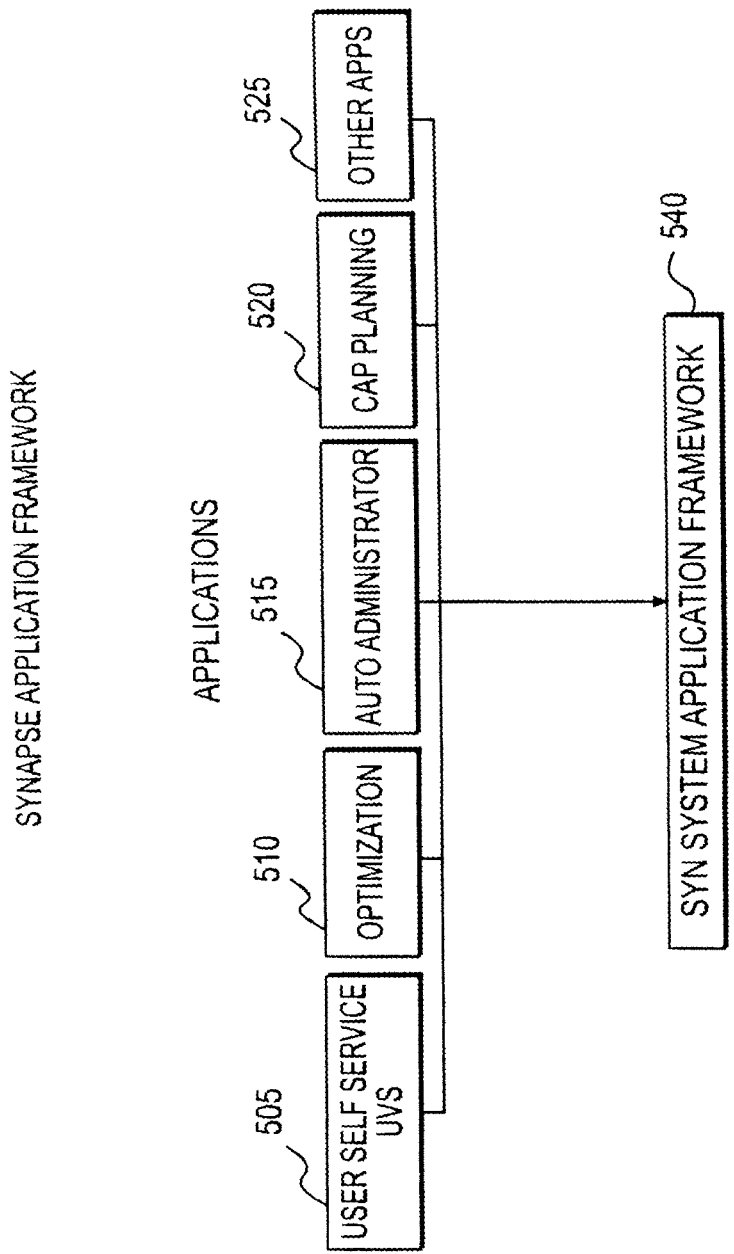
FIG. 5 illustrates example applications built on the Synapse System Application Framework in accordance with an embodiment of the invention.

FIG. 5 Synapse Value Application Scenarios

The Synapse System provides an Application Framework that enables the construction of a range of Synapse derivative applications using core Monitoring, Detecting, and Analytic capabilities provided by the Framework.

An example of an application built using the Synapse Framework, a Guest VM User Virtualization Self-Service Application, e.g., UVS provides a guest user interface to the virtual infrastructure. UVS enables a direct user feedback for example, to express dissatisfaction with the performance of a VM as experienced by the end user. The UVS user interface would report to the user, for example, the resources allocated to the VM, or the current resource contention (memory, CPU, disk I/O, network I/O, etc.), or predicted resource contention within a future time interval.

Another application is the Optimization Application which drives dynamic optimization of virtual infrastructure resources by user and application activity. Application Classification that drives resource allocation could be as a White/Black List of applications or it could be driven by what parts of an application are being used using Syn Agent capability. Application usage can dynamically drive resource allocation by business and/or application need.

Another example, an Automated Administrator Application, provides automated administrative tasks by provisioning prioritization and contracted SLA levels for application and user support as an optimization and prioritization system for delivering resources to a Vm. Interactive interfaces provides administrators with automated tools for scheduled or automated, interactive provisioning.

Accordingly, in embodiments, signals may be sent or made accessible, by the one or more computers, to a graphical user interface of an administrator display screen, based at least in part on the allocation data, to facilitate decision making and/or feedback on a dynamic distribution of the electronic resources to facilitate the user ID application and/or task to each of a respective third plurality of the user IDs.

Cap Planning is another Synapse application where dynamic resource allocation can change the manner in which virtual infrastructure is provisioned by maintaining SLA's with fewer resources. Furthermore Cap Planning benefits with Syn System increased granularity of application usage as driven by true business needs.

Accordingly, in embodiments, steps may be performed of setting, using the one or more computers, a respective resource cap or caps for one or more of the electronic resources, to be allocated to respective ones of the monitored electronic computers or systems or other monitored infrastructure. In embodiments, this may be used to set an upper bound on electronic resources. Further steps may be performed of obtaining a level of the electronic resources currently being used directly or indirectly by one or more of the monitored computers or systems; and changing, using the one or more computers, one or more of the caps, based at least in part on the level of the electronic resources currently being used directly or indirectly by the one or more of the monitored computers or systems. For example, a cap for one or more of the electronic resources for an application server may be changed, based on a number of user IDs that use the application concurrently, e.g., drive the web site serving the application, where the server frequently hits its electronic resources cap. As another example, one or more electronic resource caps may be adjusted for particular user IDs based on the application context IDs determined for these resource IDs. Thus, a user ID that uses primarily business related software may have one or more of its electronic resource caps increased, while a user ID that uses a game applications or performed Internet surfing may have one or more of its electronic resource caps decreased.

With many other applications enabled by the Synapse Framework, the preceding are some application examples made possible by dynamic resource allocation connected to user and application activity.

Figure 6:
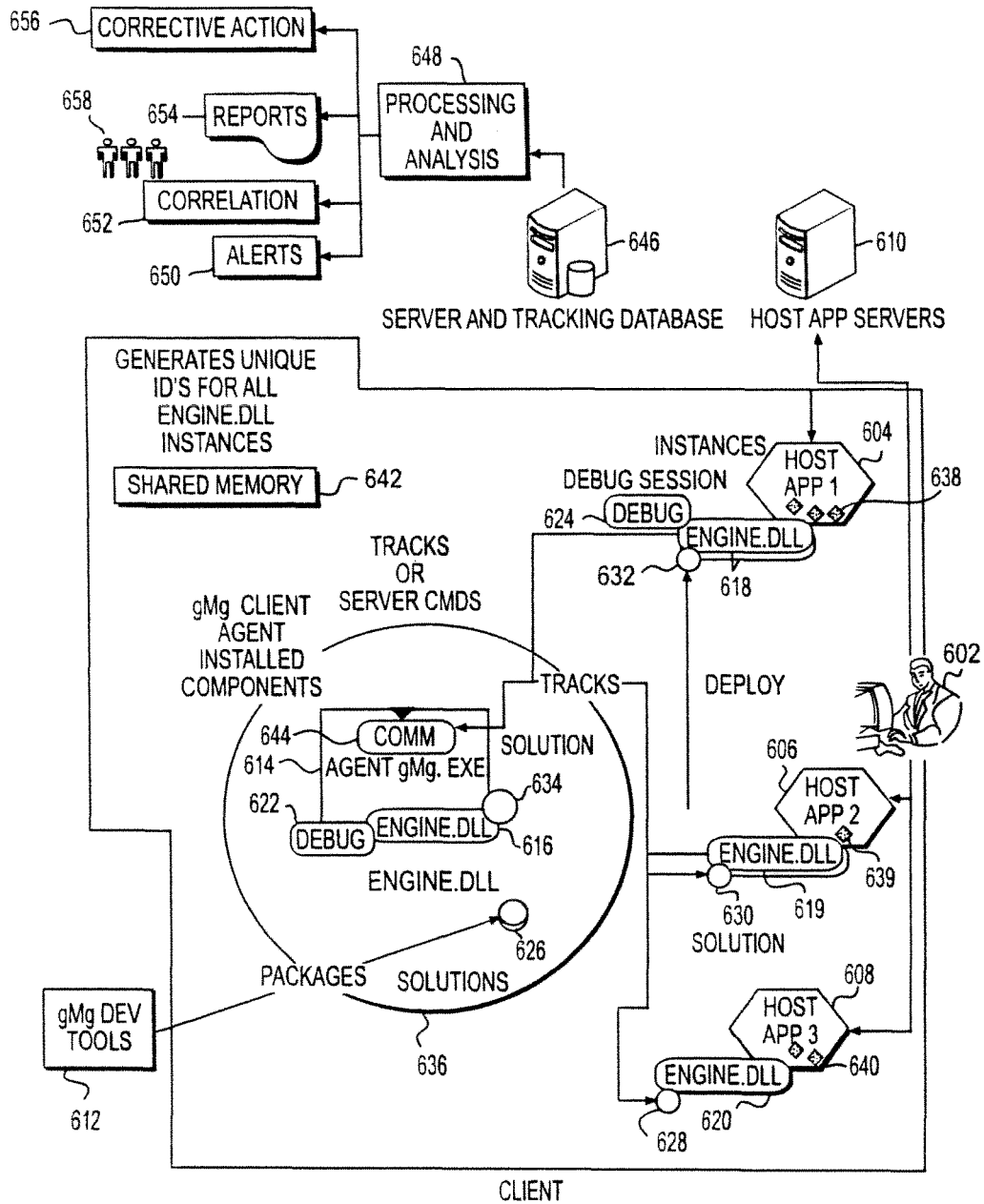
FIG. 6 illustrates Multi Instance Monitoring Agent in accordance with an embodiment of the invention.

FIG. 6 Multi Instance Monitoring & Detection Agent

This figure comprises FIG. 4 of U.S. 2007/0083813 (U.S. Ser. No. 11/248,981 that is incorporated by reference). The following passage describes the multi instanced monitoring Agent as described in the GMGD System application (refer to reference in the Reference section): "In one aspect of the Multi Instance Monitoring Agent," provided is a method for monitoring events derived from a computer target application presentation layer. The method including the steps of providing, independent of recompiling the target application's source code, a script running at a level within the target application. The script scans run-time instantiations of objects of the target application, and allocates structures in real-time to the object instantiations. These allocated structures may be adapted to create a reflection of the target application structure, which is used along with detected object instantiations that match a predetermined object structure to capture a portion of an environmental spectrum of the detected object.

In another aspect of the invention, a method processes state machine events occurring on at least one of a server machine and a client/localized machine, correlates the state machine events with the environmental spectrum, and deduces a user experience based at least in part on the correlated state machine events.

In yet another aspect of the invention, a system configured to monitor events in a computer target application presentation layer comprises a server and a client computer inter-connected on a communication network, where the server operating instructions include a monitoring program that includes a script operable to run at a level below the presentation layer. The monitoring program includes instructions to perform scanning of run-time instantiations of objects including method calls, method returns, and GUI objects of the target application, allocating structures in real-time to the object instantiations, adapting the allocated structures to create a reflection of the target application structure, detecting one or more object instantiations that match a predetermined object structure, and capturing at least the contents of the detected objects.

Figure 7:
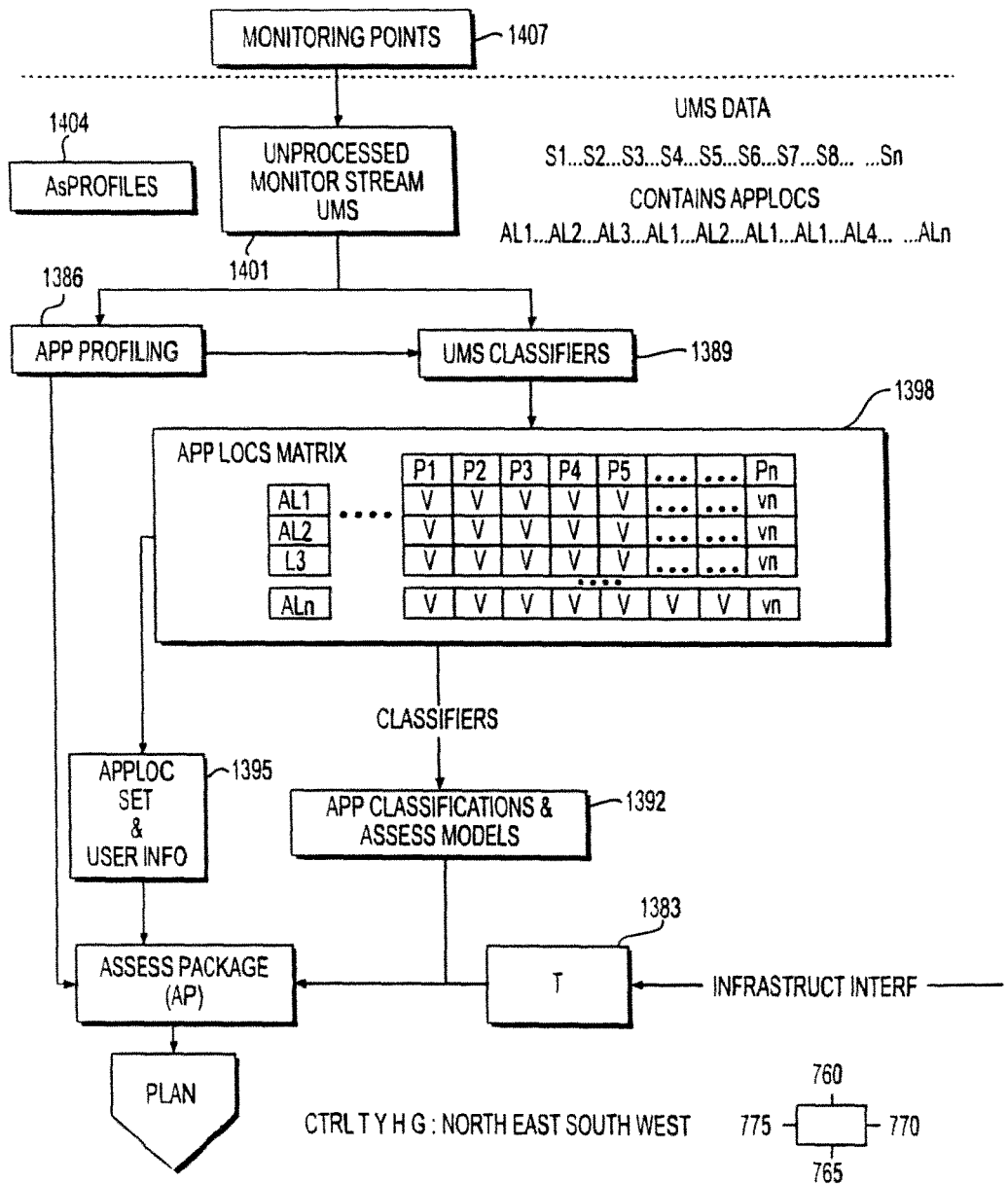
FIG. 7 illustrates Example Synapse Components in accordance with an embodiment of the invention.
Figure 8:
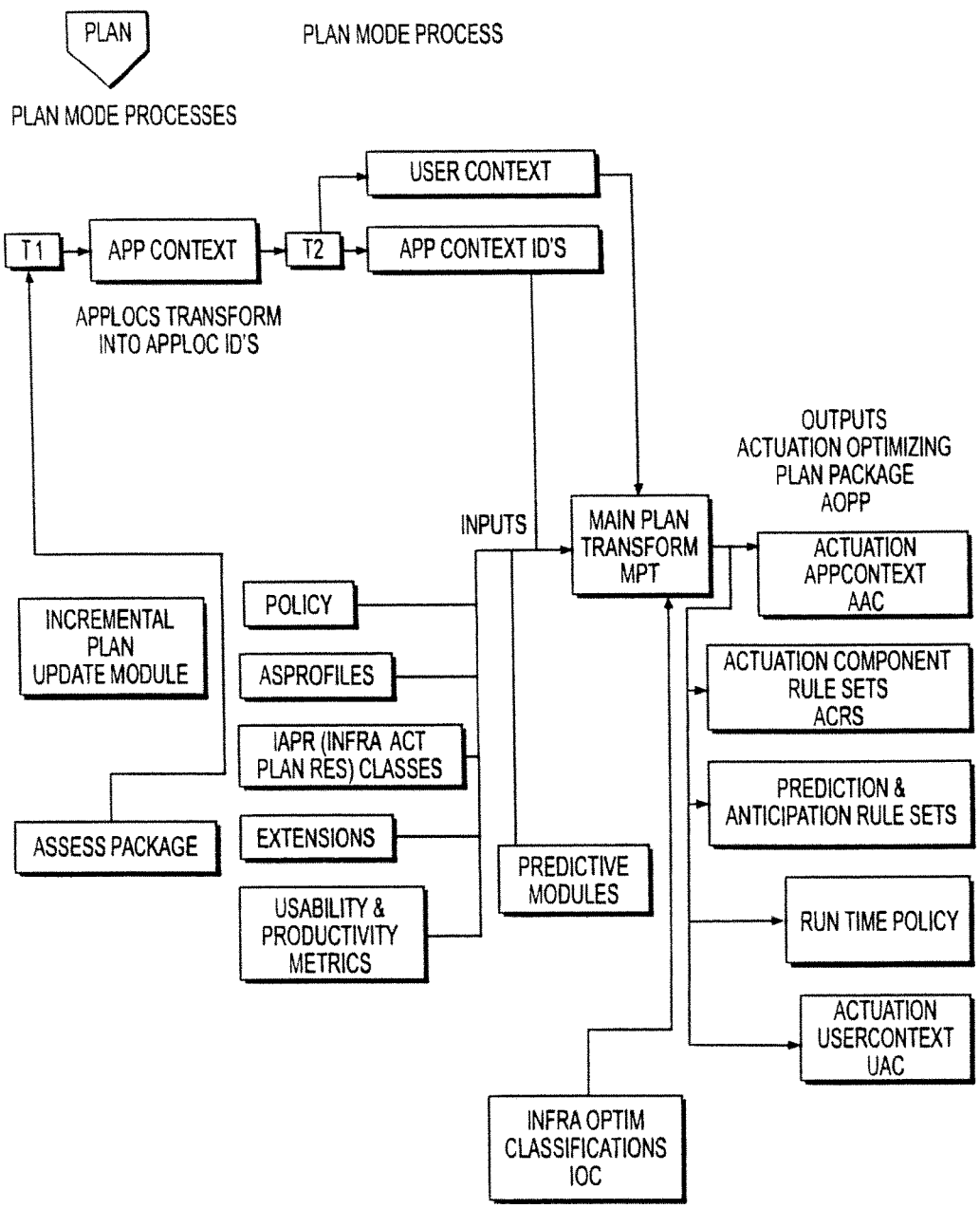
FIG. 8 illustrates the Plan Mode Process in accordance with an embodiment of the invention.
Figure 16:
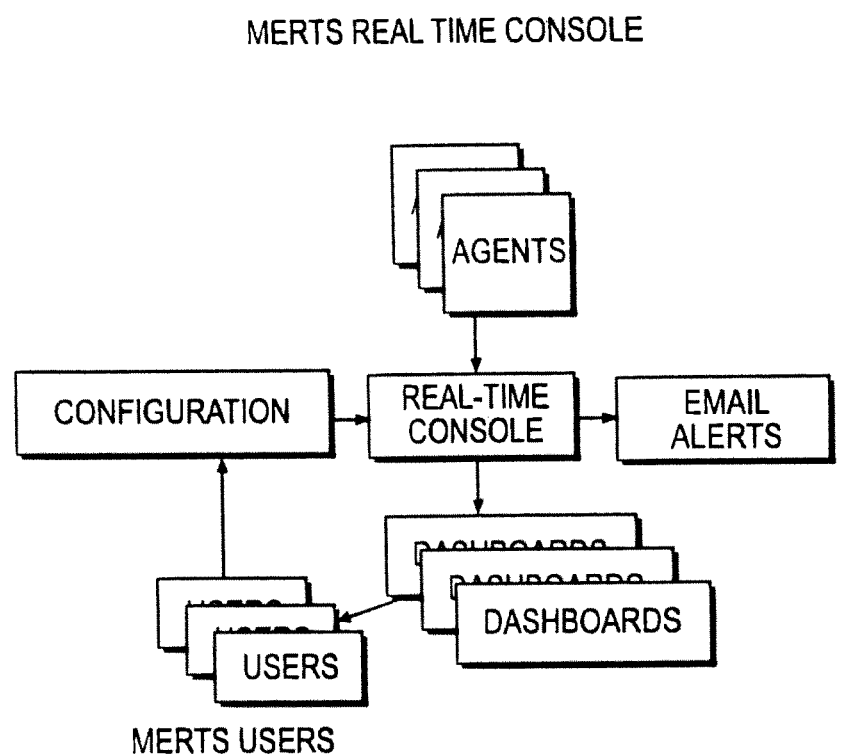
FIG. 16 illustrates an embodiment of a MERTS real time console.
Figure 18:
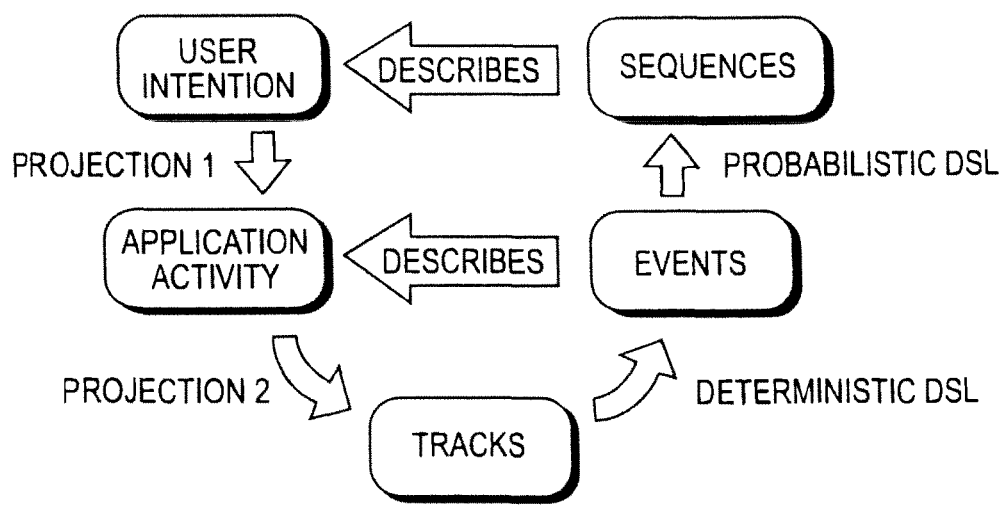
FIG. 18 illustrates an embodiment of DSL projections.
Figure 19:
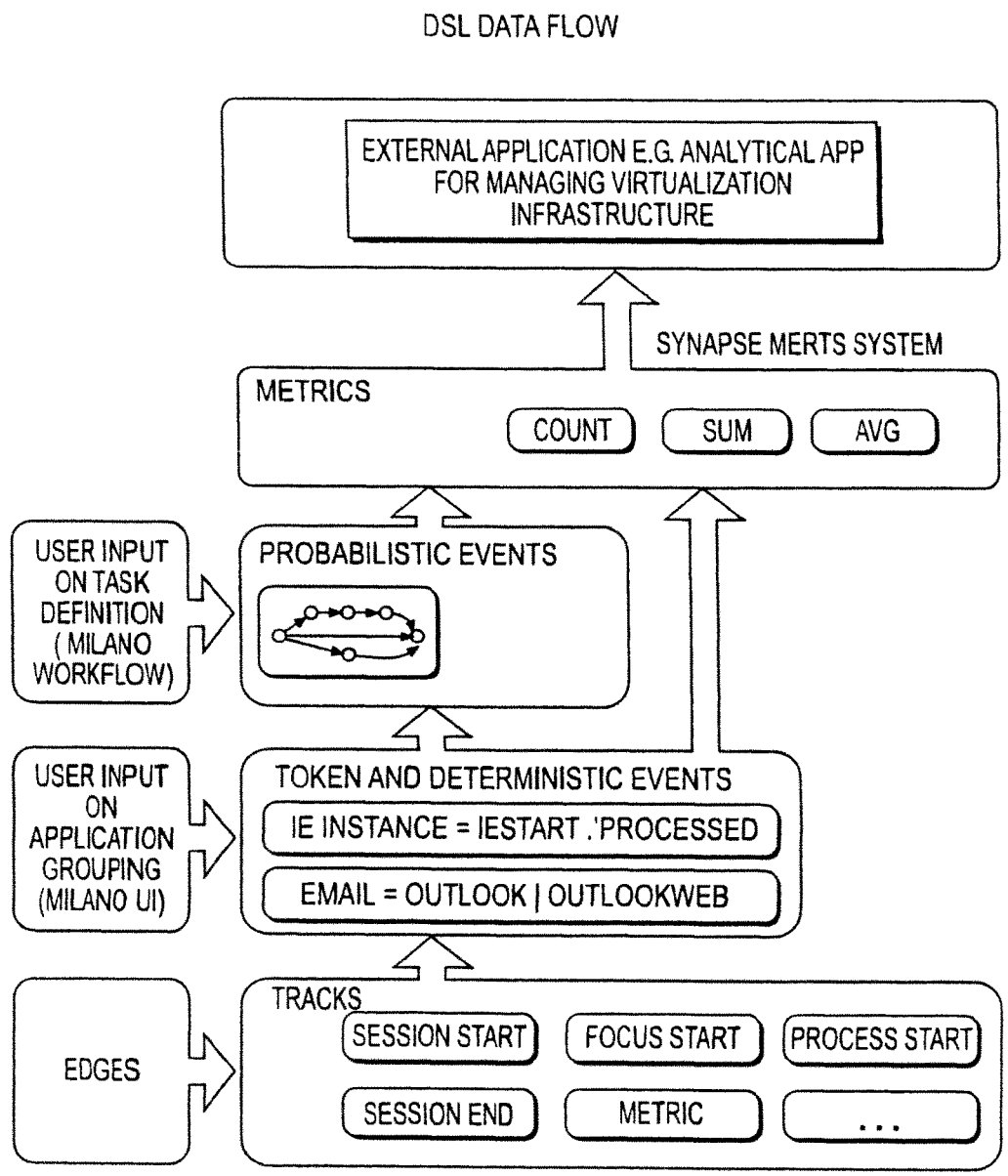
FIG. 19 illustrates an embodiment of a DSL data flow.
Figure 20:
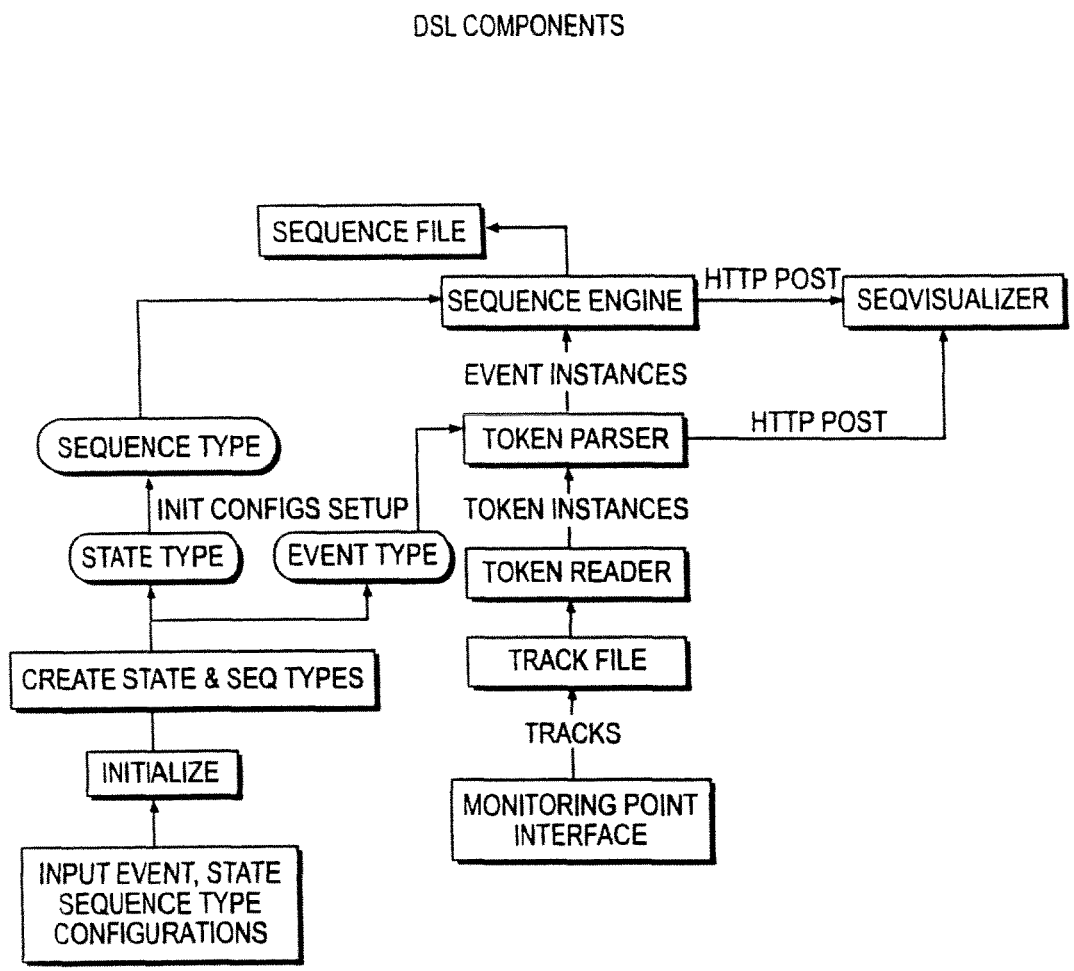
FIG. 20 illustrates an embodiment of DSL components.
Figure 21:
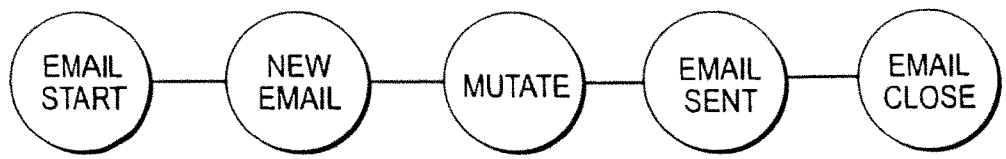
FIG. 21 illustrates an embodiment of a step order variation.
Figure 22:
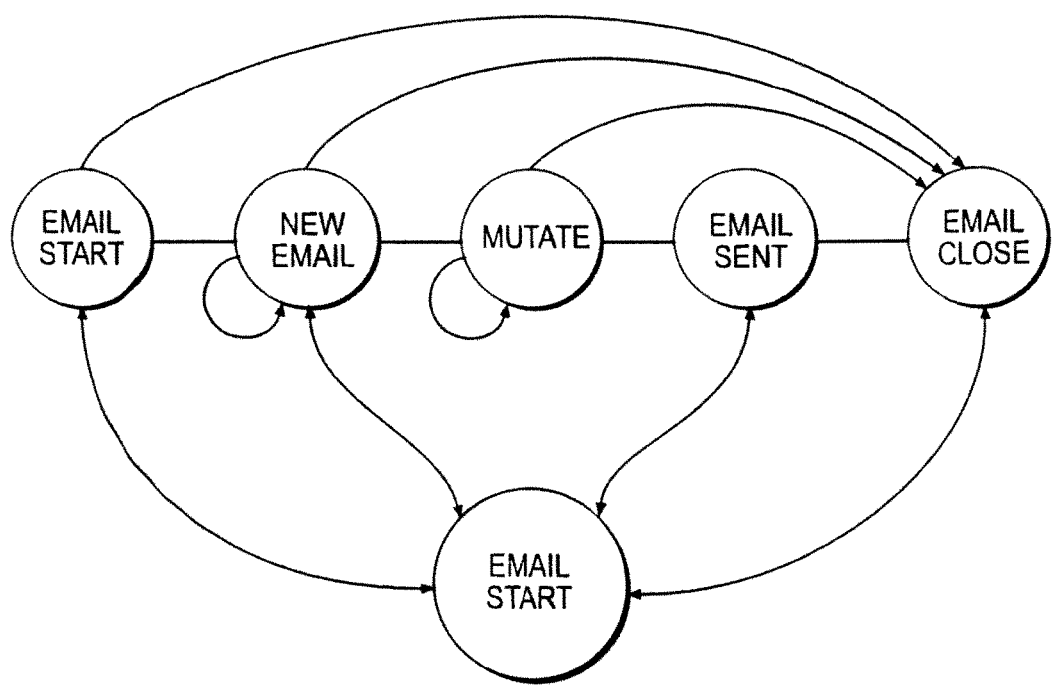
FIG. 22 illustrates another embodiment of a step order variation.
Figure 23:
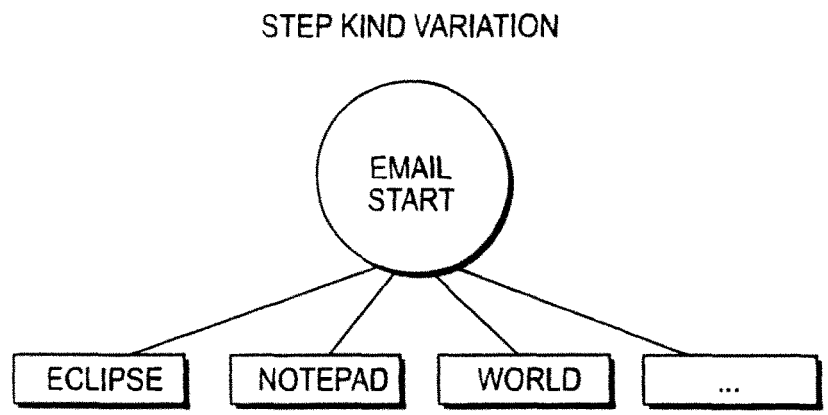
FIG. 23 illustrates an embodiment of a step kind variation.

Note the following figures referenced in the GMGD System, application describe numerous Synapse Agent (throughout referred to as the "Syn Agent") monitoring mechanisms and aspects of the Synapse "edge" Monitoring Points. In the description the GMGD System and Syn Agent may be held to be equivalent. Collectively the described "allocated structures to create a reflection of the target application" are the means to derive "Reflection Application Models" from live, running applications and provide a means of both monitoring and detecting. Figure references along with their accompanying text in U.S. Application publication 2007/0083813, now U.S. Pat. No. 8,079,037, to note are the following:

FIG. 3 "Monitor Targets" describes various data sources available in the operating system FIG. 4 "gMg System Component Overview" describes agent, engine, and interpreter components;

FIG. 5 "Event and Property Flow Overview" describe client server processing around events and properties of GUI structures;

FIG. 7 "Updating of the GUI Object Tree" describes the maintenance of the run time internal Object Tree that dynamically models Host Application user interface and other application related objects and events;

FIG. 8 "Object Tree gMg Events" describe how events are generated from changing (, e.g., Destroy & Create Events) User Interface run time objects;

FIG. 13 "Context and Multiple PopUp Windows" describe how differentiating context is created from similar and related PopUp objects;

FIG. 16 "Method Monitoring Overview" describes the gMg System's method monitoring techniques for performing method interception on a range of method types, e.g., COM, exported functions;

FIGS. 18 & 19 "Creation of a Method Monitor" & "Method Signature & Method Code Overlay" describe a technique for method interception using opcode (code) overlays;

FIGS. 20 & 21 "Thunk Allocations for Method Monitoring" & "Monitoring a Virtual Function Method" describe 2 types of method monitors, Thunk and Virtual functions;

FIGS. 22 & 23 "Monitoring a Method Return—Stack Copy" & "Monitoring Method Return—Stack Allocation" describe the interception of Method Returns;

Functional View

This section provides a functional view of the Synapse system. It is important to recognize that the decomposition into functional elements is only loosely related to the structural decomposition into individual software components. Functionally-related elements of the architecture may be distributed throughout the software components or subsumed into a single interface or protocol.

Before discussing the principle operational modes Assessor, Planner, Actuator from a functional perspective, first is a discussion on Model Control which is a principle in embodiments of the Synapse System.

Model Control

System Modeling

In embodiments, Synapse may employ anticipative control mechanisms that depend, in embodiments, on the ability of a model to predict the effect of an action on the future state—and to do so quickly, in time to influence the future prior to its unfolding. Due to the temporal, incremental nature of the sensing and control mechanism, an anticipative controller may require a model of both the system environment and the controller. In other words, the anticipative controller not only models future states of the system environment, but also models (perhaps implicitly) future actions that may be taken by the controller.

Synapse employs multiple, nested models for system identification, estimation, and control. Due to its distributed components, Synapse is an example of a networked control system.

Synapse utilizes a probabilistic modeling framework with a strongly Bayesian bias; where true probabilities are not available, suitable confidence measures may be employed for ranking and qualitative comparison of predicted classifications and responses. In embodiments, a prediction of a future need for electronic resources may be made based on current utilization and past history.

The Synapse identification, estimation, and control framework may comprise several pieces, comprised of off-line and on-line tasks. Off-line processing is employed to prepare sophisticated, yet compact sparse model representations for computationally efficient on-line estimation and control. Synapse seamlessly introduces the updated models into its on-line processing.

System Identification

Identification is the process by which a system or environment is characterized. It may include modeling the elements, relations, constants, and parameters that define the system.

In Synapse, system identification is primarily performed by the Assessor, and may comprise tasks performed off-line:

1. Identify and label common contexts [Cluster modeling];
2. Relate contexts to numeric metrics [Regression modeling].
3. Select observation variables of interest. [Variable Selection].

Data collected by Synapse derives from a diverse list of sources, and is often of high dimensionality. Hence variable selection may be a consideration in modeling the data. Variable selection can be performed as part of feature selection during pre-processing of the data (, e.g., via principal factor analysis), or as an integral part of the model optimization (by directly penalizing the use of variables in the learned model). As variable selection is one of the most difficult problems in machine learning, the precise approach taken depends strongly on the chosen algorithms. However, independent of the selection mechanism, Synapse employs an abstract data type for enumerating, ranking, and grouping variables. The associated data object is used to tune the collection, recording, and processing of attribute variables.

Another principal feature of the Synapse data may be the mixture of continuous, categorical, and structured variables. Machine learning methods may be typically optimized for one or the other of these variable types; mixing them in a model usually entails recoding variables to conform to the model. As with variable selection, Synapse may employ an abstract data type for capturing the value type of attribute variables. In embodiments, Synapse may utilize kernel-based and hierarchical graph-based methods for constructing models of mixed type.

Synapse takes a unified probabilistic approach to clustering, classification, and regression by consistent application of Bayesian principles. The use of probabilistic weighting of alternative hypotheses allows Synapse to respond smoothly to mounting or shifting evidence gleaned from complex system and user behavior.

State Estimation and Prediction

Estimation is the process by which the state of the system or environment is approximately determined from empirically measured data. Estimation is commonly referred to as smoothing, filtering, or prediction, based at least in part on whether the time point of interest coincides with the past, present, or future or the latest measurement.

In Synapse, smoothing and filtering may be performed by the Detector. Prediction is performed by the Predictor. The reason for this separation of function is that prediction in the Synapse context is dependent on the joint anticipative model of the system environment and controller.

Observation, Collection, Detection, and Prediction may be tasks performed on-line:
  1. Sample attributes of the system state and the Synapse internal state.
  2. Collect, encode, and record observations and other events.
  3. Classify the system state using the learned contexts [Classification];
  4. Estimate response metrics for a given context [Regression].

Synapse's estimation framework may be based at least in part on on-line recursive Bayesian inference. The Bayesian probabilistic approach provides a disciplined and consistent model for estimation that also fits naturally with the requirements of control engineering and policy-directed system optimization.

Control

Control is the process by which an input to the system is selected and communicated to an actuator, which effects a change to the system.

The problem of control in Synapse falls into the broad category of sequential decision-making under uncertainty. Uncertainty is modeled in two forms: exogenous (from outside) and endogenous (from within). An exogenous uncertainty is taken to be an input to the decision process and precedes the choice of action; an endogenous uncertainty follows (and is in part a consequence of) the choice of action. While formally equivalent, the practical benefits of choosing one model formulation over the other for a given problem may be both conceptual and computational. Conceptual, because mapping one type of uncertainty to the other involves some artifice and complexity. Computational, because the two formulations lead to markedly different algorithms and computational complexity.

Decision processes characterized by exogenous uncertainty may be the subject of stochastic optimization. Decision processes characterized by endogenous uncertainty may be the subject of Partially-Observable Markov Decision Processes (POMDPs) and stochastic control.

Synapse, being a multi-level hierarchical controller with nested sub-controllers, makes use of both of these branches of sequential decision theory. In particular, models with exogenous uncertainty may be useful for queuing models—at the highest levels, when dealing with resource reservations, and at the lowest levels, when scheduling individual resource requests. For the intermediate levels, endogenous uncertainty provides the more natural formulation. The remainder of this section focuses on the learning problem of the intermediate control levels.

Accordingly, in embodiments, resource allocation data may be sent, by one or more computers, to a plurality of nested-sub-controllers that each control an allocation of the electronic resources to a different respective infrastructure electronic component.

The Synapse control framework may comprise two pieces:
  1. Off-line, a priori planning, via the Planner;
  2. On-line, anticipative control, via the Controller.

Synapse employs techniques of reinforcement learning and adaptive control for modeling and actuation. Reinforcement learning is a framework in which a goal-directed agent learns a mapping from state context to action, so as to maximize the total reward metric associated with the sequence of state-action pairs. Adaptive control is a framework for modifying the parameters of a control system via an established strategy to improve performance. These two frameworks share common adaptive elements:
  1. Sensing of the environment.
  2. Identification (characterization) of the system and environment.
  3. Evaluation of the relative performance of the controller.
  4. Anticipation of the effect of changes to the controller.
  5. Corrective modification of the controller to improve performance.

In particular, it is the anticipative prediction model that separates these learning models from a classic, fixed controller.

Where the two frameworks differ is that reinforcement learning encompasses the exploration/exploitation trade-off: to maximize performance, a learning control system must prefer actions which are the known best for a given context, but to discover better actions, it must occasionally take actions other than the known best. This is termed exploring the policy space. Adaptive control assumes that the controller has been sufficiently modeled and parametrized so that modifications to the controller parameters (distinct from the control outputs) have a predictable effect on performance within the context of the system and environment.

Figure 28:
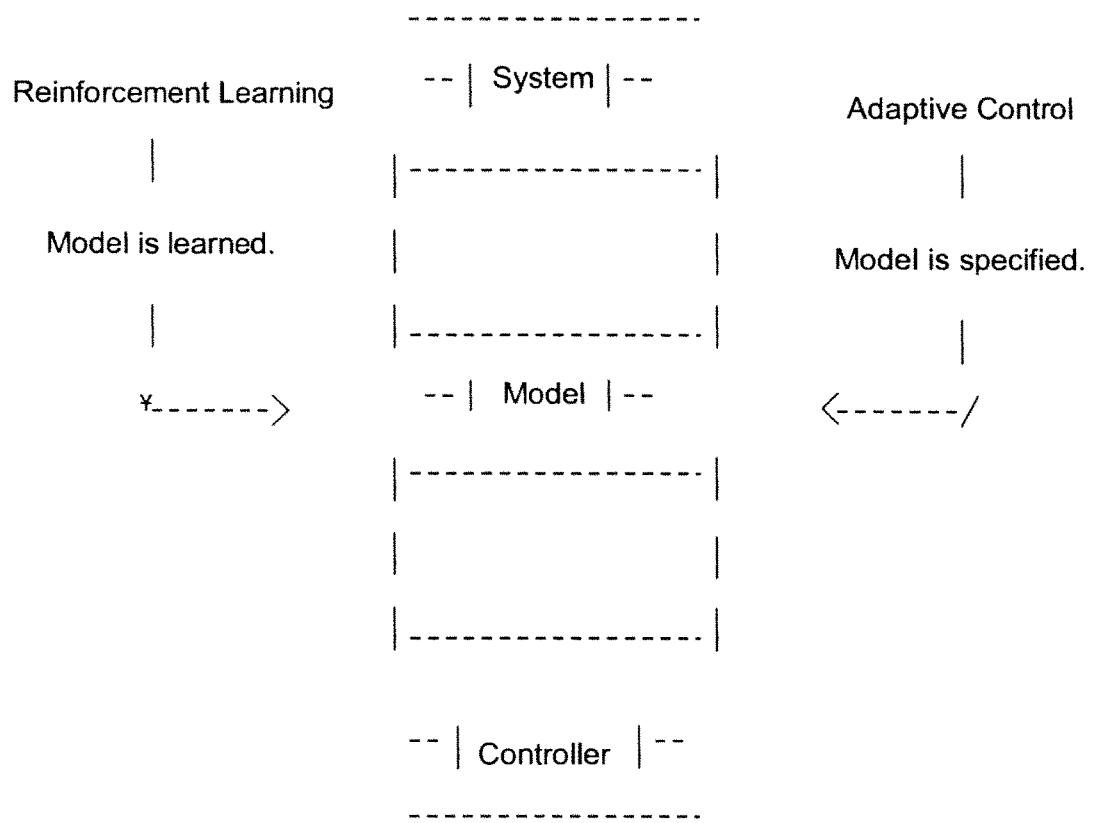
FIG. 28 illustrates a reinforcement learning in one embodiment.

Synapse employs techniques from reinforcement learning for characterizing the system/controller interaction. See FIG. 28. It does so in a careful, disciplined way, so as to avoid introducing instability into the system. Robustness is of paramount importance. In embodiments, the Synapse Planner and Controller share a hierarchy of sub-goals; they are, in order of precedence:
  1. Protect the hypervisor host from instability (thrashing or crashing).
  2. Protect each guest VM OS from instability.
  3. Provide minimal usability to all of the interactive VMs.
  4. Provide differentiated service to the VMs.

Synapse employs insights from the theory of network control systems to maintain stable operation despite occasional component and communication failures, and allows for graceful degradation of service in the event of partial failure or shutdown. These stringent requirements constrain the control law realizations, in several ways:
  1. Actuation must be sufficiently fast to maintain control.
  2. Exploration must be severely limited.
  3. Dynamic optimization is limited by the need to maintain stability despite partial failures of Synapse components.
    1. Synapse is fully operational
    2. Synapse is degraded or halted?

Synapse is a multi-resource controller; the primary controlled resources may be:

CPU:
  Renewable
  Partitionable with very fine granularity
Network I/O
  Renewable
  Partitionable with fine granularity
  Subdivided into: read/write X bandwidth/packets
Disk I/O:
  Renewable
  Partitionable with moderate granularity
  Subdivided into: read/write X bandwidth/requests
Memory: [In the short-run:]
  Non-renewable
  Partitionable with coarse granularity
  Subdivided into: shared and private The Synapse Controller is an example of a Multiple-Input-Multiple-Output (MIMO) controller. Due to the strong entanglement of resources (refer to the following paragraph), and the ability to partially substitute one resource in lieu of another, it is insufficient to control each resource independently of the others. Additionally, memory, as a non-renewable resource, is of a distinctly different character than the other controlled resources. Repurposing memory that is in active use requires disposing of the data contained therein; doing so generally requires the consumption of one or more of the renewable resources, either immediately (in the case of data which cannot be re-fetched or re-computed) or in the future (for data which is already stored persistently, or can be recomputed).

Entanglement is a term used to describe how computing resource consumption can be interdependent where the increase of one type can indirectly cause an increase in one or more resource types. While executing, computer programs utilize resources, e.g., cpu, memory, IO (disk), etc. in varying proportions. While a single low-level operation, e.g., part of a program could mainly use a single resource, a business activity or program which typically may be more complex almost always consumes some combination of resources, even if the program is known (often for convenience) to be seemingly bound by a single vector. For example, giving a CPU-bound program more memory would affect its CPU performance. Similarly, CPU pressure has impact on other vectors: CPU is generic common independent resource, Memory use requires some CPU cycles, or I/O use requires some CPU cycles (, e.g., swapping memory pages into hard drive). Generally speaking, no program always uses only a single type of resource. For example, if a program mostly uses CPU, optimizing Memory would have little effect, but optimizing CPU likely would have a large effect. Also, programs can sometimes behave as though they may be using multiple resources at once. Optimizing one resource would have no effect since the program could still be waiting to finish using other resources, e.g., for example, a program might perform CPU calculations while waiting for I/O to complete but Speeding up either resource alone would have no effect because the program would have to wait for other to finish regardless. Also, Memory and I/O use also involves CPU use or vice versa.

Accordingly, in embodiments, a generating allocation data step for allocating resources for synapse may comprise determining an interrelationship of at least the electronic resources of CPU cycles/bandwidth and disk input/output bandwidth, and/or memory that provides a response time latency of less than a first level and memory, and generating the allocation data based at least in part on this determined interrelationship.

The Synapse Resource Profiling, utilizing the Synapse Controller, analyzes programs for this problem and at run time uses Resource Indexing Profiles as a strategy for more precise anticipation of resource consumption.

Thus, it may be useful to determine an interrelationship of at least two of the electronic resources from the group of CPU cycle allocation and disk input/output bandwidth allocation and memory allocation, with respect to their joint collaborative effect on application performance. Accordingly, in embodiments, a step may be performed of determining a relative allocation level for two or more of the electronic resources selected from the group of CPU cycle allocation, disk input/output bandwidth allocation and memory allocation, to obtain a level of application performance. In embodiments, a further step may be performed of generating adjustments in the allocation levels of the electronic resources, by the one or more computers, to optimize overall performance of a respective one of the monitored computers. In embodiments, this optimization may be based at least in part on a measure of RTI (response time indicator) relative to a given RTI level, which given RTI level may be a predetermined level, or may vary based on one or more parameters.

This ends the discussion on Model Control. The next major areas discuss the principle operational modes from a Functional perspective, data transformations, and how Control techniques apply to the Synapse System for the objective of Actuation. This discussion also traces the functional flow between the major operational modes and steps in construction and transformation leading from Assessment, Planning, then to Actuation.

Assessor

The Assessor analyzes data logged by the Monitoring Point Observers [, e.g., Syn Agent], as outlined in the System Overview and in FIG. 6. Inputs to the Assessor include the Observations, as recorded by the Monitors and persisted in a Datastore, The Assessor outputs an Assessment comprising of Assessment Analysis Model (parameters), and contextualized Activity/Resource Profiles.

FIG. 7 Assess Application Context Identifier Construction & Transformations

Within Assess Mode Processing, given any or all of the Monitoring Points and respective Monitoring Types data streams, e.g., string data is monitored and collected from designated sources. In the example of the Synapse Agent [FIG. 6], there can be many string stream sources such as from the Document Object Model (DOM) of a web page, or from various subscription services or call backs from different Microsoft Windows API's, from Win32 API's, HTTP monitors, URL monitors, and so on.

In an example web application to be discussed in the following sections, URL strings are monitored, captured, and forwarded to an upstream tier for storage and subsequent processing, here represented as an Unprocessed Monitor Stream (UMS). UMS data is processed to identify App Locations where an App Location is a persistent, and location identifying structure expressed in any number of types as a function of a monitoring source, where a type could be a string, a numeric value, a code, a protocol, and so on.

It is to be noted that from a given set of UMS strings (, e.g., URL strings in the given example), e.g., $S1 \ldots S2 \ldots S3 \ldots S4 \ldots S5 \ldots S6 \ldots S7 \ldots S8 \ldots Sn$, a subset of Application Location identifying structures, e.g., $AL1 \ldots AL2 \ldots AL3 \ldots AL1 \ldots AL2 \ldots AL1 \ldots$ AL1 ... AL4 ... ALn can be targeted to reflect typical user behavior when interacting with an application, namely, a user almost always navigates to the same location more than once and often repeatedly. This is demonstrated in the simple example where AL1 repeats multiple times. This illustrates a common scenario. As the user enters the same app location executed at different times in different contexts, the Synapse Monitoring point captures application resultant data in this example, as string data. The assumption is that there is a string, e.g., represented by ALQ (where Q=1 thru N) found to be common within different members, e.g., (S1, S2, ... Sn) of the UMS string set that represent the same app location but within different contexts. The UMS Classifier searches for such common patterns, e.g., string patterns, using any of a wide range of techniques known in the art. One example is Patricia Tries aka Prefix Tries, which can rapidly classify relatively unstructured UMS data. Shown in the AppLocs Matrix is a column of App Locations containing AL1, AL2, ... ALn with correlated columns labeled P1, P2, ... Pn representing various record variables and parameters associated with a given App Location. Parameter examples may be statistical counts, instances, locations for filling in run time instance data, associated resource profiling and so on. These various strings of run-time data may be used to determine the first rule set for detecting/indentifying an application running on a monitored computer.

In embodiments, one or more rules of the first rule set may be generated by identifying, by the one or more computers, respective strings in the run-time data; determining token (e.g., classification) labels for elements in the respective strings, by the one or more computers, for selected ones of the respective strings based at least in part on a tokenizing rule set; reordering where appropriate, by the one or more computers, the elements in one or more of the strings based at least in part on one or more rules in the tokenizing rule set; and creating a rule in the first rule set for an application context ID, based at least in part on a selected one of the strings.

For example, there may be a set of tokenizing rules for tokenizing different types of detected strings. Thus, there may be a rule set for tokenizing URL strings. There may be a rule set for tokenizing a Windows string. There may be a tokenizing rule for program parameters. One example, a window titles like "SomeFile.txt—Text Editor" could be reordered like "Text Editor—SomeFile.txt" which allows grouping all Text Editor activities together as a group with a rule in the first rule set.

As another example for the URL string, URL token rules may be applied to tokenize the strings like "yahoo.com/automobiles/American/Chevy" and "yahoo.com/trucks/American/Chevy." The string might be reordered like "com.yahoo/American/Chevy/automobiles" and "com.yahoo/American/Chevy/trucks" so that yahoo is in the .com website group and also trucks and automobiles are in a single group American/Chevy and can be given a single rule in the first rule set.

Assessor Dashboard Observers (As)

Observers monitor events & aggregate statistics from multiple system components. Some examples may be system-level hypervisor and per-VM statistics, per-VM App/UI-level statistics, such as latency, or Business-relevant contexts and statistics, such as work task selection.

Data is collected from multiple Monitoring Points throughout the virtual infrastructure: for example, the Synapse agent collects data from within the VM operating environment. Another is a hypervisor statistics collector that uses hypervisor-provided APIs to collect per-host, and per-VM statistics. Another is a network switch tap that intercepts networking traffic in-flight to monitor networking activity.

Planner

FIG. 8 Planner

The Planner receives Assessment output, processes it against Policy, and outputs Rule and Configuration Sets for a range of Actuation components. For example, the Planner applies the Policy to the received Assessment (output) to optimize an Observer (for Monitoring), a Detector (for state estimation), a Predictive Modules (for state prediction), a Launcher (for Admission control) and a Controller (for Actuation).

Next, the Planner in its Plan Mode Process, marshals numerous inputs and constructs Application Context Id's, within the Main Plan Transform (MPT) component. For example, the AppLoc Set, e.g., the Application Location Set produced by the Assess Mode Processing describes persisting identifiable application locations that reflect the host application that a user interacts with. Input into the T1 Transform causes an Application Context to be produced. An App Context is defined as a state of the application that is a higher level grouping of a set of one or more App Locs, or specific string subsets, e.g., URL's. The Application Context is a necessary step in processing to reduce the "resolution" of the analyzed application structure and to provide a range of states that can be reduced to a more generalized state for any given Application Location. Once App Contexts may be delineated, then the process of adding App Context Id's is executed. An App Context Id, or identifier, or label, provides a unique handle for a given App Context that is assigned to each member of a set of Application Locations comprising a global perspective of the host application. Note that App Locations may be empirically derived, as opposed to projected or generated, and is mapped over time across a monitored and merged user base of any size.

Another input to the MPT is a Policy that provides a normative control model based at least in part on declarative rules. Refer to the discussion in the section labeled "Policy Manager" (FIG. 8 discussion) in the application's description. Another input is the Assess Profiles that include users, roles, application profiles reflecting application resource requirements.

Another input to the MPT may be the Infrastructure Optimization (10) Classifications. The IO Classifications may be important predefined structures that reflect vendor specific interfaces and mechanisms for resource optimization and management facilities within Infrastructure, in particular, Virtual Infrastructures (, e.g., virtually managed CPU, Memory, I/O, or Network resources).

Another input to the MPT is the derived User Context which includes user quantification profiling based at least in part on empirically collected behaviors and tendencies, user roles, and other user related criteria.

There may be several outputs of the Plan Mode Processing. One is the Actuation App Context (AAC) that may comprise AAC_Structure containing both Plan Mode Processing generated data as well as containers, parameters, or variables to collect run time data. For example, the AAC_Structure can contain a Plan Mode Process generated Application Context Id and a data store for dynamic Instance data collected at run time. Run time Instance data can be divided into 2 parts: Synapse Internal and Synapse External where the Internal is for any required mechanism of the Synapse System such as the detection or monitor means of any Monitoring Point, e.g., conditional regular expressions, and External refers to the detection or monitor means, e.g., metrics and data extracted from externally monitored Infrastructure. Sets of Actuation Rules may be provided to articulate run time detection behavior for different Synapse Actuation Components, e.g., Device, Client, Server, Infrastructure Agents, or for accessing Infrastructure features via provided API's and interfaces. Examples of Rules may be detection conditional expressions that selectively trigger events when monitored streams contain targeted patterns, or when a client monitored VM metric attains a threshold percentage coupled with variable counts generate an event for further processing on another tiered server component. Another example output are the Synapse Infrastructure Optimization Classifications (IOC). Infrastructure Vendors provide interfaces for resource management that can be programmed such as VMware's Shares, Limits, and Reservations in the ESX hypervisor product. Refer to the reference "Resource Management with VMware DRS" white paper for information of VMware's resource management and adjustment mechanisms.

When components are in an Actuation Operation Mode, the IOC's may be used as targets, With an Application Context Id, Actuation Rule Sets detect in the Monitoring Point, a run time condition or event resulting from a user's interaction with an application. The detected event is forwarded to Synapse server components which evaluate global and Infrastructure conditions. Once an Actuation Event is generated and queued for execution, the IOC parameter determines the appropriate resource allocation assigned by predetermined and a Plan pre process. The IOC value is by default static but also can be enabled to be set dynamically.

In embodiments, a Plan Mode Processing output may be the Anticipation Rule (PAR) Sets. The PAR Sets use a range of techniques (e.g., looking at past patterns of usage to make prediction of future expectations of patterns of activities) that statistically predict user and hence application behaviors or usage and consequent resource demands and Infrastructure. Within the Prediction module is also the Anticipatory module which having less statistical certainty, nevertheless provides indicators for the Prediction module to drive resource requests within an acceptable certainty range, e.g., is statistically significant enough to justify Infrastructure resource redistribution.

It should be noted that controllers are generally reactive. In embodiments, a prediction of resource needs may be made based at least in part on a database containing a past history of electronic resource usage by respective applications and/or respective user IDs. Such predictions of future electronic resource needs, in embodiments, may comprise, after detection of an application context ID for a particular application, the system thinks with a probability of 80% based on past history as reflected in a prediction rule set, that the monitored computer accessing this application will require an increase of resources to a certain level within 2 minutes, or has initiated a task that normally takes 4 hours. In essence, in embodiments the system may use past patterns of electronic resource usage that have been recorded associated with an application context ID, or associated with an application context ID detected for a particular user ID, which user ID may in embodiments, be in a set of user IDs, e.g., user IDs in the accounting department, or associated with a set of application context IDs that have been detected, to name a few. This may be viewed as a correlation between electronic resource usage and the detection of various applications and/or user IDs.

Accordingly, in embodiments, steps may be performed of detecting, by one or more computers, a pattern comprising one or more selected from the group of an application, a combination of applications, and a combination of an application used by a specified one of the user IDs; determining a prediction rule for the determined pattern, by the one or more computers, from a prediction rule set, wherein the respective prediction rule in the prediction rule set is based at least in part on a past history of usage of the electronic resources when the pattern is detected; determining, by the one or more computers, prediction data for electronic resources that may be used at a future time or during a window of time when the pattern is detected based at least in part on the prediction rule set; and using the prediction of electronic resources, by the one or more computers, in one selected from the group of generating of the allocation data for the electronic resources and providing data or making the data accessible electronically that indicates a need for additional electronic resources. Thus, in embodiments, a preemptive adjustment of electronic resources may be made in anticipation of need to increase electronic resources for one or more of the monitored computers. This preemptive adjustment of electronic resources may be initiated by an instruction from an agent at the monitored computer, or may be initiated by an instruction from an administrator computer. In embodiments, data on the prospective need for an adjustment of the electronic resources for one or more monitored computer systems may be provided to or made accessible to an administrator computer for display on a computer screen or other use by the administrator computer.

In embodiments, use of the prediction of future electronic resource needs in generating the allocation data or providing of the data indicating a need for additional electronic resources may be performed only when a predicted level of electronic resources exceeds, or exceed by some amount, a current level of the electronic resources allocated to the monitored computer, or monitored system or other monitored infrastructure component. Note that in embodiments, the amount may be predetermined, or may vary based on one or more parameters such as time of day or time of month or identity of the user ID or the type or identification of the particular application or a combination thereof.

As noted, in embodiments the preemptive adjustment of the allocation data may be performed in whole or in part by agents. Thus, in embodiments the agent may take into account at least in part the prediction of electronic resources to thereby increase or to decrease a level of the electronic resources allocated to be allocated to a respective monitored computer, or set of computers, or a monitored system, wherein the agent comprises a set of programming code stored on a computer-readable medium, configured for executing at run-time, on a monitored infrastructure component.

In embodiments, a step may also be performed of aggregating, by the one or more computers, predictions of electronic resources that may be used at a future time or in a window of time, for shared electronic resource pools, to obtain a predicted shared resource total. Then in embodiments, the step may be performed of generating and sending or making accessible, by the one or more computers, data for an administrator graphical user interface showing an indication of electronic resource needs based at least in part on the predicted shared resource totals, and/or may automatically make adjustments to increase resources allocated to a shared resource pool. Note examples of such shared resource pools may comprise a vm host hosting multiple virtual machines, e.g., desktop computers and/or backend servers running as virtual machines.

In embodiments, an increase of electronic resources may be accomplished by migrating a server (for example, when determined not to be busy) to another shared resource pool for a period of time or a time of the month (e.g., the accounting department must complete month end reports) or until a task or business process is completed or based on some other parameter.

In embodiments, the prediction rule set may be generated by accessing, by the one or more computers, memory storing a past history of user ID interactions with applications (e.g., with associated application context IDs) correlated with electronic resource usage associated with use of the respective applications. For example, every time application X is detected, or every time application X is detected associated with a particular user ID, a certain level of electronic resources are used. In embodiments, the time and/or date of the electronic resource usage may also be correlated with the respective applications and user IDs. Then a prediction rule set make be generated from these correlations, by the one or more computers, for detected applications, by themselves, or detected in association with a particular user ID, or detected in a certain time of the day or time of the month, or detected in combination with other applications, to name a few.

Accordingly, in embodiments, the steps may be performed of accessing, by the one or more computers, memory storing correlations from a past history of user ID interactions with applications correlated with electronic resource usage over time associated with use of the respective applications or application patterns; and generating, by the one or more computers, a prediction rule set from these correlations, by the one or more computers, for detected applications based on one or more parameters, wherein a respective one of the rules in the prediction rule set comprises a predicted level of one or more of the electronic resources when a respective application or application pattern is detected. In this context, the term "application pattern" comprises an application correlated with one or more selected from the group of other applications, user IDs, time of day, date, to name a few.

There may be situations where selected users perceive a slow system response time, e.g., momentary slowdowns, while the overall average system response time is acceptable. Such slowdowns may be detected by the system, for example via a RTI (response time indicator) measurement, and/or the system may detect a query or a complaint from a respective one of the user IDs. In embodiments, a substantially real time electronic resource adjustment may be made to rectify this perceived slowdown. For example, data may be generated to steal CPU cycles from a monitored computer or other electronic infrastructure component and to provide those cycles to the user with the perceived slowdown. The determination of from which monitored computer or user ID to decrease the allocation of electronic resources may be made based on past patterns of electronic resources by the monitored computers and/or the user IDs. Such past patterns may be reflected as rules in the prediction rule set. For example, patterns of electronic resource usage may show that two user IDs do not use the same level of electronic resources at the same time, and/or that user IDs in certain departments do not use the same level of electronic resources at the same time, to name a few. Thus, electronic resources may be increased for one application or user ID by taking electronic resources from one or more other user IDs, but with the electronic resources returned when the task or process is completed. In essence, there may be a shifting of electronic resources between or among user IDs, not based primarily on priority, but based on electronic resource usage history.

Accordingly, in embodiments, a method, may comprise receiving or obtaining, by the one or more computers, slowdown data indicating a slow down of a first one of the monitored computers (e.g., a RTI (response time indicator) measurement, and/or a query or a complaint from a respective one of the user IDs, to name a few). In embodiments, the system perform the step of determining, by the one or more computers, a resource shift rule applicable at a time of receiving or obtaining the slowdown data, the resource shift rule for taking electronic resources from one or more other monitored computers, the resource shift rule comprising a shift pattern comprising one or more selected from the group of a time of day, a day of the month, a company department, an application, wherein the respective resource shift rule in the resource shift rule set is based at least in part on a past history of usage of the electronic resources when the shift pattern is detected. Then the system may perform the step of determining, by the one or more computers, using the resource shift rule, the one or more other of the monitored computers from which to take the electronic resources. Then the step may be performed of generating automatically allocation data, by the one or more computers, for shifting additional of the electronic resources to the first monitored computer, to be taken at least in part from the one or more other monitored computers only on a temporary basis and then returning the electronic resources allocated to the first monitored computer and the other monitored computers to previous levels before the shifting.

In embodiments, the resource shifting may be configured to only take place under selected circumstances, e.g., a particular user ID need the resources or a particular application or task is being performed, to name a few. Thus, in embodiments, steps may be performed of monitoring, by one or more computers, a plurality of monitored computers; and detecting from a plurality of the monitored computers, by the one or more computers, respective data patterns, with each data pattern comprising one or more selected from the group of an application context ID, a combination of application context IDs, and a combination of an application used by a specified user ID, wherein the generating automatically allocation data for shifting additional electronic resources is performed only when predetermined data patterns from the plurality of the data patterns are detected.

Accordingly, in embodiments, a method may comprise steps of determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications; receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, object events, dynamic GUI objects, wherein the object events and dynamic GUI objects comprise at least one selected from the group of operating system events, application events, and web browser events generated or affecting directly or indirectly the respective monitored computer and network events; determining, by the one or more computers, respective application context IDs for applications and/or respective locations within applications running on the respective user IDs of a second plurality of the user IDs, based at least in part on the first rule set. In embodiments, the method may further comprise accessing, by the one or more computers, a prediction rule set for one or more selected from the group of applications and each of a third plurality of the user IDs, wherein the prediction rule set for a respective one of the applications or a respective one of the user IDs is based at least in part on a past history of usage of the electronic resources when the respective application is accessed or for the respective user ID when accessing the respective application; determining, by the one or more computers, a prediction of electronic resources that may be used at a future time or window of time by the respective one application based at least in part on the prediction rule set; and using the prediction of electronic resources, by the one or more computers, in one selected from the group of generating allocation data and providing or making accessible an indication of a need for additional electronic resources.

In embodiments, an agent, comprising a set of programming code stored on a computer-readable medium, configured for executing by the one or more computers, at run-time, may performs the steps: monitoring, by the one or more computers, a monitored computer of a respective one of the user IDs to obtain the run-time data; and detecting, by the one or more computers, whether a pattern in the run-time data corresponds to a rule in the first rule set that designates a respective one of the application context IDs.

In embodiments, the agent may further perform the step of generating and sending, by the one or more computers, an actuation request to provide or to modify one or more of the electronic resources provided or providable to or associated with the monitored computer and that is locally controllable by the agent.

In embodiments, the agent may further perform the step of generating and sending, by the one or more computers and one or more electronic networks, an actuation request to change a level of the electronic resources provided or providable to monitored computer, to an actuation manager program running on one of the one or more other of the computers, which actuation manager program oversees control of electronic resources outside of control of the respective agent.

Planner Configuration Data

Planner Configuration Data models and estimated parameters, policy, and control laws, and general configuration data may be stored in the serialized object store.

Policy Manager (P)

The Policy Manager manages a normative control model, based at least in part upon declarative rules, constraints, and values. The Policy Manager Model encodes business rules, such as the relative value or priority given to a variety of business and non-business tasks. Other objectives and requirements, such as UI latency targets and limits, may be encoded using hard and soft constraints.

The Policy Manager has access to pre-defined value templates targeted to common business objectives (such as discouraging use of social media apps for most users). Additionally, the Policy Manager provides reasonable defaults for usability constraints and targets.

Actuator

Figure 9:
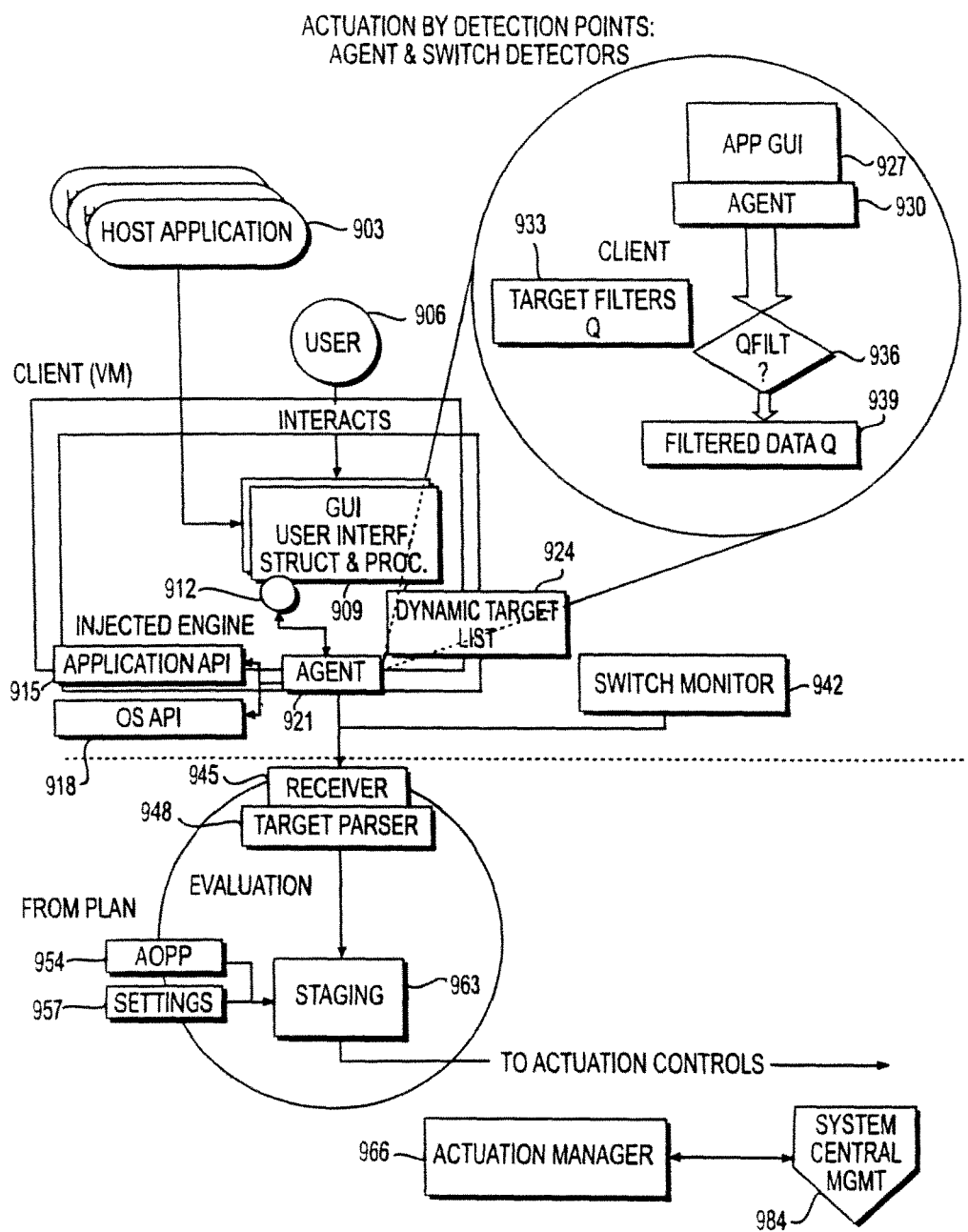
FIG. 9 illustrates Actuation by Detection Points: an Agent or Switch Detectors accordance with an embodiment of the invention.

FIG. 9 Actuation Detection Points: Detector (A)

Using Agent or Agentless (, e.g., Switch Monitor) technologies, user and application activity is Detected at the client tier (edge) as a user interacts with a business application when events may be detected that are associated with collected properties (that enable the mapping of ACI Structures in subsequent processing). This capability is enabled via the Synapse Agent (FIG. 6) that facilitate API calls to Application, operating system, and container applications to extract relevant solution data. Target Filters reduce data load to a more manageable size by selecting the most relevant data that supports Synapse Mode Processing. Staging includes processes such as de-multiplexing incoming data from many users, reduction, and error handling. The delivered AOP (Actuation Optimization Plan) Package is applied to the Staging step. The Actuation Manger manages all server components and communicates with the System Centralized Management FIG. 4 for mode control, global commands, etc.

Accordingly, in embodiments, steps may be performed of filtering, by the one or more computers, the run-time data to select only data that fits patterns set forth in the first rule set. that supports Synapse. In embodiments, the filtering step may be performed by agents, wherein a respective one of the agents comprises a set of programming code stored on a computer-readable medium, configured for executing at run-time, on a monitored infrastructure component. If incoming data does not match or correspond to any pattern for which there is a rule in the first rule set, then that data is filtered out.

Figure 10:
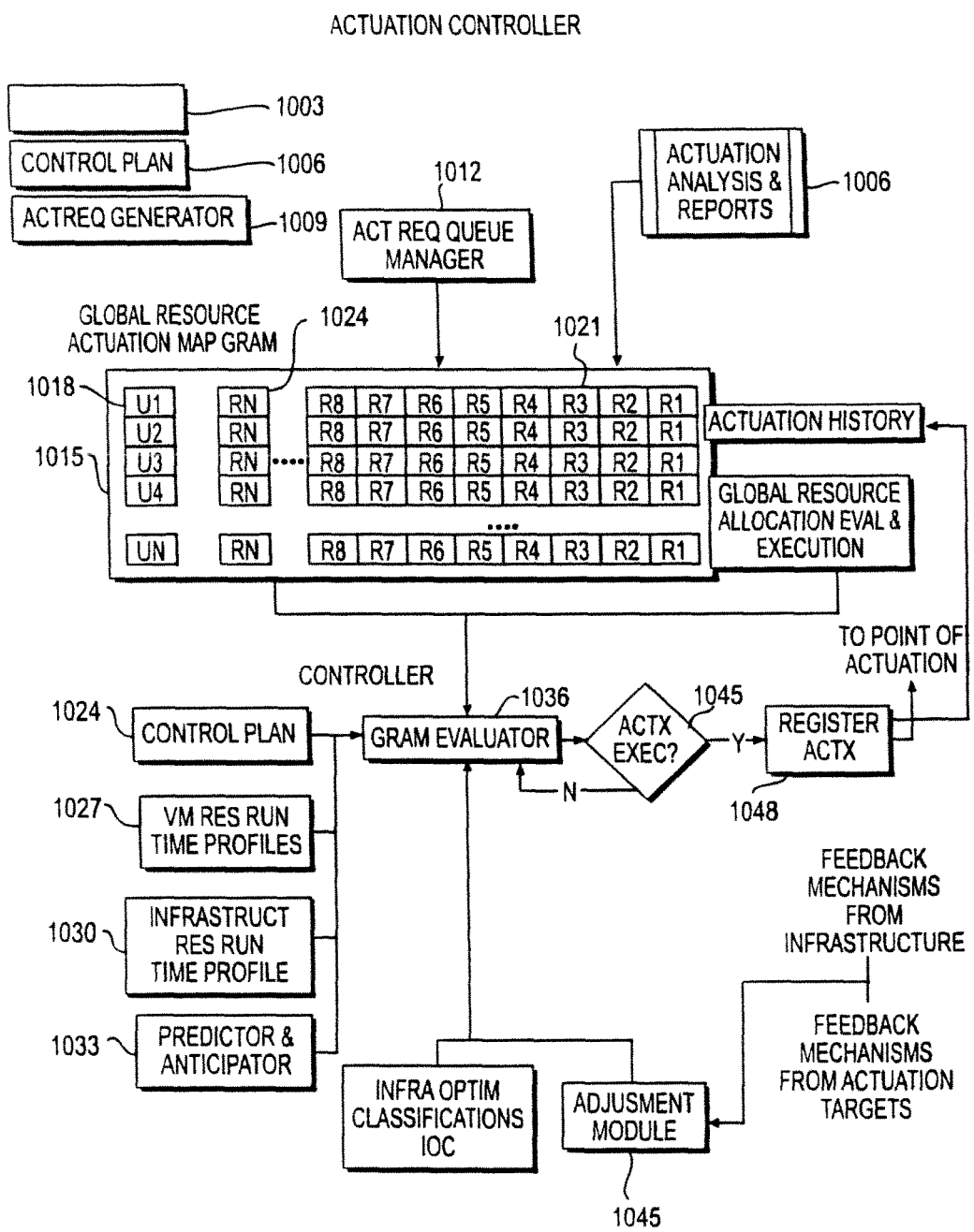
FIG. 10 illustrates the Actuation Controller in accordance with an embodiment of the invention.

Referring to FIG. 10, a Detector, as part of the GRAM (Global Resource Allocation Map) Evaluator, is tasked with matching in real-time the VM State to the Activity/Resource Profiles identified by the Assessor, where these profiles can also be used by the Controller and Dashboard. Furthermore, detected profiles may also be used, e.g., deriving the state of infrastructure "weather maps" that provide user-centered feedback and displays indicating the state of the infrastructure (congestion alerts, etc.). For example colors (red) indicating congestion of resources or green for ample availability of resources can be used to give users a sense of when or when not to perform resource intensive activities. The Detector produces a weighted probabilistic estimate of the targeted environmental (infrastructure) system state. Detectors are also described as Detection Points and can utilize any of a wide range of technologies and run in a wide range of environments.

Accordingly, in embodiments, the operations may be performed of obtaining a level of the electronic resources currently provided by respective network infrastructure components to a third plurality of the user IDs or monitored electronic components; obtaining a level of the electronic resources currently being used directly or indirectly by the third plurality of the user IDs; determining, by the one or more computers, difference data based at least in part on a difference between the electronic resources currently available and the electronic resources currently being used; and providing or making accessible, by the one or more computers, this difference data. In such embodiments, the relative priorities only control when one or more monitored computers, or systems, or sub-systems are not receiving enough electronic resources to that their processing is affected, e.g., the RTI measurement is below a desired level.

Accordingly, in embodiments, the application of the second rule set to apply relative priorities to an allocation of electronic resources may only be applied when a monitored computer, or set of monitored computers, or the global monitored system, or a monitored level in between is under resource contention or is predicted to be under resource contention in the near future, e.g., there are not currently enough computer resources allocated or available for allocation to that monitored level at the present time or at a future time or time window. In embodiments, the application of the second rule set may be applied at all times. In embodiments, the application of the second rule set may be applied only during set times of the day or days of the week, or when a predetermined application is to be run, or another subset of time.

FIG. 10 Actuation Controls: Controller (A)

The Controller processes the Control Plan developed by the Planner (FIG. 8), using state estimates obtained from the Detector at the GRAM Evaluator. The controller actuation is moderated by the probabilistic weights assigned to the detector outputs. There may be different actuation types determined by the actuation target: for example Infrastructure, Operating System, or Applications. The Adjustment Module receives input from the Infrastructure and inspects Plan Models against live metrics that reflect resource levels and contention relative to predetermined statistical application profiles. The module that receives Actuation Execution as Requests evaluates all conditions to determine whether to proceed or not to the final stage leading to Actuation Execution. This is to be a final qualifying measure to enforce additional Actuation control.

In embodiments, the generating allocation data step may comprise developing, by one or more computers, a matrix of the respective user IDs versus the electronic resources used by the respective user IDs. An example matrix is shown in FIG. 10, wherein the different users are listed vertically as U1-Un in the matrix, and the various electronic resources are listed horizontally as R1-R8. In embodiments, the step may be performed of allocating, the electronic resources, by one or more computers, to change the matrix based at least in part on the second rule set. The decisions on allocation of the electronic resources in accordance with the second rule set (obtained from the Control Plan 1024) is performed by the GRAM evaluator 1036, and signals are generated by the ActX Exec block 1045. Feedback electronic signals reflecting response time indicator (RTI) data (discussed elsewhere) and other data that may indicate stress on the global system or sub-parts thereof may be received by an adjustment module 1045 via the feedback mechanism lines shown in the figure.

In embodiments, the adjustment module 1021 may increase the electronic resources allocated to some of the user IDs and decrease the electronic resources to other of the user IDs based at least in part on the second rule set of priorities and based at least in part on the level of stress on the global or local system.

FIG. 10 Actuation Controls: Predictor (A)

The Synapse System from its Planning Analytics, e.g., the AOPP, to support Actuation run time models, uses a variety of Predictor & Anticipator: Predictive Class Techniques in the Assessor, e.g., Predictive Modules, whose modeled output drives the Actuation run time components in a kind of predictive and anticipatory behavior. The following sections discuss 2 important techniques used in the Synapse System to implement Actuation Control mechanisms that help to determine Infrastructure distribution of resources with different resource types, namely, Mixture Models and Kernel Methods. First is a discussion of Mixture Models.

Density Estimation and Mixture Models

The use of Bayesian methods depends on the modeling of probability distributions. In the general case, the distributions may be unknown, do not conform to simple parametric forms such as members of the exponential family, and must be estimated from sample data. One route to decomposing a complicated distribution into simpler distributions is to introduce latent variables; the distribution of the observed variables is then obtained by marginalization over the joint distribution of observed and latent variables. When the latent variables are discrete, and the observable distributions conditioned on the latent variables are taken to have a common parametric functional form, we obtain a mixture distribution.

A mixture distribution is a discrete linear superposition of more basic probability distribution functions (PDFs), termed kernel or potential functions, which are parametrized by location (, e.g., mean), and width (, e.g., standard deviation) parameters. Parzen (1962, univariate case) and Cacoullos (1966, multivariate case) describe non-parametric kernel distribution estimators for approximating a PDF via a mixture distribution with symmetric potentials centered at sample data points, and show that the estimators converge asymptotically to the population probability distribution as the number of samples increases and the width decreases.

While there is wide latitude in choosing the functional form of kernels, members of the Gaussian family of distributions are often used due to their tractability and well-understood mathematical features. The use of Gaussian kernels also leads to a Bayesian reformulation of standard linear least-squares modeling.

In general mixture models, the assumptions of Parzen and Cacoullos's are relaxed regarding the number, location, and width of each kernel, while seeking to minimize a suitable measure of approximation error. Parsimonious models that capture the essential features may be sought.

of the PDF while minimizing the storage and computational complexity.

In soft clustering, a mixture model is used to approximate the PDF parsimoniously using a small discrete sum of kernels; the mixture distribution's latent discrete index is taken to be the cluster index.

Regression and classification may be thought of as mappings from a state to a response: continuous in the case of regression, and discrete in the case of classification. In a Bayesian framework, we seek to model the joint probability distribution of the state and the response; we realize the mapping by use of Bayes's theorem and the calculation of marginal and conditional probabilities.

For regression, the continuous joint probability density may be modeled directly, and conditioning and marginalization are straightforward. For classification, we must first encode the class index as a vector of continuous values. The marginalized vector of responses may be then used as scores for the purpose of classification; under suitable technical assumptions about the method of encoding used, the scores may be shown to be relative (, e.g., unnormalized) probabilities that the state is in a given class.

Dimensionality Reduction:

In multivariate modeling, the high dimensionality of some data sets is a source of model complexity and poor performance. In the general case, the number of pair-wise interactions of variables grows quadratically with the dimensionality of the data, and estimating the variable correlations is fraught with statistical, computational, and storage difficulties.

For these reasons, it is desirable to reduce the dimensionality of the input data, by either selecting variables of interest, or recoding the variables into (a smaller number) of more suitable feature variables which capture the variation of the data. As variable selection is one of the most difficult problems in machine learning, the precise approach taken depends strongly on the chosen algorithms. Variable selection can be performed as part of feature selection during pre-processing of the data, or as an integral part of the model optimization using some form of automatic relevance determination.

Various feature extractors that employ linear combinations of the input variables are in common use, e.g., principal components analysis (PCA), factor analysis (FA), and independent component analysis (ICA).

In addition, there are kernelized versions of these algorithms that may be use for principled extraction of nonlinear features: KPCA, KFA, KICA. (refer to the section on Kernel Methods)

Automatic relevance detection (ARD) takes various forms, depending on the technical details of the model, and is only possible with a very limited class of models. As with the use of kernel methods, some commonly used linear learning algorithms are capable of incorporating ARD.

In the case of general multivariate mixture modeling, the optimization of the width parameters associated with variables or group of variables leads naturally to a notion of relevance, for if the variation of the kernel function is not significant over the width of the range of the variable, then the variable has little relevance.

A more general form of automatic relevance detection that is applicable to a wider class of continuous linear learning models is penalized regression. By incorporating a penalty for non-zero regression coefficients for each variable, the model optimization determines the trade-off inherent in using more variables to improve the model fitness. A particular form of penalized regression, called Least Angle Regression (LARS), calculates a parametric solution to the optimization problem, which enables one to determine the ranking of the variables by varying the penalty applied. Variations of LARS and similar methods can be applied to multi-level grouping of variables; this is useful in various modeling contexts, such as when a categorical variable has been encoded into a continuous vector.

Kernel Methods:

A common characteristic of complex data sets is the mixture of continuous, categorical, and structured variables. Machine learning methods are typically optimized for a particular variable type; mixing them in a model usually entails recoding variables to conform to the model. In particular, a large class of clustering, regression, and classification algorithms require sample data to be in the form of a vector of continuous variables. Explicitly transforming categorical and structured variables into vectors of continuous variables during pre-processing often vastly increases the dimensionality of the input data, which is undesirable for the reasons stated in the section on dimensionality reduction. Also, for recursive structures (lists, trees, graphs, etc.), the dimensionality required to embed the continuous representation is not necessarily bounded.

Fortunately many linear parametric model learning algorithms can be re-cast into a form in which the training data only enters the algorithm via a suitable similarity measure (or, equivalently, a distance, or scalar inner product) between pairs of samples. In particular, algorithms that may be re-cast to only utilize scalar inner products of sample data may entirely forego the need to explicitly transform the data by implementing the scalar inner product of two samples directly. This substitution of the scalar inner product of the transformed data with a dyadic function of the input data is termed the kernel trick, and the supplied function is termed the kernel. (This use of the term kernel is not to be confused with the use of kernel in density estimation to mean potential function.)

A scalar dyadic function must satisfy several properties to be a positive definite kernel:

It must be symmetric: $K(x\_1, x\_2) = K(x\_2, x\_1)$.

It must be positive semi-definite: $K(x\_i, x\_j)$ is a positive semi-definite matrix for any finite subset of the sample data.

The matrix of pairwise inner products of the sample data is termed the Gram matrix, or simply the kernel matrix. A kernelized learning algorithm depends only on the kernel matrix, which is a symmetric square matrix of real numbers whose size is determined by the sample size. Given the large number of instances, one might question whether this is an improvement over the alternative of employing an explicit mapping.

regarding kernels:

Kernelized learning algorithms decouple the algorithm from the data representation, providing better encapsulation for both.

The kernelized learning algorithm depends entirely on the ability of the kernel to capture relevant aspects of the sample data; in this way it implicitly performs a function akin to feature extraction.

A kernel may be parametrized, in which case the choice of parameters will alter the kernel matrix. In multiple kernel learning, kernel parameter selection is incorporated into the learning algorithm. Parameter selection need not violate the decoupling of algorithm and data representation.

For kernels used as input to classification algorithms, it is possible to evaluate the goodness of a kernel matrix using fewer resources than training the full model.

Because the feature vector space is implicit, it can be high dimensional or even infinite dimensional; in particular, it can represent a function space. The only requirement is that one be able to calculate the scalar inner products. By implicitly transforming to high dimensional feature spaces, data which is not readily separable in the input space may be linearly separable in the feature space. The canonical example is a disk surrounded by an annulus in the plane: no line in the plane can separate the disk from the annulus, but the addition of a feature variable, the distance from the center of the disk, makes the data readily separable by a plane defined by a constant value of the additional feature variable.

The principal drawback of kernelized learning methods is the size of the fully realized kernel matrix. Various dimensionality reduction methods exist to approximate the kernel matrix using a reduced basis; these methods have the advantage of leveraging the special properties of a real positive semi-definite matrix, rather than the general matrix of feature variable data in an explicit realization. When combined with specialized matrix factorizations and penalty methods similar to LARS, the effect is to produce compact and efficient model that can be applied to polymorphic data types.

Anticipator (A)

As part of the Predictor Module, The Anticipator is a lower quality of output than the Predictor. While a Predictor covers application and related user activity when repetitive tasks cause application resource demands that have a high degree of predictability, contrasting this sort of repetition, the Anticipator covers situations when the probability of a deterministic condition lies within only a lower range, e.g., 40-60% for example. In other words Anticipator Handlers will accommodate larger error ranges with other algorithms to mitigate negative environment Infrastructure impact.

Launcher (A)

The Launcher, exercising Synapse's global resource perspective relative to application utilization at the moment, can influence Infrastructure's admission control (using the Admission plan) for newly instantiated Vm sessions in detected new Vm's, that are focused on the Host. Synapse could influence external Vm launching mechanisms to allow, inhibit or prevent new Vms which is a use case for Synapse's global view of apps and user activity and anticipation.

Figure 11:
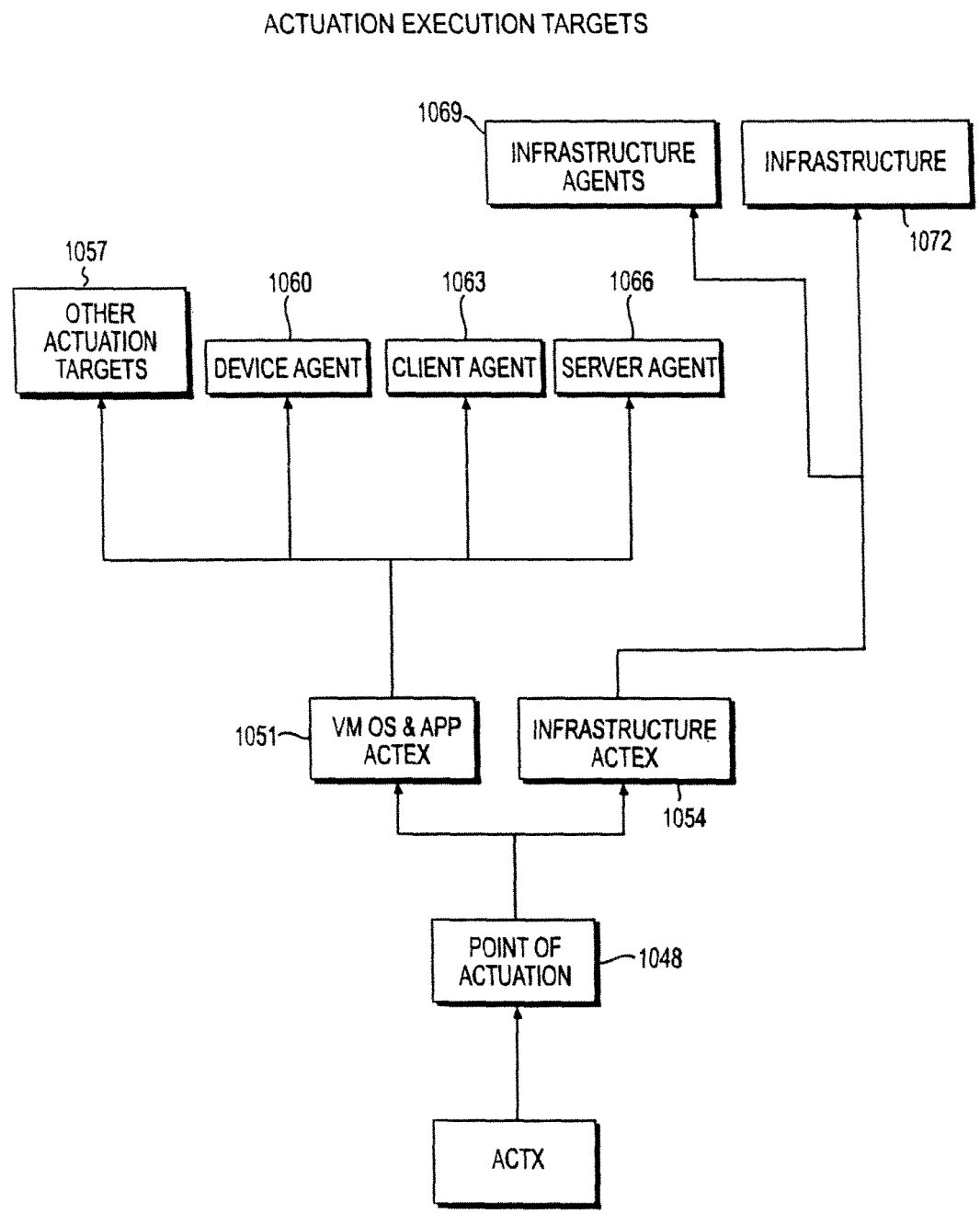
FIG. 11 illustrates Actuation Execution Target in accordance with an embodiment of the invention.

FIG. 11 Actuation Execution Targets for Resource Allocation

Finally as Actuation Request Evaluation is completed, requests arrive at the final launch point for Actuation Execution. There is a range of Actuation Targets and types. The examples discussed here are API based, e.g., Infrastructure and Agent based. The Synapse System accommodates any number of Infrastructure API's that extend Infrastructure Actuation capabilities over a wide range. The Agent capability with its extensive flexibility for extracting multivariant data sources, can be applied to a wide range of environments and targeted applications from desktop to server to infrastructure. The following sections discuss a sampling of Actuation Types.

Each virtual environment has a wide range of features for managing its resources within the virtual infrastructure. All of them provide API's or other techniques for interfacing to external programs to control respective infrastructure features. The primary resources of interest may be memory, CPU, (virtual) disk bandwidth and IOPs, and network bandwidth. Memory, being a non-renewable resource, requires a control mechanism substantially different from the other, renewable resources. Refer to VMware's published API's for full details (refer to the Reference section for information on VMware's SDK link location)

Operating System Actuation

An operating system (OS) has many configurable features which also can be tuned to optimize performance for a particular environment. For example, within the OS, adjustments could be made to any or all of the following: application priority, visual effects, memory management, cache settings, OS maintenance tasks, etc. For OS Actuation, the Synapse-deployed Agent can directly tune many of these OS Settings to provide an additional means of Actuation for the purpose of managing resources that ultimately affect the user experience operating within the virtual environment. OS Actuation will be taken into account by the Synapse Global Resource Allocation Evaluator module.

Application Actuation

Applications optionally have different configurable settings, which can be changed manually or programmatically, that affect application behavior. Often the applications have APIs or built in programming languages for extending or automating capabilities and features which the Synapse Agent can use to execute direct actuation. Examples of application tunables include: application cache settings, incremental rendering, and smooth vs. jump scrolling, and so on.

Actuation Dashboard

Provides real-time and historical views of Synapse performance data.

Actuation Configuration Data

Datastore—all

Streaming Data all

The Datastore records streams of measured observations, predictions, and control signals for use by the Assessor and Planner.

Data View

Observations

The state of the system is measured, filtered, aggregated, and communicated to the central datastore. The frequency of measurement and the level of filtering and aggregation may be determined by the competing requirements of accurate representation and minimal overhead.

Timestamps

In embodiments, timestamps also may play a role in Synapse, as distributed data must be correlated based at least in part on time of observation. Timekeeping is a rich and challenging topic; see the Performance section under Operation Requirements for a discussion of some of the issues associated with "simple" timestamps.

Settings

Settings are not dynamical but are constant until changed. Changes to settings that are not under Synapse's control may be signaled by an Event, or else Synapse may have to poll settings for changes, which is generally undesirable.

Levels

Levels are dynamical attributes of the system state. We distinguish levels, which are state variables independent of the sampling interval, from statistics, which depend on a sampling interval.

Statistics

Statistics represents an aggregate over a (regular) sampling interval. Shortening the sampling interval generally changes the statistic and may reveal new effects.

Events

Events occur at irregular intervals, have rich types, and are queued asynchronously.

Context Identifiers

Context identifiers associate a persistent identifier with a detectable context. Context identifiers are used to label events. Some important context identifiers used within Synapse: for example the User context identifier—labels a specific user, or an Application context identifier—labels a specific program location.

Profiles (As, P, Ac)

Users, roles, and applications have profiles associated with them that classify their resource requirements and performance sensitivities.

Control Laws (A)

A control law is an imperative realization of the policy. It maps a (probabilistic) estimated system state to a control actuation. It may be largely static, or highly responsive to changes in the environment. Real systems employ a hierarchy of controllers which regulate the behavior of the systems. The design of the upper control levels is strongly dependent on the control model abstraction provided by the lower control levels, which can have a large positive or negative impact on overall system performance.

State Estimates

Detection (A)

The Detector estimates the state of the controlled system on-line, in real-time. It classifies the stream of observations received from the monitoring points, representing activities and resource usage, into the higher-level context identifiers learned during Assessment phase.

Prediction (A)

Predictions may be made on the basis of the currently estimated state, the model of the dynamics, and the control policy as encoded in the control law. Predictions may be enhanced by estimates of confidence in the predicted values, which allows the risk of alternative trajectories to be assessed.

Control Signals (A)

Control signals may be derived from the estimated state and predicted trajectory of the system, as modified by the control law.

Policies (P)

A policy is a normative control model, based at least in part upon declarative rules, constraints, & values. The goal of policy definition is to abstract the business and system performance requirements away from the details of the virtual environment and its control mechanism.

Structural View

In this section we describe the major software components of the Synapse system and their interconnections. The Synapse environment is composed of elements which cooperate at the per-VM, hypervisor node, and node-cluster levels.

General Design Considerations

For each component of the Synapse system, a mechanism is designated for the following functions: for example, with Discovery the component must be known to the rest of the system. [Typically accomplished via well-known (static) names, or a dynamic registration and naming service.] Another is with Routing where the component must be *logically* reachable from other inbound components of the system, e.g., the path to the component is discoverable. Another is with Filtering where the component must be *actually* reachable from other inbound components of the system, e.g., information can traverse the path to the component. In particular, various security barriers (firewalls) need to be modified to allow the required flows, while maintaining the privacy and integrity of user data.

Synapse Server

The Synapse server maintains a global view of all concurrent targeting monitoring points. One primary monitoring focus may be the VM instances in a cluster. Within the Vm instances Synapse components collect data from the hypervisor infrastructure and guest VMs (via the proxy VM). Another Synapse server component provides control signals to the hypervisor infrastructure, as well as to the individual client VMs. For robustness the Synapse System scales to tens of thousands of VM instances and beyond.

Constraints to be Considered May be as Follows:

Resources: memory, network, disk, and CPU for the service should be small compared to the value added by Synapse. In embodiments, Synapse may work with commodity infrastructure, e.g., Gigabit networking, and typical NAS or SAN storage configurations.

Security: in embodiments, Synapse may be secure from passive snooping of private VM data (, e.g., URLs). Its configuration prerequisites must not require relaxation of the network infrastructure security beyond VLAN and/or port filter configuration for the monitoring and control services.

Possible configurations enable how multiple Synapse servers can operate in a federated manner for the purpose of scaling giving consideration to whether the natural partition is at the hypervisor cluster level, or some other granularity.

Per-Node System Proxy VM

Another component, the Synapse System Proxy, provides logical channels for logging, control, and client request/reply to the VMs running on the host. An example one of these channels is the Logging channel which collects metrics from the client VMs. Another example channel is the Control channel which forwards control information from the Synapse server to the VM agent. Yet another example channel is the Request channel that provides the VM agent with the ability to request information or resource changes.

Some of the requirements may be: to collect data from all guest VMs running on the node and forward (potentially summarized) to the Synapse server. Another is to handle guest agent API requests that can be satisfied locally (, e.g., using cached information). Another is to forward other API requests to the Synapse server. Yet another is to collect hypervisor node-level statistics for forwarding to the Synapse server, if these are available and efficiently obtained. Some constraints may be in regards to Resources which must consume minimal and predictable resources, since it is competing with guest VMs, and likely must run at high priority, so as to minimize communication latencies. Another constraint is in Security which must maintain security of per-VM data (, e.g., URLs). Another is in regards to State which must be restartable. This has implications for discovery and state management.

Other aspects include statefulness or behaviors during a required unanticipated component restart from server failure. The proxy server can be used for different functions within different Synapse modes.

Syn Agent, e.g., Guest VM Agent

A Synapse Agent runs within the OS of the guest VM, and hence is OS-specific. Initially, support will be provided for various versions of Microsoft Windows with other native OS's implemented as driven by market needs.

Some of the requirements may be to collect guest-level statistics, perform OS Actuation, or to provide an API for use by Synapse based at least in part applications such as the User Virtualization Self-Service application, where a user interface is provided to users of virtualized systems for interactive, bi-directional communication for support and to provide a feedback channel or mechanism for Synapse components.

Some VM Guest Agent constraints may be in regards to Resources: where the Synapse Agent can only use minimal resources, especially when the VM is severely constrained. Another is Randomization: where Collectively, the guest VM agents must avoid operating in lock-step. If measurements may be taken at regular intervals, then the phase of those measurements should be distributed across the VMs. Alternatively, the measurement intervals may be inhomogenous and randomized. In either case, the parameters should be chosen so as to minimize the load variation.

Accordingly, in embodiments, steps may be performed of controlling, by the one or more computers, software agents disposed to monitor a plurality of virtual machines, to distribute over time the run-time data from the plurality of the virtual machines so that times for receipt of the run-time data from the different respective virtual machines is distributed over time.

A VM agent can communicate with the proxy or through a lower-latency path directly to the Synapse Server. Additionally use of an Infrastructure provided (or otherwise) out-of-band communication mechanism within the node enables the VM agents to (1) discover a per-node proxy, and (2) communicate without requiring network reconfiguration within the guest VM. For example, VMware's VMCI is an example; KVM provides a virtio serial interface. Xen or Hyper-V mechanisms may be other possibilities. Synapse could conceivably configure an additional network interface, but will require changes to the guest OS networking stack configuration.

Guest VM User Virtualization Self-Service (UVS)

As part of the Synapse Framework, a Guest VM User Virtualization Self-Service Application, e.g., UVS, provides a guest user interface to the virtual infrastructure. UVS enables a direct user feedback for example, to express dissatisfaction with the performance of a VM as experienced by the end user. The UVS user interface would report to the user, for example, the resources allocated to the VM, or the current resource contention (memory, CPU, disk I/O, network I/O, etc.), or predicted resource contention within a future time interval.

Some possible constraint examples would be in regards to Resources. For example, since the UVS application is intended to diagnose performance problems, it must therefore use minimal resources, because the VM is invariably already performing poorly when it is accessed. Another possible constraint would be in the UI since it must be easily navigable, despite constrained resources.

Other implementation considerations would be, in a resource-constrained environment, keyboard shortcuts could possibly be more responsive and less prone to error than mouse clicks. Furthermore, navigation of a tabbed interface could be preferable to menu selection when operating in a resource-constrained environment.

Dashboard

The Dashboard provides a management interface to the Synapse system. Some features it provides may be a global summary of resource utilization, a global picture of the mix of active profiles, drill-down on a particular resource, drill-down a particular group of VMs, or an interface for viewing and modifying Profiles, Constraints, and Rewards/Penalties. A constraint consideration would be around Security Per-VM since private information needs to be secured.

In embodiments, the steps may be performed of generating and sending or making accessible, by the one or more computers, for an administrator graphical user interface, data for each of a plurality of the user IDs, the data for a respective one of the user IDs providing an indication of a level of the electronic resources allocated to the respective user ID. In embodiments, this data on allocated resources may be obtained from the matrix 1021 of FIG. 10. Note that this may be done for each of the electronic resources or an aggregate measure may be used. In embodiments, the level of electronic resources may be obtained by comparing the RTI (response time indicator) data for the global system, or selected sub-systems, or for selected user IDs against a desired RTI level. In embodiments, the level of the electronic resources may be indicated by a graph, or by a color, such as green for good, yellow for close to a minimum RTI level, and red for less than a minimum desired RTI level.

In embodiments, the method may further comprise generating, by the one or more computers, data for a user graphical user interface for a respective one of the user desktops showing an indication of a resource level allocated to the respective one user desktop and/or a level of contention for the electronic resources. In embodiments, the level of contention may be obtained by aggregating the electronic resources allocated to the various user IDs in the global system, or a sub-system, and comparing to a total amount of electronic resources available. Note that this may be done for each of the electronic resources or an aggregate measure may be used. In embodiments, the level of contention may be obtained by comparing the RTI (response time indicator) data for the global system, or selected sub-systems, or for selected user IDs against a desired RTI level. In embodiments, the data for the user graphical user interface may comprise providing an electronic ability, e.g., screens for generating and sending a resource request or a complaint.

In embodiments, steps may be performed of determining, by the one or more computers, a label or other indication for a relative level of importance or priority, based at least in part on the application context ID determined for a respective one of the user IDs. In embodiments, a further step may be performed of generating and sending or making accessible, by the one or more computers, data for a user graphical user interface for a respective one of the user IDs, for the label or other indication for the relative importance or priority of current activity performed by the respective user ID.

A purpose in some embodiment for showing to the user ID a relative importance or priority of the user's current activity is to influence the user behavior. For example, if the user ID is surfing the Web or playing a game, data for a very low level of importance or priority may be generated for display to the user ID. Data indicating an increased importance or priority may be generated and sent or made accessible if the user begins using a business related application. Note that level or importance or priority may be determined from the application context ID determined using the first rule set and the priorities set for applications and user IDs from the second rule set. However, in some embodiments, the resource level actually allocated to the user ID may not be affected by a low level of importance or priority until there is contention for the electronic resources in the system, e.g., a critical mass of other user IDs are using applications with a higher priority.

Different interface configurations could provide a limited version of the Dashboard view for a particular VM that would be made available to the VM's user. Securing this information and controlling access would be executed in accordance with standard industry security practices.

Figure 12:
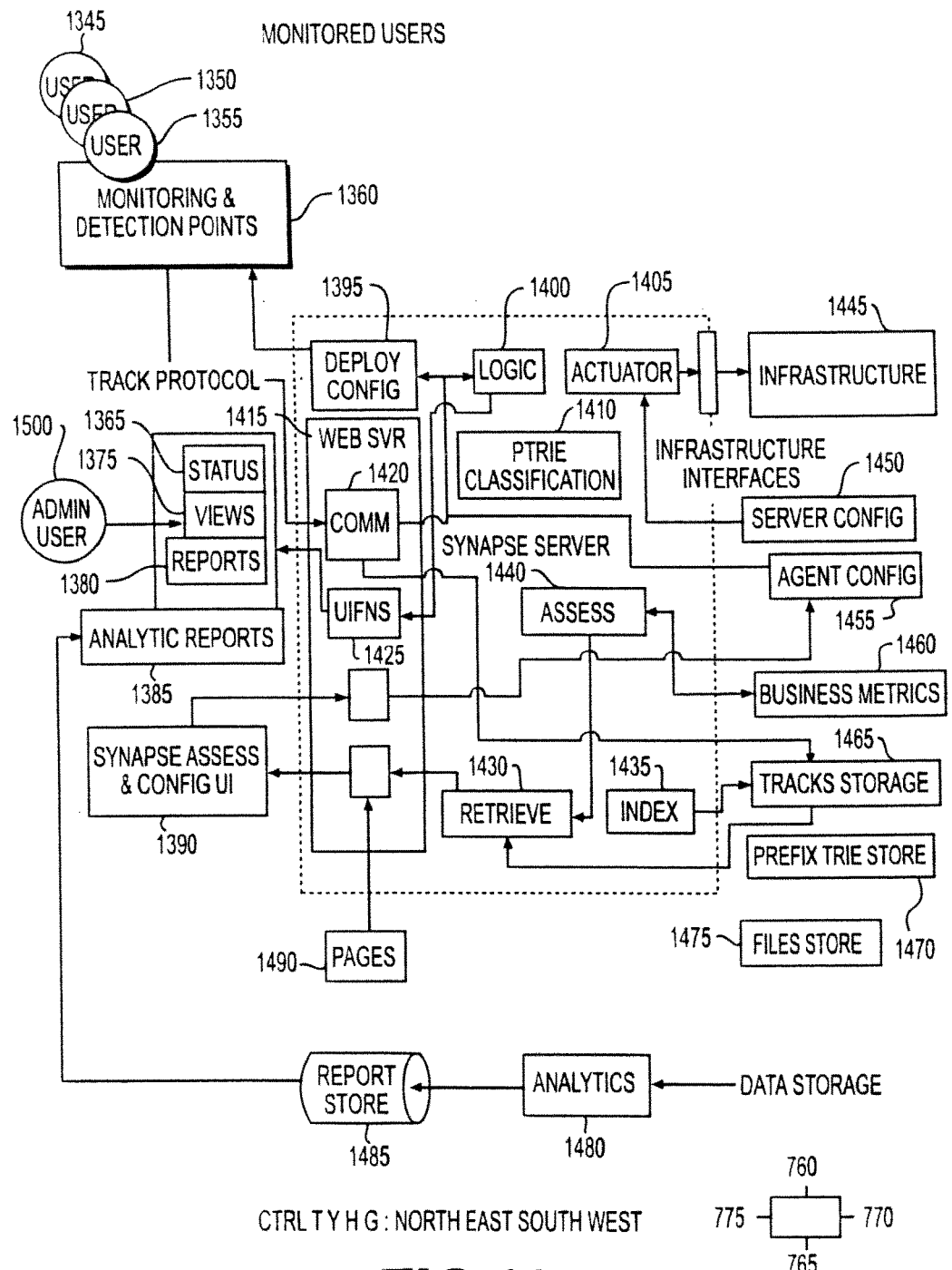
FIG. 12 illustrates the components of an example Synapse application in accordance with an embodiment of the invention.

FIG. 12 Synapse Example Application

Referring to FIG. 12, the following is a discussion of an exemplary, reduced form, embodiment of the Synapse System that demonstrates some components and functions for an optimizing, actuating Synapse Application. The components described are the Agent implementing Assess and Actuation operational modes, run time classification of AppLoc and Application Context data, Actuation execution, management of the system via a UI, Track protocol, and server resource optimization, and other key features. First is a discussion of the Web Server which communicates directly with the Syn Agent.

Web Server

A web server is implemented to provide a user interface for interaction with various configurations or to review collected data and similar functions as known in the art. The main section, the Synapse Server UI Web Server component, serves a set of web pages namely, HTML dynamic and HTML static web pages, JPG and CSS files which are currently static. The web server also contains a module that communicates Comm via a common protocol with deployed Monitoring and Detection Points.

Configuration File: Server and Agent Configs

The Configuration files enable basic static settings of the Syn Server and Syn Agent. The basic modules include scanners similar to scanf to simplify parsing functions for fixed data formats, utility items may be directly imported and don't require prefixing which helps to simplify referencing and source level access.

Main Module

The Main module begins with a command line parsing section to control different modes, e.g., debugging, tracing, etc. There is a track tracing module that displays the received track messages sent from monitoring end points, e.g., Syn Agent. A Common String format is used pervasively, e.g., the Java property file containing escape and different character types.

Track Files Data Stores

There may be indexes to the raw track information kept in file stores for all Monitoring Points, e.g., agents. This is an index pointing to respective data locations in that file of all the tracks that streamed from an agent. Other components execute Session Linking. When a new block of tracks arrives, an update block function adds a record to the file store. Other management functions maintain the track stream, e.g., append, or delete, or insert. For interactive requests for the UI a function fetch sends a request and argument string which returns a result.

Actuation Commands for Resource Allocation in Infrastructure

Located in the Actuator component, Inter component protocols (connecting Actuation Detection and Actuation Evaluation provide the connective means of Agent Direct Commands vs Centralized (server) Generated and Filtered Commands) between different Tiers. Through the protocol established between the Detection Point and the Infrastructure Commands. The protocol can deliver commands, e.g., 2 letter string commands that are mapped to specific Infrastructure commands implemented as API or service method calls to external Infrastructure controls. The following are some examples of resource types that are controllable: IO controls, CPU controls, Memory controls, or Network controls.

In the Actuator, one or more sets of Commands may be interpreted by an Infrastructure Command Interpeter which can execute a set of behavior rule such as order and queuing. Command sets may be associated with vm or user structures that track execution history or status and may be kept in persistent storage.

Refer to the reference "VMware SDK" in the Reference section for more information. The following are a few utility code samples:

1 VMware Infrastructure Actuating Sample

```
    private VirtualMachine ReturnVMbyNameEx(String vmName) throws
Exception
    {
        if(null == vmCache)
        {
            //create cache
            vmCache = new HashMap<String, VirtualMachine>( );
        }
        //lookup cache first
        VirtualMachine vm = vmCache.get(vmName);
        if(vm != null)
        {
            return vm;
        }
        else
        {
            vm = ReturnVMbyName(vmName);
            if(vm != null)
            {
                vmCache.put(vmName, vm);
            }
            return vm;
        }
    }
```

2 VMware Infrastructure Actuating Sample

```
    Exception
    {
        if(null == poolCache)
        {
            //create cache
            poolCache = new HashMap<String, ResourcePool>( );
        }
```

2 VMware Infrastructure Actuating Sample -continued

```
        //lookup cache first
        ResourcePool pl = poolCache.get(poolName);
        if(pl != null)
        {
            return pl;
        }
        else
        {
            pl = ReturnPoolByNameE(poolName);
            if(pl != null)
            {
                poolCache.put(poolName, pl);
            }
            return pl;
        }
    }
```

3 VMware Infrastructure Actuating Sample

```
public Boolean ChangeVmState(String vmName, Operation operation,
Boolean syncronously)
    {
        if (null == invNavigator)
        {
            System.out.println("ViScheduler is not logged in");
            return false;
        }
        long start = System.currentTimeMillis( );
        try
        {
            VirtualMachine vm = ReturnVMbyName(vmName);
            if (null == vm)
            {
                System.out.println("ChangeVmState cannot find VM
"+ vmName);
                return false;
            }
            Task task = null;
            switch (operation)
            {
                case powerOffVM:
                    task = vm.powerOffVM_Task( );
                    break;
                case suspendVM:
                    task = vm.suspendVM_Task( );
                    break;
                case resetVM:
                    task = vm.resetVM_Task( );
                    break;
                case powerOnVM:
                    task = vm.powerOnVM_Task(null);
                    break;
                // case: reconfigVM:
                //     vm.reconfigVM_Task(spec)
                //     break;
                case shutdownGuest:
                    vm.shutdownGuest( );
                    break;
                case standbyGuest:
                    vm.standbyGuest( );
                    break;
                case rebootGuest:
                    vm.rebootGuest( );
                    break;
                default:
                    System.out.println("ChangeVmState unknown
operation " + operation + " for VM "+ vmName);
                    return false;
            }
            //VirtualMachineRuntimeInfo vmrti = vm.getRuntime( );
            //vm.reconfigVM_Task(spec)
```

-continued

```
3 VMware Infrastructure Actuating Sample

//Task task = vm.reconfigVM_Task(vmcs);
    System.out.println("ChangeVmState " + operation + " 
for " + vmName + " committed");
        if(null != task)
        {
            if(syncronously)
            {
                if(task.waitForTask( ) !=Task.SUCCESS)
                {
                    System.out.println("ChangeVmState " +
operation + " for " + vmName + " failed");
                    return false;
                }
            }
        }
    }
    catch(Exception ex)
    {
        System.out.println("ChangeVmState operation " +
operation + " " + vmName+ " exception " + ex.getMessage( ));
        return false;
    }
    System.out.println("ChangeVmState " + operation + " for " +
vmName + " succeeded");
    long end = System.currentTimeMillis( );
    System.out.println(vmName + " in synchmode(" + syncronously
+ ") " + operation + " elapsed time: " + (end-start) + "ms");
    return true;
}
```

Agent Direct Commands to Infrastructure

The Detection Point's agent can also send direct requests, e.g., a command to the Synapse component that executes a method that results in an Infrastructure Vm resource profile change. The agent can be configured with a detection mechanism that on a given condition, based at least in part on its sensing within its run time environment, will send a command identifying a server and a selection from all possible resource distributions supported. This results in an Infrastructure redistribution of Vm resources.

Within a component on the Synapse Server, the main loop within the Logic component runs continually at a set rate, e.g., three times a second, where code will check all the current settings of all concurrent agents and for any adjustments or for any new Actuation requests that should be sent to Infrastructure servers. The system tracks the state of each agent within a Session class.

Resource Selection

Yet another component communicates and schedules profile allocations with the external Infrastructure management commands to allocate specific resource types such as CPU or Memory.

User Driven Server Resource Distribution

An extensible array tracks targeted servers to optimize where each server record contains a Server Boost Setting which may comprise a base, a delta value, and an extensible record to accommodate different constitutional inputs. Every client, e.g., monitoring point that detects a condition mapped to a server subsequently issues a mapped request on the Synapse Actuator Component. The Server Boost Actuation configuration (Server Config) contains a range of settings such as the server port number, the agent session connection, the Infrastructure URL, the targeted server's URL, and logon information.

In the Synapse Server a request thread processes the incoming request where the incoming request may comprise two parts. The Post side processes agent data. So currently any data that's posted is assumed to be track data. Scan functions parse multiple parameters from incoming strings. All incoming messages from the agent, e.g., headers, tracks, session requests, etc. are handled. If a session request is received a new session number is created and a session response is sent back to the agent.

A TrackHandler processes incoming tracks where the content of tracks is parsed and a handle to the agent session is created. The contents contain the message, the body of the track, and the time it is received. A routine parses a portion of the incoming message for an identifier representing the Infrastructure Resource Classification, e.g., Shares or Pool (VMware). From the specific "resource requesting" message the client name is extracted. A default Resource Classification (RC) is used if the agent times out. Also extracted may be the current priority RC, a start and stop end time where the current end time is set via a configuration, e.g., two minutes into the future so that if no further instructions arrive from the agent within two minutes, the server will automatically failsafe and switch back to the default priority for that given agent. The start time usually takes effect immediately, but can be flexibly scheduled.

The exemplary application presented here also features User Driven Server Resource (UDSR) Distribution. This capability increases a user connected server's resources as a function of user activity consensus based resource demands across an entire user base. A UDSR Data structure contains settings that tracks settings and requests as an aggregate across the user base which can also be partitioned into subgroups. For the given number of servers each server contains its own setting which can be dynamically controlled either directly or through a filtered function based at least in part on user requests.

Example User Interface

A user interface is provided for the purposes of reviewing different functional status of the Synapse server for example, collected Assess data, server status, reporting, categorizations of collected Assess data, Syn Agent configurations containing rule sets, and so on.

Within the UI, a list of target elements, e.g., URL's, application names, window titles, etc. may be organized by different time intervals such as by day, week, bi-weekly, monthly, etc. Integrated prefix trees per time interval may be written as a block of memory to respectively organized files. For example implementing a node resembling a Patricia Trie could be implemented to accommodate the following: tree branching, e.g., left/right, parent & child nodes, start-end times, node types, server URL characters, URL characters, Flag categories that support a user interface such as a Visited node flag, temporary visited flag used for analysis (multi pass analysis used to keep track of processing), node expansion in the UI, tree parameters that describe nodal relationships such as the number of descendants from a node,

```
struct PTN // Patricia trie-like tree node
{
    PTN * left, * right; // tree of choices - could be replaced by hash table, list or etc.
    PTN * parent; // parent node
    PTN * child; // next substring choices - can be join with other item
```

```
char * txt; // UTF8 start of sub string
WORD len; // length of txt string
DWORD start_time, end_time; // time range that includes all data of children & self
DWORD flags; // NF_* node types
// type flags
#define NF_Server 0x00000001 /* node is characters of url server */
#define NF_Url    0x00000002 /* node is characters of url */
#define NF_UrlArgs 0x00000004 /* node is characters of url args */
#define NF_Path   0x00000008 /* node is characters of pgm path */
#define NF_Exe    0x00000010/* node is characters of pgm exe name */
#define NF_ExeArgs 0x00000020 /* node is characters of pgm args */
// misc flags
#define NF_Keep   0x00010000 /* Node should not be archived */
#define NF_Merge  0x00020000 /* Node should be merged with children for display */
#define NF_Visit1 0x00040000 /* a temporary visited flag for analysis - either polarity */
#define NF_Visit2 0x00080000 /* a temporary visited flag for analysis - either polarity */
// user flags
#define NF_Expand 0x01000000 /* User wants node expanded temporarily */
#define NF_PermExp 0x02000000 /* User wants node expanded permanently */
// descendent metrics - could be computed on the fly
WORD num_leaves; // number of leaves under node
WORD max_desc_kids; // max count of kids per descendent
WORD max_desc_execs; / max executions of descendents
DWORD max_desc_exec_time;
DWORD num_desc_execs;
UNS64 total_desc_exec_time;
// own metrics
DWORD num_execs; // count of executions of this node (as end of string in subtree)
UNS64 total_exec_time; // total time of executions of this node (as end of string in subtree)
DWORD num_hits; // times this node was traversed for sub nodes
UNS64 event_record_address; // location of latest event record (head of linked list)
    // ...
// user info
char * user_name; // user assigned name for contents of node
DWORD user_group; // user assigned group id and/or flags
WORD performance_metric; // type of metric to use for business performance
#define BM_Undef  0 /* undefined metrics */
#define BM_Execs  1 /* bigger execution count is better */
#define BM_InvExecs 2 /* smaller execution count is better */
#define RM_AvgTime 3 /* bigger avg time is better */
#define RM_InvAvgTime 4 /* smaller avg time is better */
WORD group; // (Synapse profile)
// graph addition
PTN * join; // pointer to node to join with
};
```

The Patricia Trie "Prefix Tree" (PTN) Structure

In the example application the Synapse System's Method of Organization for collected application data uses different algorithms or techniques known in the literature to determine the first rule set for detecting/indentifying an application running on a monitored computer. For example, implemented in the PTrie Classification component, Patricia Tries (refer to Reference section) can be used to efficiently and rapidly classify free form string data to quickly organize related data into logical groupings.

In the given example, the Patricia Trie variation contains elements pertaining to node relationships and types and type identifications for different application locations or contexts. For example, URL, URL arguments, server identification, program executable names along with their respective folder paths, along with respective program arguments. Since an embodiment of the Synapse System allocates the PTN in memory which has inherent operational limits, there may be also flags pertaining to the maintenance of structures to track node history or as candidates for keeping or transferring to the next level of storage or archiving. There may be also flags that are used for analysis, where for example, a record is kept per analytical process step whether the node has been visited in a previous step. Continuing, there may be also time structures used to retrieve data by a given time segment as well as data pertaining to the user Synapse management interface such as for node temporary or permanent expansion. Counter structures may be used to maintain integrity of the structure. Notably, there may be also support structures that track the execution support, e.g., the number of times a given application location, through user activity, is traversed as well as the length of time of spent in a given location. Additionally there is a set of business performance records used to accommodate business performance metrics. There is also an undefined structure used to accommodate structure extensibility as needs arise.

The PTN Patricia Trie is effective for:
Compact compressed storage (keep several days in memory)
Incrementally updateable
Hierarchical groupings users can select from (when strings have left-to-right increase in details) User navigation to desired data (which is also grouping selection)

The Algorithm for UI Display Example:

---

1.  On page load:
    a. Data table calls iterator
        i. It calls PageableResultSetExtractor.extractData
        It calls PrefixTree.GetVisualRow PageRowCount times and returns an array of the results
2.  On expand sign click on row i
        Call PrefixTree.SetExpansion(row i)
        i. This will set all the child datarows of row i to be visible
        ii. Recalculate PrefixTree.VisibleRowCount
    b. Now we can
        i. Re-calculate DataTable.RowCount and DataTable.PageCount (will affect the pagination toolbar)
        ii. Re-load current page. This is a naïve implementation. We should really use Ajax to only load the expanded part

```
struct HEAD
{
READ * self; // self pointer for pointer relocation
PTN * exes; // tree starting with exe names
PTN * paths; // tree of exes starting with paths
PTN * servers; // tree starting with servers
};
```

---

The above Patricia trie-like tree can:
Contain subtrees of different types
Sort strings for free
Save memory
Group many strings for easier presentation to user
Record user's preference of level of detail with user's options
Merges some children automatically for display purposes
Manages time ranges of data
Pre-computes many total, sub and leaf metrics so user can decide what is useful
Can age and discard sub trees (can be pruned)
Index(s) to find sets of event records
The join pointer can implement graphs from the trees The PTN Patricia Trie has a number of advantages and benefits which includes the accommodation of a different subtree types, natural string sorting and classification, and memory optimization. There is user interface support due to natural string groupings, the user selection of levels of detail along with optional settings and the merging of lower descendents data to help compress display data. Selection by time ranges is supported. Interleaved pre computed total, sub, and leaf metrics provides and supports an interactive user interface for a user workflow for finding solutions. Maintenance of the tree via age and sub tree pruning prevents overflow and excessive data that would prevent optimized operation. Fast access to the PTN is accommodated using indexes. A Join pointer enables the implementation of sequential graphs from the tree structures.

Synapse Example Application UI Functions (UIFns)

Various Functions may be needed for interacting with in memory PTN data structures and include Retrieval, Building, and Tree specific high and low level functions.

Retrieval

The following are some examples of Retrieval functions:
ShowToUser(char**output,PTN*top,int numlines,int linescroll, . . . filter . . . )—expand tree to a few lines of text to present to used. Output can be javascript tables to be rendered by javascript to the user
PTN*LoadTree(char*directory,DWORD starttime)—load tree for a time range
MergeTree(PTN**iop,PTN*in)—if user needs a time range that covers multiple saved time ranges Building:

The following are some examples of Building functions:
AddTrack(char*track)—write track to disk file and add to tree & indexes
UpdateMetrics(PTN*leaf)—update metrics after a node is added
PTN*AddStr(char*utf8str,int len,PTN**parentp)—add string
CopyTree(PTN**parentp,PTM*oldtree, . . . filter . . . )—can create pruned tree for new week, or other sub-selection for retrieval or analysis Tree-Specific Functions:

The following are some examples of Tree functions:

---

```
Based on a JNI C++ DLL to access memory mapped prefix trees.
int and String are only data types to pass to/from DLL.
// Low level:
int AccessFile(String filename); // open memory-mapped file of desired information (filename can have date range).
String GetText(int node); // just text part just from node; GetRowText gets full string
int GetTopNode( ); // first node
int GetNextSibling(int node);
int GetFirstChild(int node);
int GetParentNode(int node);
int GetNodeFlags(int node); // various option Flags
int SetNodeFlags(int node,int flags); // various option Flags
int GetMetric(int node,int metricid); // various metrics
int SetMetric(int node,int metricid,int value); // various metrics
// Flags:
int HideNode=1; // hide node from user
int ExpandNode=2; // expand children on display
```

```
int JoinNode=4; // join minor hide node with parent for display; Not all nodes are
relevant to user
int HasMetrics=8; // metric info is attached
// High Level - handles hide & expand options - always alphabetical !
String GetRowText(int node); // combine node with ancestors for full string
int GetFirstRow(int node,int number,int ignoreflags); // locate first row node to display -
ignoreflags=HideNode to ignore hiding
int GetNextRow(int node,int ignoreflags); // locate next row node to display
// Creation:
int CreateFile(String filename); // start new file
int AddText(String text); // returns node for SetNodeFlags
int SaveFile( ); // write current file
int ComputeJoinNode( ); // decide on nodes to join based at least in part on branching
amount
// Other:
int MergeTree(String otherfile);
```

UI Data
response time for the UI is optimized such that:
   A day or week of complex data stored in separate files can 20
be loaded in memory and searched in a fraction of a second.
UI (Protocol)

```
Get time range choices for GUI
<:TIMERANGES:>
Expand/Contract
    node=#
    exp=0,1
    rows= expand data until about this many rows are available to user
Get Application List Data
<:APPLIST:>
Expand/contact node:
        expnode=# or exprec=#
        exp=0,1
        exprows= expand data until about this many rows are available to user
View:
    time=...one of time ranges supplied above...
    startrec=# or startnode=#
    count=
Types of data:
    exes=0000 show exes, path, parameters, details
    window=00 show window, type
    urls=00 show server, parameters
    msk=0 sensitive data mask
Filters:
    namefilter=c:\program files\*
Sort:
    sort=-fieldname
Stateless - WILL NOT DO:
    expnded=#,#,#,#,#,#,#,#,#,#,#,#,#,#,#,#,#,#,#,#,#
Return:
    Total count
    This count
    start rec #
    records:
        node#
        name=exe/path/urls/parameters
        details=
        expanded, expandable
will be SIyyyymmddhh matching TRKyyyymmddhh.dat
Each record represents a communication block with server and will be
struct
{
```

Data Storage Files & Types

```
Tree Files
Name will be TREyyyymmddhh.dat.
It will contain the PATRICIA tree image above as a single block of
memory.
Track File
Name will be TRKyyyymmddhh.dat
SRQ, SSB, SSE, TRK, ASE records will be stored as UTF8 including
ending CR LF such as:
TRK,1,2008/11/12 17:42:20.698,1,0,0,0,0,1,1400,tzb=300,tzsn=
Eastern Standard Time,tzsb=0,tzdn=Eastern
Daylight Time,tzdb=-60,d1i=0409,ili=0409,ver=4,geo=244\r\n
Certain characters in TRK are escaped as per Thoron 2 protocol.
Each TRK record will be prefixed by a fixed format binary record:
struct
{
uns32 serverinfo; // index into ServerInfo file
uns64 agentsession; // ?
uns64 prev_session_record; // index to TRK of previous record for session
}
Server Info File
Name will be SIyyyymmddhh matching TRKyyyymmddhh.dat
Each record represents a communication block with server and will be
struct
{
uns32 prev_serverinfo_in_session; // index to SI for previous record for
same agent session
uns64 agentsession; // agent session #
uns64 lastrecord; // index to TRK file for last record of block received
uns64 prev_agent_recv_time;
uns64 agent_sendt_time;
uns64 server_receive_time;
uns64 server_send_time;
}
```

Track Protocol
TRACK Message LIST—common protocol sent by Monitoring Point, e.g., Agent
Location Track
a one-time track about: for example, the computer, language, Agent Script version, etc.
ProcessStart
a track indicating a Process Start; contains, e.g., a flag that an agent is starting, time information, when a process was created, .exe file information, a unique identifier.
ProcessSend
a track indicating a Process End; contains, e.g., a flag that an agent is ending, ExitTime—actual time a process stopped, a unique id to correlate a process end to a process start previously sent.
WindowStart
a track indicating the existence of a window; contains, e.g., a window title, a window class name, whether it has focus, or is idle, an identifier, pairs with WindowEnd.
WindowEnd
a track indicating that a window has been closed; contains, e.g., a Process and Window number, an identifier, pairs with WindowStart
WebPageStart
a track indicating the start of a web page or group of web pages; containing for example, a Process number, a Window number, Web page window number, WebPageStart, Filtered top URL, Filtered top page title, a unique identifier, paired with WebAppEnd. Note that depending on browser version behavior, processes can be different for every window tab.
WebPageEnd
a track indicating the end of a web page group; contains, e.g., Browser Window or Tab number, web page numer, WebAppEnd paris with WebAppStart.

FocusStart
indicates when a window or browser or tab window has focus; contents, e.g., unique id, pairs with FocusEnd track/event.
FocusEnd
indicates when a window or browser or tab window loses focus; contents, e.g., unique id, pairs with FocusStart.
IdleStart
indicates the start of an user Idle period; contents, e.g., unique id, pairs with IdleEnd
IdleEnd
indicates the end of an user Idle period; contents, e.g., unique id, pairs with IdleStart
Metrics
The Monitoring Point (Agent) exemplary application also collects environmental resource metrics that are used for Analytic Application profiling. The following are some Process Metrics as well as System Global Metric examples.
Process Metrics Details
Kt Process Kernel Time (multi-core pam/sam needs to be considered)
ut Process User Time (multi-core pam/sam needs to be considered)
pcu Process Cpu (cumulative, value already divided by # of cores)
pfc Process PageFaultCount (cumulative)
pwss Process PeakWorkingSetSize
wss Process WorkingSetSize
qpppu Process QuotaPeakPagedPoolUsage
qppu Process QuotaPagedPoolUsage
qpnppu Process QuotaPeakNonPagedPoolUsage
qnppu Process QuotaNonPagedPoolUsage
pfu Process Pagefile Usage
ppfu Process Peak Pagefile Usage
ioc Process IO Operation Count (cumulative)
ios Process IO Bytes (cumulative)
roc Process Read Operation Count
woc Process Write Operation Count
ooc Process Other Operation Count
rtc Process Read Transfer Count
wtc Process Write Transfer Count
otc Process Other Transfer Count
Global System Metrics Details
mct Global Mem Commit Total
mcl Global Mem Commit Limit
mcp Global Mem Commit Peak
mpt Global Mem Physical Total
mpa Global Mem Physical Available
msc Global Mem System Cache
mkn Global Mem Kernel Nonpaged
mkt Global Mem Kernel Total
mkp Global Mem Kernel Paged
mps Global Mem Page Size
mhc Global Mem Handle Count
mpc Global Mem Process Count
mtc Global Mem Thread Count
scp Global System Cpu
sit Global System Idle Time
skt Global System Kernel Time
sut Global System User Time
kbd count of mouse clicks from start of agent+script
clk count of keypresses from start of agent+script (up, down, repeat, shift, etc. also counted)
FIG. 13 Example Application User Interface
This example user interface provides a main functional interface to some key elements of the example Synapse Actuating application. The top portion provides a set of common filters for searching the memory tree structure. The main window is the principle interface that displays in classified ordering higher level groupings of monitored applications in both web and native windows apps. The user can expand as needed to greater levels of detail as part of an investigation into Assessment of the running applications in the environment. Drop down windows controls enable the assignment of a given Application's instance and detection details to a given infrastructure resource allocation (IOC Plan: Infrastructure Optimization Classifications FIG. 8). This concludes the discussion on the Example Synapse Application.

In a software environment, user activity results in application activity. The Synapse System uses quantified end-user driven application activity as a means of controlling and optimizing virtual infrastructure that provides an optimization of infrastructure resources in the delivery of application service levels.

REFERENCES
Virtualization:
Virtualization Overview
  VMware www.VMware.com/pdf/virtualization.pdf
VMware SDK
  refer to VMware API and SDK Documentation located at www.VMware.com/support/pubs/sdk_pubs.html
Virtualization Defined—Eight Different Ways
  F5 White Paper—by Alan Murphy
  http://www.f5.com/pdf/white-papers/virtualization-defined-wp.pdf
"Resource Management with VMware DRS" VMware white paper
Patricia Tries
http://en.wikipedia.org/wiki/Radix_tree; also known as Radix Tries;
"Generic, multi-instance method and GUI detection (reference GMGD) System for tracking and monitoring computer applications"
  United States Patent Application #20070083813, now U.S. Pat. No. 8,079,037, Lui; Philip; et. al. Apr. 12, 2007
Port Mirroring "Switch Monitor"
http://en.wikipedia.org/wiki/Port_mirroring; network appliance that monitors packets on a network switch.
Synapse Response Time Indicator RTI [See FIGS. 14 and 15]

Executed within Synapse Monitoring Point and server components, a Response Time Indicator (RTI) may be a type of Synapse System Usability and Productivity Metric that monitors (via Monitoring Points) select object types in an environment and measures an interval of time for these same objects to change its state generically for all applications. RTI metric measurements may be applied in different Synapse modes namely during Synapse Evaluation Mode (SEM) which collects data about an environment for profiling or a Synapse Run Time Mode (SR™) executing optimization using different actuation types. Further RTI metrics may be used to report overall usability of a type of environment, e.g., virtual environment, and be applied and correlated with infrastructure data when forwarded and published to external virtualization management or analytical systems.

RTI metrics can be used in a variety of ways to provide a number of applications in a virtual environment. One is a Synapse Evaluation Mode (SEM) where response measurements collected can be analyzed for resource provision. Another is during a Synapse Runtime Mode (SRTM) during Synapse optimization RTI metrics can provide feedback mechanisms to influence run time rules and decisions for resource redistribution. RTI metrics can also be used for influencing a Synapse Controller which manages automation and actuation of a virtual infrastructure. Another application would be to provide parameterized input to a Synapse Anticipative or Adaptive Controller, e.g., supported by a DSL Component.

A system detects generic changes in any kind of Change Object where an RTI Change Object may be a set of objects detected by a primary Monitoring Point Agent and Engine, e.g., a generic or specific GUI object such as a WINDOW_TITLE, and correlates and calculates changes when correlated to User IO activity. An inspection of a time measurement of all User IO Types finds a latest UserIO-TypeActivity Event Accumulator Value, e.g., mAccumulator in FIG. 15 Last UIO Event to Object State Change. Note, measurements of equal value are prioritized according to a rule. User input output (UIO) has different types, for example, a mouse or keyboard. Activity may be a sum of all user actions using a UIO device typically found in a computing device. An accumulator counts time commencing from some base such as when a user logs into a computer or when a Monitoring Point may be started for monitoring purposes. There can be a range of UIO types which are targeted to produce generic events of origin for a start of a time measurement.

Approach

Figure 14:
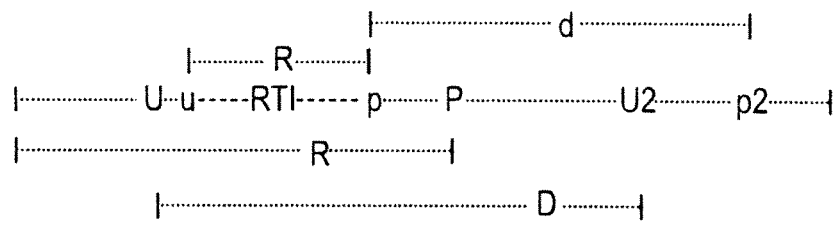
FIG. 14 illustrates an embodiment of a response time metric.

Referring to FIG. 14 "Usability Metric: Response Time Indicator" a Response Time Indicator (RTI) may be an average measurement that has a relative behavior of a Response Time Indicator metric. As anticipated, a RTI gets larger and smaller Response Times relative to its own points of measurement where it's primary advantage may be its generic capability that does not require any specific instrumentation or specialized coding. A duration metric may be an approximation, hence a term such as "indicator," and may be driven primarily by user activity (or lack of) when using an input/output computer device, e.g., keyboard/mouse. Each Response Time Indicator measurement before averaging may be a time between some user input (u) and some program action (p).

There may be a measurable +− degree of error as to whether an input event detected may be a precise one (U) that invokes a system process (P), however, it may be statistically within an acceptable range of tolerance. Given that there are many user interface and program responses occurring concurrently, such a "statistical" approach should relatively reliably correlate with overall system environment performance. This may be analogous to correlating trends in statistical systems. For example, a user input (u) could be later than a correct user input (U). An RTI system's detected program action (p) could be before a correct program action (P). RTI may be effective because its RTI application location, context based measurements (i.e. user input actions and a targeted object changes) are consistent within themselves and differences between RTI measurements and correct (true) events are at least proportional, FIG. 14 "Response Time Indicator" shows a relationship between u, p, U, P and next activity U2 and p2 with response times, response indicators and durations:

$$\text{Response Time } R = \text{correct program action } P - \text{correct user input } U$$

$$\text{User Activity Duration } D = \text{next correct user input } U2 - \text{correct user input } U$$

$$\text{Response Indicator } r = \text{some program action } p - \text{some user input } u$$

Our Program Activity Duration $d$=some next program action $p2$–some program action $p$ System Response Time Contribution to User Activity Duration=Response Time/User Activity Duration*100%=$R/D$*100%

A Response Time Contribution (RTC) formula equivalent=$r/(r+d)$*100%,

Statistical error may be due to u-U and P-p time deltas where for example, these values could be too small due to unknown values. However, if unknown u-U, P-p and are 0, then an Response Indicator=a Response Time.

Implementation

The following is a discussion of an example RTI implementation in its components. This includes a description of the role of the Monitoring Point's Agent solution and its Engine (reference GMGD System) and a portion of the Metric Engine Real Time System (MERTS) component which executes a server analysis of the respective paired time RTI values generated by the Monitoring Point. From the MERTS component, RTI metrics may be forwarded to other Synapse components or to external infrastructure analytical applications.

Figure 15:
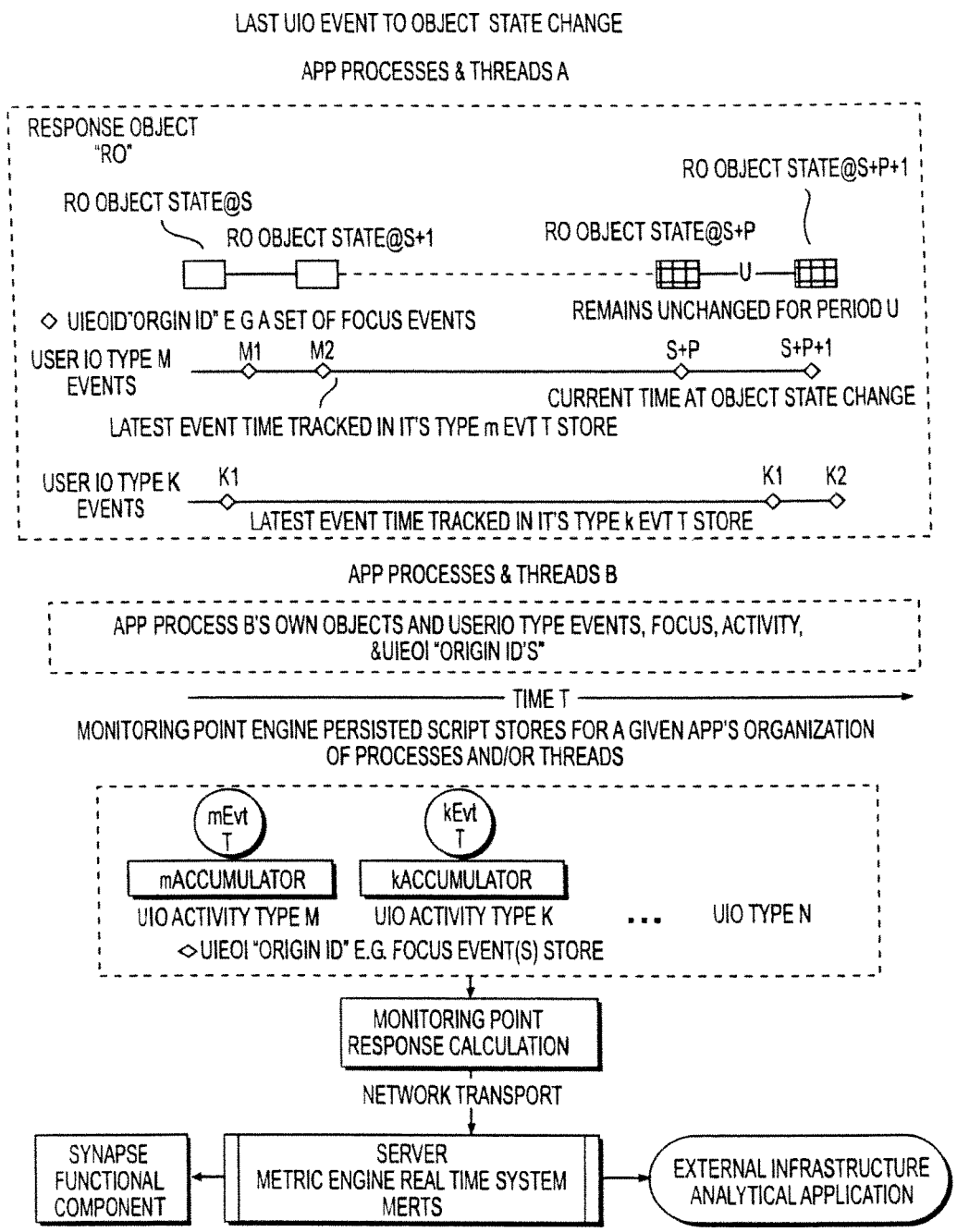
FIG. 15 illustrates an embodiment of a last UIO event to object state change.

The FIG. 15 "Last UIO Event to Object State Change" illustrates the relation of detected events, variables, and calculations supporting an RTI metric.

A Monitoring Point detects any kind of user input activity, e.g., keyboard or mouse activity, the current system time stamp, e.g., from sys_derivedjavatime, provided by the Agent and its interpreting Engine (refer Synapse FIG. 4 "engine.dll") to the run time monitoring script, may be registered and stored persistently in respective variables for any of the user input/output types.

For each User IO Type that measures the number of user action "events" there may be an associated UIOActivityAccumulator that counts UIO events (adjusted for noise filtering), such as the number of keyboard strokes, mouse clicks, or mouse scroll events. To access these Accumulator variables, the run time monitoring engine provides system variables made accessible via keywords in the script language that describes detection logic at the moment of any given processed event. The value contained in a UserIOActivityAccumulator (e.g. mAccumulator and kAccumulator), extracted by the engine, can be treated as Event attributes and (optionally) packed continuously into all track messages that are sent to a server for further processing. At the same time a time value at the time of the "last" detected UserIO Activity may be registered within a time interval of the received UserIOActivity Events and may be stored in value type (e.g. mEvt,kEvt) "Evt T."

Example App Details of Keyboard & Mouse Activity
var keyboardactivity=0; //sys_keyboardactivity // sample it here
var mouseactivity=0; //sys_mouseactivity
Some variables from the example application are
var lastmousepressed=0;
var lastkeypressed=0;
SYSTEM_METRICS
FMT_SYSTEM_TIMES
,kbd=string(sys_keyboardactivity)
,clk=string(sys_mouseactivity)
,{(lastmousepressed>lastkeypressed) $ ua="mouse", uat=string lastmousepressed $$ ua="keyboard", uat=string lastkeypressed}

The total aggregated UIO event count or time count accumulated since the agent and engine initiate at the start of a user session of a given application instance may be automatically tracked by the Monitoring Point's engine.

Change Objects & Response Objects

With UIO Type Activity tracked continuously another detecting mechanism associates the UIO Type events with state changes of relevant, targeted detectable objects in the environment, e.g., Change Objects.

Change Objects are general in nature for detecting any kind of state change of any detectable object. A Monitoring Point has mechanisms to store the state of an object and detect any change over a period of update cycles. (refer the cited GMGD patent reference) A Change Object may be used to measure any kind of change of state whether an event or the event's properties. Furthermore, a Response Object may be a kind of Change Object and used with a further intention to measure a kind of response time indicator.

A Change Object can be either specific or generic (refer to the cited GMGD System for additional details). The RTI System uses but may not be limited to changes of generic objects (generic objects contain common aspects for and representing a broad set of objects) but can also detect specific objects requiring detection of specific changes of properties, attributes, or specific detectable details of any objects (refer to the cited GMGD System patent reference). Both generic and specific objects can be detected as sequences (ordered sets), non sequences (where order doesn't matter), or some mixture of these sequential and/or non sequential sets. The RTI system has a range of precision where the greater the specificity i.e. a specific object, of a Change Object that may be associated with a set of User IO Events, the greater the accuracy but requires more effort to achieve significant coverage. With less specificity a very high coverage percentage of all applications can be achieved which may be deemed the greater commercial benefit (subject to issues of business models).

There are a number of possible guiding criteria for selecting a kind of Response Object from the realm of possibilities of a generic Change Object. It should reflect something significant in an environment and serve as an "indicator" for the performance state of the monitored environment such as a VDI VM in a virtual infrastructure environment. The behavior of the Response Object should have a "kind of" constant behavior where its measurement reflects some targeted performance of an environment's component, e.g., a guest vm (VDI) in a virtual infrastructure. For example a component's resources can be severely affected if a vm becomes starved of resources due to contention with other vms and may affect the time it takes for a Change Object's state to change.

For a ResponseTime Indicator metric, an associated Response Object may be determined. As mentioned, a Response Object which may be an object of interest to be monitored (a kind of Change Object), can be any object which can be detected by, e.g., the gmgEngine System (from the cited GMGD patent) or other monitoring system, that generate an event based on a Change Object Type, e.g., a Response Object (for measuring a time interval from one object state to a change of state for the same object). Then when a state change may be detected for the Response Object then a number of actions or events may occur and be associated with a UIO Type Event.

The Response Calculation: the RTI system inspects time stamps of its set of UIO Type Activity Time Accumulators each of which has a separate corresponding accumulator (UIOTA_TA), e.g., for a mouse or keyboard, then retrieves the UIOTATA with the latest time. In the example application, this latest time action of the UIOTATA may be executed as part of a script language syntax and a script keyword. This embedded data may be used for later processing at the server tier (e.g. MERTS) for calculating metrics, e.g., the Response Time Indicator Metric. Also the current Time Stamp at the time of the RTI Response (Change) Object may be sent as an Attribute with the associated Track message which may be used by a Synapse analyzing component e.g MERTS. Note that it may be a common phenomena that the same time stamp occurs within "clusters" of tracks which provides a convenient grouping function for subsequent server analysis.

The combination of a generic User IO Type Activity Event and generic object detection, provides a powerful solution for measuring response time indicators that provides very broad coverage of almost all applications. It can be effective as a Usability Metric within virtual environments because within a virtual guest machine it reflects the relative performance of the virtual machine within a hypervisor.

UIEOI "Origins"

A feature of the Usability Metric RTI may be an RTI UserInput_EventOrigin Identifier (UIEOI) found from and within a monitored event (from the Monitoring Point) that identifies a portion of an operating system (OSArea) or an associative point of origin of a user input action, where an OSArea may be based on a run time object's environment surrounding the captured Event. The claimed system provides an "event origin tracking" mechanism by which UserIO, e.g., a mouse click can be associated with a correct object state change within a logical application's organization, e.g., a window of a home page or within an OS process. Without "origin information" there may be potential for a click event (which may be generically detected across all applications and windows in the operating system) being associated with an incorrect Change Object (Response Object), where an incorrect Change Object means the click event and the change object are in a different application and its associated OSArea, e.g., processe(s) resulting in calculation errors and do not reflect consistent measurements.

A Focus event may be one example of an UIEOI (identifier). Other UIEOI examples are processes and threads. Typically a click occurs within a particular application process or thread where the process or thread (or focus) can be used as a UserIO Event "origin identifier." The claimed system also uses a "time grouping" mechanism, e.g., the UserIO Type Activity (UIOTA) Event timestamp that associates or groups a series of related tracks. This track series can be used to clarify different conditions and states of the application.

UIEO Id Example

An Event generated by the User's IO Type Activity has other events, attributes, or application states associated with it. One in particular may be a Focus event common to operating systems using user controlled interface devices. A Focus event can be used to associate an IO Type Event, e.g., a mouse click, with a specific object change (the RTI Response Object) contained in a window. The objective may be to ensure that a click event in a particular window may be monitoring an object contained in the same window. This eliminates many errors of association when a user clicks in one window, waits for a new page to load, but meanwhile clicks on a different window while multi tasking. Thus, when a user io event, e.g., mouse click, may be detected within an application window, specific Focus event attributes associated with the particular window may be stored. These Focus event attributes can be embedded along with the click event into a Track message and sent to a server (refer to MERTS discussion below).

For example, if a user clicks on a window, but the window's content may be changing as in a web page for example, and a change may be detected in the RTI Response Object, then it must be associated with the same Focus event registered previously from the mouse click that causes a change in the Response Object. The UIEO Id, e.g., Focus event associating mechanism provides a grouping function to connect related detected, common object and its events together for response time measurements i.e. the time interval between two states of the same Response Object.

RTI Analysis in the MERTS Component

The MERTS server component receives performs real time calculation for the RTI metric over a network from the Synapse Monitoring Point. The MERTS server component, processing incoming Monitoring Point Tracks, then executes a calculation taking the (current) Track's event time, where every Track message has a time stamp which has been generated by a Response (Change) Object event, and subtracts the UIO TypeActivityEventTime value retrieved from the UIOTypeActivity Event Accumulator, resulting in a response time measurement i.e. the Indicator. The calculated results are then forwarded to any external consumer of the RTI metrics which provide further processing or correlation with other data sets, e.g., virtual or physical infrastructure analytics applications for purposes of for example, troubleshooting, diagnostics, assessment, or management. An RTI metric can also be forwarded to any internal Synapse component, e.g., a Synapse Controller. Refer to FIG. 15 "Last UIO Event to Object State Change" and item External Infrastructure Analytical Application.

Accordingly, in embodiments, the run-time data comprises a detected user action and system state change in response to the detected user action for a third plurality of the user IDs. In such embodiments, further steps may be performed of calculating, by the one or more computers, response time data for each of the third plurality of the respective user IDs, the response time data for a respective one of the user IDs based at least in part on the detected user action and system state change in response to the detected user action for the respective user ID. In such embodiments, further steps may be performed of determining, by the one or more computers, current application response data for each of the third plurality of the user IDs, wherein the current application response data for a respective one of the third plurality of the user IDs comprises performing a calculation on the application response data for all applications used by the respective user ID or for all detected user actions within an application, over a period of time, and comparing, by the one or more computers, the application response data for a respective one of the third plurality of the user IDs to prior application response data for the respective one of the third plurality of the user IDs. In embodiments, the calculation may comprise calculating a moving averaging over a moving window of time, a calculation of the mean for the data, or an aggregation, to name just a few possible calculations.

In embodiments, the signals relating to the allocation data may be sent or made available, by one or more computers, when selected changes in application response data occur, such as difference between the current application response data and the prior application response data exceeds a level. In embodiments, this level may be predetermined. In embodiments, this level may vary based on one or more parameters.

Figure 17:
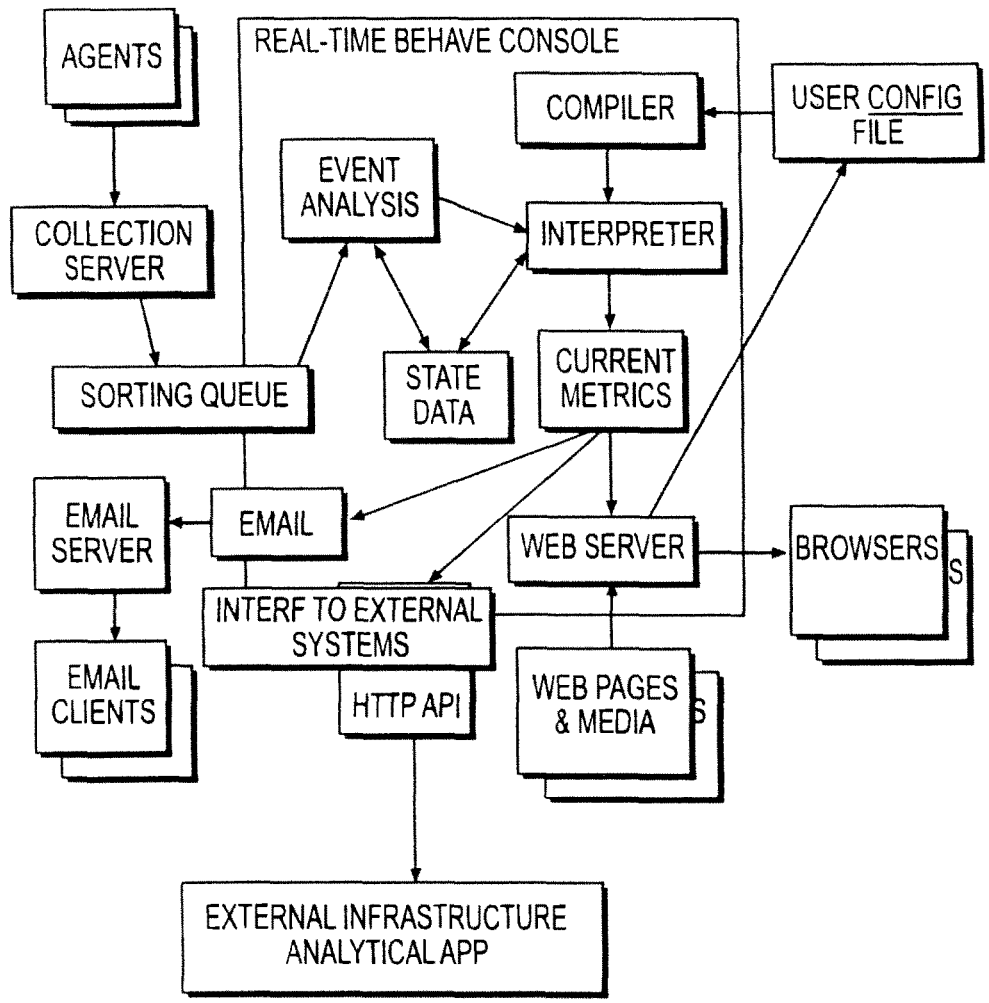
FIG. 17 illustrates an embodiment of MERTS components.

A Synapse Metric Engine Real Time System MERTS [See FIGS. 16 and 17]

Using a Metric Engine Real Time System, or MERTS, users can rapidly configure dashboards of metrics and conditions to monitor in real-time events from a variety of sources from Synapse Monitoring Points, databases, or external real time feeds. Referring to "FIG. 16 MERTS Real Time Console" shown are Agents, which are a type of Monitoring Point, that send track information to a server collection point. A Real Time Console is comprised of multiple dashboards to provide users with a real time view of incoming calculated metrics. Configuration files provide pre-set Console controls, such as user identification, alerting configurations, metric sets, and so on. Alerts can be generated and communicated through automatically sent email.

Some example MERT metrics that can be specified to appear on real-time dashboards are as follows:
Number of agents currently running
Average and peak response times of selected of transactions in the last 20 minutes
Count of certain programs currently being used
Average use of selected web applications in the last ½ hour
Current rate of users launching selected programs
Current number of users running but not using a selected program
Count of users exceeding a number of slow transactions in the last 30 minutes
Percentage of users complying with a usage pattern (using notepad<20% of time) in the last 2 hours
Last 5 people to have selected errors
Number of people in the last 15 minutes using a restricted application
Current number of errors per minute
Number of users currently using a certain web page
Number of people switching between 2 selected screens too often in the last 30 minutes
Current average network performance for a group of users MERTS Architecture MERTS has an English-like language (MERTSL) to specify complex and varied metric expressions to extract from incoming Monitoring Point Agent collected data. It can be used in this real-time application to define desired metric information and deploy new metrics in real time which may be particularly useful in the management of Virtualization Infrastructure.

Referring to FIG. 17 "MERTS Components," R minute old (adjustable) raw tracks are taken from a Collection Server every N seconds (configurable). The agents can wait up to Q time interval time units (where these units are configurable in the agent) to gather larger blocks of tracks to send to the server for more efficiency.

Event Analysis examines start-end pairs of events and performs different checks of incoming data from a set of Monitoring Points. For example it will generate missing end events if needed. Another example may be an agent that may be too slow sending data in real-time or has stopped sending data can be detected.

A User Config File holds a user's desired metrics to monitor in real-time. A user-friendly high-level syntax may be used for a user to specify metrics of interest which summarize activity within sessions and across all session.

A Compiler converts a user's MERTS Metric descriptions entered via a console to monitor in real-time to a fast runtime format.

An Interpreter applies incoming events to a fast runtime computation of a desired metrics.

A structure Current Metrics holds the latest interpreted result values for consumption by external components such as a Web Server or an external Infrastructure Analytical Application.

A Web Server serves Web Pages to the user's Browsers after inserting Current Metric values via dynamicHTML for rapid displays in a wide range of visualizations.

MERTS User Expression Syntax

Some examples of a MERTS syntax describe a variety of metrics:
Average use of a web search site www.searchsite in the last hour
"average active page www.searchsite per hour"
Number of people switching between 2 selected screens too often (4 times) in the last 30 minutes
"count (count screen A then screen B then screen A for user>4) per 30 minutes"
Percentage of users complying with a usage pattern in the last 2 hours
"percentage (running notepad or running WordPad for users) per 2 hours"

Regarding storage, using a standard database for input may be a limiting factor for supporting large client bases; therefore, a preferred solution, may be an in-memory analysis mechanism which supports many times more users and much faster performance than would be possible using typical database retrieval with limited network transfer times. The claimed system MERTS component has much greater flexibility and speed for supporting real time and timely processing. Efficient implementation reports metrics based on events after the Real-Time Console starts running or when a new metric may be added to the console. Some example MERTS metrics are as follows:

a count of users currently running a specific application that only includes users that started an application after a Real-Time Console started since an application name reported at start time must be known to a Console.

A count of users currently running any application can more accurately include some applications started prior to starting a Real-Time Console because many events can signal to a Console that a program has been running after a program has already started.

MERTS Implementation

Referring to FIG. 17 "MERTS Components" State Data, State information may be stored in maps or arrays in a tree (of maps) for all hierarchal contexts of information (agent session, script session, parameters: L1, L2, L3, L4, L5, and others).

Cases are handled such as for "Dropped" agent sessions where an agent abruptly stops or may be unable to send tracks in real-time (fast enough) must not leave inaccurate results such as programs still running. A MERTS run time system also provides simulated ends of information for all unmatched starts (like simulating programs ending for each program starting). An issue occurs when real-time delivery of tracks may be required but can be unreliable using current standard database collection solutions. As often may be the case, a Console will wait an extended period of time for agents to deliver track data and for a server to store tracks, but if data may be delivered with too much latency it can be lost. A workaround would be to assume a source Monitor Point agent has died and would close a current agent session information. The event may be logged (like any metric—on dashboard or via email). Or, if data arrives later (with a gap), an option would be to start the agent session as a new one;

however, missing prior information could be confusing or impact metrics. Such occurrences are logged for later diagnostics.

MERTS in memory capability supports a kind of retroactive adjusting system feature such as making updates to values to make corrections as though data had arrived precisely as expected. Current definitions of Counts, Averages, Rates, Max, Mins, & etc can all be computed retroactively with only minor errors through approximations. This enables a Real-Time console to process data as it arrives from agents immediately. Some examples may be as follows:

Count program starts: This count can be updated at the time the event arrives and can ignore a time of an event Count programs running: This count can be incremented at a time a start event arrives and decremented when a matching stop event arrives. If a stop event arrives first, both events can be ignored.

Count Programs started per hour: Since this may be represented by an average of 1/rate of starts, an average value can be updated retroactivly by computing an effect an event would have had at that time.

Referring to "FIG. 17 MERTS Components" main modules of a MERTS run time engine may be comprised of components Event Analysis, Interpreter, and Current Metrics. The central process loop "MERTS.ProcessEvent( )" method uses all 3 components as well as the MERTS Map of Trees (State Data).

A Tree of Maps contain state information that may be used both by an "Interpreter" and "Event analysis." A function Behave.APPCTX & MyMap form a Tree of Maps which are invoked from Behave.CTX.m. Referring to the FIG. 17 "MERTS Components," State Data may be the Tree of Maps which may be comprised of a cContext (or Scope) may be a set of instances in a sub-expression which are computed for:
  One instance globally
  Per agent (or user or computer)
  Per script session
  Per program
  Per window
  Per web page Instances of state information for expressions are stored in the Tree of Maps at levels corresponding to a desired Scope or Context.

A CTX class may also be a context for evaluating an expression. It provides for expressions:
  Contents of a track to process
  A Tree of Maps
  Storage of intermediate sub expression values Tracks refer to L1 . . . L5 (scopes) as "cContext" information identification identifies the surroundings at a time of a track event (which program, window, etc). Note that "cContext" may be reserved for use with CTX, and "scope" may be used when talking about different levels of information in a Tree of Maps, or where a sub-expression should be evaluated.

"Event analysis" consists of housekeeping functions like data cleanup when sessions terminate, programs end, windows close, etc. A cleanup process will prune a tree if certain metrics have completed processing or certain ending events, e.g., window start followed by window close event may be done by a set of Behave.End_*( ) and Behave.int End_*( )methods.

"Interpreter" applies each event provided by Event Analysis to all metric event expressions. Each metric expression may return a same or an updated value. An Interpreter may be serviced by a set of Operators that can be combined in a large set of combinations to provide powerful real time metric mechanism for an analysis of data generated by a Synapse Monitoring Point.

Operators are organized into a number of categories, namely:

Primary Numeric Expressions—no parameters
  Examples: track_count, event_count, total_calc_time, avg_calc_time Unary Numeric Expressions—1 parameter (on either side)
  Examples: maximum Delta, duration Boolean, rate from daily, days, . . . to millisec Binary Numeric Expressions
  Examples: Numeric Larger, smaller, arithmetic operations . . . for 2 parameters Highest priority operators are applied last EVENTS, INSTANCES, DELTAS and BOOLEANS are all distinct

INSTANCES

SAME (does not change type of any parameter)

conversions from BOOLEAN to INSTANCE & etc are compiled automatically

A metric Event Expressions are contained in a collection of implementations of Behave.EXP.res( )

Behave.CTX holds a context information for evaluating expressions.

FIG. 17 "MERTS Components" "State Data" holds a current computed values available for use from MERTS "metric consumers", e.g., web page requests, or for sending to an external system such as an application like some data trend tool, a correlation application, infrastructure managing application, etc.

That information may be held in Behave.MET with DynHTML.ItemNum, DynHTML.ItemNumArr, ExternalApplication objects.

Persistent User Context Id (PUCI)

MERTS processing includes specialized functions and operators for dealing with PUCI structures arriving from Monitoring Points. At a MERTS tier, various functions perform MERTS specific processing relevant to an incoming Monitoring Point data. A PUCI instance may be detected, further processed, then forwarded to other Synapse tiers or processors such as the Synapse DSL System which handles prediction and anticipation functions. Furthermore, metrics communication directly to outside external components such as a Synapse Centralized Management (Synapse System FIG. 4), may also take place.

This concludes the discussion on Synapse MERTS whose real time analysis of Monitoring Point data enables timely delivery of many kinds of metrics to both Synapse internal as well as to external analytical or management systems.

A Synapse DSL Prediction and Anticipatory Modeling System [See FIGS. 5-13]

The Synapse DSL System may be an exemplary application that executes an Anticipative prediction capability of a Synapse Predictor (reference Page 24 of the Provisional Patent Application 1-September 2011: SynPatApp1). Time independent models describing states coupled with real time monitored instances, contextual user activity can be anticipated using computed probability models ("probabilistic modeling framework" (SynPatApp 1, p. 22) produced during a Plan phase as shown in FIG. 4 "The Synapse System" in SynPatApp1. As stated in SynPatApp1 Page 36, line 16, "The Controller processes the Control Plan developed by the Planner (FIG. 8), using state estimates obtained from the Detector at the GRAM Evaluator. The controller actuation is moderated by the probabilistic weights assigned to the detector outputs." The DSL System demonstrates an exemplary case of the utilization of probabilities to determine how a run time detected event instance can be used to anticipate a future action. DSL outputs can be used in a number of applications which can include but not limited by a DSL driven resource allocation in virtual infrastructure. Another use of DSL capability is in the Assess and Plan phases of the Synapse process where quantification and construction of DSL models provides a probabilistic modeling framework (with a strongly Bayesian bias) for a control system in virtual infrastructure. DSL real time processing and output enables "predictive sequence instance" based control of infrastructure resources.

The Synapse DSL Module

The purpose of the analytic DSL runtime component may be to process both deterministic as well as probabilistic events arriving from an external module. Its purpose is to correlate or handle event patterns that are both known and unknown. It also uses a system model that is independent from time as well as a system for handling instantiated real time events. Being independent of time, the system is able to execute predictive anticipation of events as they are arriving from an external source based on pre computed probabilistic models.

First, is an overview. Referring to FIG. 18 "DSL Projections," in order to describe the user intention, the interaction model may be split into two projections:

1. from the user intention space to the application usage space
2. from the application usage space to the track space The user intention space reflects the goals and the behavior of a user. It can be a business task, an entertainment desire or any other intention the user might have in front of a computer. The application usage space reflects the activity on the computer. It can be an application activity, a web browser activity or any other activity which takes place on a computer. The track space reflects a granular capture of the activity of a computer. It can be the title of a window, the content of a text field, the memory consumption of the computer of any other information that can be captured on a computer.

The projection 1 may be modeled as a probabilistic grammar and the projection 2 may be modelled as a deterministic grammar. In order to handle and extend the coverage of both models, we are using a meta-syntax to express both grammars.

Synapse Domain Specific Language (SDSL or "DSL")

The Synapse DSL Component's objective is to create a tool that allows to manipulate, extract and share information based on Knoa track data at different levels of complexity.

The following discussion refers to FIG. 19 "DSL Data Flow." Note that the term "event" may be localized to each "tier" i.e. Tracks, Token and deterministic events, Probabilistic, and Metric tiers. In other word if used, it may be intended to mean an event that results from processing within a tier. For example, a Token probabilistic event results from the processing of incoming tracks. This event may be a different process than for processing to produce a probabilistic event.

Track Event

The above definitions are voluntarily as general as possible in order to let us build a flexible data model on top of track events.

Track Event Type

A track event type may be defined by:
its kind k
a set of attributes A={an, 0≤n<N} Kind examples:
SRQ, ASE, TRK session start, TRK window title
Attributes set examples:
{a_ver, domain, computer, os_info}
{ss_id, ts, l1 l2, obj_id, message}

Track Event Instance

A track event instance may be defined by:
its kind kI
a set of (attribute, value) pairs AI={(am,vm), 0≤m<M}
Attribute pair examples:
{(a_ver,1.2), (domain, nyc-14.knoa.com)}
{(ss_id,1),(ts,1320541),(l1,654),(l2,104),(obj_id,57),(message,outlook.exe)}

A track event instance belongs to a track event type if:
1. kI=k
2. |AI|=|A|
3. $\forall (a_m, v_m) \in AI, \exists a_n \in A$ where $a_n = a_m$ Synapse DSL In order to build a flexible while efficient data model on top of track events, we need to create a grammar oriented Domain Specific Language (DSL). The grammar may be composed of a set of token types which are derived from track event types and a set of production rules. Production rules allow us to define higher level events (in opposition to low level token events).

Token

Token Type

A token type may be defined by:
its kind k
an ordered set of pairs (sContext attributes, value) C={(cn, vn), 0≤n<N1}
a set of pairs (regular attributes, value) A={(an, vn), 0≤n<N2}

C and A can be empty sets. The value associated with each sContext or regular attribute can be null. In that case, the token definition may be a dynamic definition, i.e. a token type will be created for each unique value associated with attributes having a null value.

Kind Examples:
SRQ
TRK session start
TRK window title
sContext Attributes Ordered Set Example:
{(user,null),(agent session,null)} {(user,"Patrick")}
Regular Attributes Set Example:
{(pn,"Outlook")}

Splitting the definition of a token model on three dimensions (kind, sContext attributes and regular attributes) instead of just one allows us to give a particular role to each dimension when defining tokens and when combining tokens together in production rules.

In order to define a token, one must at least give the kind of the token. The kind of the token is written in capital letters. Example:
PROCESSSTART Each kind of token has a number of sContext or regular attributes accessible through the "." (dot) character. Examples:
PROCESSSTART.message
PROCESSSTART.user In order to set the value of an attribute, we can use "==" symbols (TODO: change to something else, "->" for example). An attribute without assignment may be considered to be null. For example:

PROCESSSTART
PROCESSSTART.pn=="Outlook"
PROCESSSTART.pn=="Outlook" && PROCESSSTART.user
PROCESSSTART.pn=="Outlook" && PROCESSSTART.user=="Patrick"
represents all Process start events
represents Process start events with the attribute "pn" equals to "Outlook"
represents several Process start events with the regular attribute "pn" equals to "Outlook" and the sContext attribute "user" equals to each new "user" attributes
represents Process start events with the regular attribute "pn" equals to "Outlook" and the sContext attribute "user" equals to "Patrick"
    Null attributes will allow generation of events per user or per application.
    Attribute values don't have to be Strings or Integers. they can be more complex, e.g., a regular expression or some rewriting rules that are manually defined or computed.
Token Instance
    A token instance may be defined by its
    its kind kI
    an ordered set of pairs (sContext attribute, value) CI={(cm, vm), 0≤m<M1}
    a set of pairs (regular attribute, value) AI={(am, vm), 0≤m<M2} CI and AI can be empty sets.
sContext attribute pair ordered set example:
{(user,"Patrick"),(agent session,2),(script session,7),(l1, 204),(l2,5874)}
Regular attribute pair set example:
{(message,"outlook.exe"),(pid,247), (en,"C:\Program\OUTLOOK.EXE")}

A token instance belongs to a token if:
1. kI=k
2. |CI|≤|C|
3. ∀(cm,vm) ∈CI, ∃cn ∈C where cn=cm and index(an)=index(am) and min(index(an))=0
4. |AI|≤|A|
5. ∀(am,vm) ∈AI, ∃an ∈A where an=am
TODO: clarify+examples for 2 and 3

During the tokenization process (translation of incoming track instances into token instances), a token instance may be created if it belongs to an existing token type.
Deterministic Event
Deterministic Event Type
    A deterministic event type may be defined by:
    a deterministic production rule
    an ordered set of sContext attributes C={cn, 0≤n<N}
Deterministic Production Rules
    Deterministic production rules are combinations of token types and other deterministic production rules in order to define high level events and deterministic sequences of events. Production rules are defined using the Extended Backus-Naur Form (EBNF) metasyntax. Example of symbols used in the EBNF:
* repetition-symbol
- except-symbol
, concatenate-symbol
| definition-separator-symbol=defining-symbol
; terminator-symbol
Examples of Production Rules:
Reference: Event Expressions Example
    Two example applications and their respective event types are shown.

```
// Application 1
WINDOW_TITLE = TRK_WINDOW_TITLE;
App1_Start = (TRK_WINDOW_TITLE.MESSAGE == "Knoa: Projects");
App1_Project = (TRK_WINDOW_TITLE.MESSAGE == "> Overview");
Project_Writeboard = (TRK_WINDOW_TITLE. MESSAGE == "> All writeboards");
New_Writeboard = (TRK_WINDOW_TITLE. MESSAGE == "Writeboard: New version");
New_Writeboard_Saved = (TRK_WINDOW_TITLE.MESSAGE == "Writeboard:");
// Application 2
App2_Start =
    (TRK_WINDOW_TITLE.MESSAGE == "^CRM\\c the cloud\\c and the social enterprise");
App2_Login =
    (TRK_WINDOW_TITLE.MESSAGE == "^App2.com - Customer Secure Login Page");
App2_Home =
    (TRK_WINDOW_TITLE.MESSAGE == "^App2.com - Professional Edition");
App2_Leads_Home =
    (TRK_WINDOW_TITLE.MESSAGE == "^Leads: Home \\d App2.com");
App2_New_Lead =
    (TRK_WINDOW_TITLE.MESSAGE == "^Lead Edit: New Lead \\d App2.com");
App2_Lead =
    (TRK_WINDOW_TITLE.MESSAGE == "^Lead:");
App2_Convert_Lead =
    (TRK_WINDOW_TITLE.MESSAGE == "^Convert Lead:");
// --------------------
BrowserStart =
(PROCESSSTART.pn == "internet explorer*") | (PROCESSSTART.pn == "ie*")
BrowserInstance =
BrowserStart .* PROCESSEND
OutlookStart =
(PROCESSSTART.pn == "*outlook*")
OutlookInstance =
OutlookStart .* PROCESSEND
OutlookWebAppStart =
(WEBPAGESTART.message == "http://*owa*")
OutlookWebAppInstance =
OutlookWebbApp Start .* WEBPAGEEND
```

```
Email Start =
    OutlookStart |
    OutlookWebAppStart
EmailInstance =
    OutlookInstance |
    OutlookWebInstance
ApplicationInstance =
    EmailInstance |
    WebBrowserInstance
``` sContext Definition

An aspect of the Synapse System, the sContext (refer also to bContext described in the MERT System in this application for further details) of a deterministic event type may be the smallest common subset of sContext attributes sets between each token types in the production rule. An sContext may be an ordered set of attributes. The order defines the hierarchy of the sContext, e.g., (agent session, script session, 11). An sContext type will be the simple ordered set. An sContext instance (attached to a token, event or sequence instance) will have a value associated to each sContext attribute. This may be the only thing in the sContext.

Several operations can be performed on an sContext instance (compare two sContexts, extract a sub-sContext, e.g., (agent session, script session, 11)->(agent session, script session), check if one sContext may be included in another one etc.) that allows performing the deterministic and probabilistic parsing within only a given sContext. Each type (resp. instance) —tokens, events and sequences—extends the sContextualized type (resp. sContextualized instance).

For example, for the following event:
OutlookStart=
(PROCESSSTART.pn=="*outlook*")
there may be only one token with an empty sContext attributes set. So the OutlookStart event also has an empty sContext attributes set. But if
OutlookStart=
(PROCESSSTART.pn=="*outlook*" && PROCESSSTART.user)
the sContext attributes set will be
{(user,null)}
and different OutlookStart event types will be generated for each user. If
OutlookStart=
(PROCESSSTART.pn=="*outlook*" && PROCESSSTART.user=="Patrick")
OutlookStart events will be generated only for the user Patrick.

In some embodiments, the sContext may be viewed as a location of an event within an application. For example, an sContext may comprise that a user action (e.g., button push, icon click) occurred when the user ID was in the sContext of being in a virtual machine (VM), in an enterprise, from a desktop computer within that enterprise, and in a given application)

Deterministic event instance means an instance of an event that has occurred, e.g., it is not predicted to occur.

Probabilistic Event (Task)

Let a task be a high level (business level?) event. A task may be composed of a set of steps and a set of ordered pair of steps (directed graph) representing the transition from one step to another one. A task instance (e.g. a user doing a task) might contains a lot of variations when compared to its model. We introduce random variations in both step order and step kind in order to take into account those variations.

Step Order Variation

The step order variation models a sequential variation of the execution of a task. For example, the "Write an Email" task can be described as the following sequence of steps. Refer to FIG. 21 "Step Order Variation 1."

But the actual realization of this task might be subject to variations. Each step transition has a different probability of occurring (e.g. chances that "Email start" will be followed by "Email close" are very low, and chances that "New Email" will be followed by "Mutate" are very high). Refer to FIG. 22 "Step Order Variation 2."

Step Kind Variation

The step kind variation models the variation within a step. The premise may be that we don't exactly know how a step may be executed so we suppose that the step can be executed by any kind of interaction. For example, the "Email start" step can be the user opening Outlook, or opening his web browser to use the web application. For the task "Produce code", the user can start this task with a lot of different applications (Eclipse, Notepad, the terminal, Word etc.). But each application will have a different probability of being used for a given step (e.g. Eclipse will more likely used to produce code than Notepad or Word). Refer to FIG. 23 "Step Kind Variation 1."

Having deterministic event and state separated allows us to be more general and more flexible when trying to classify user activities.

Task Model

Figure 24:
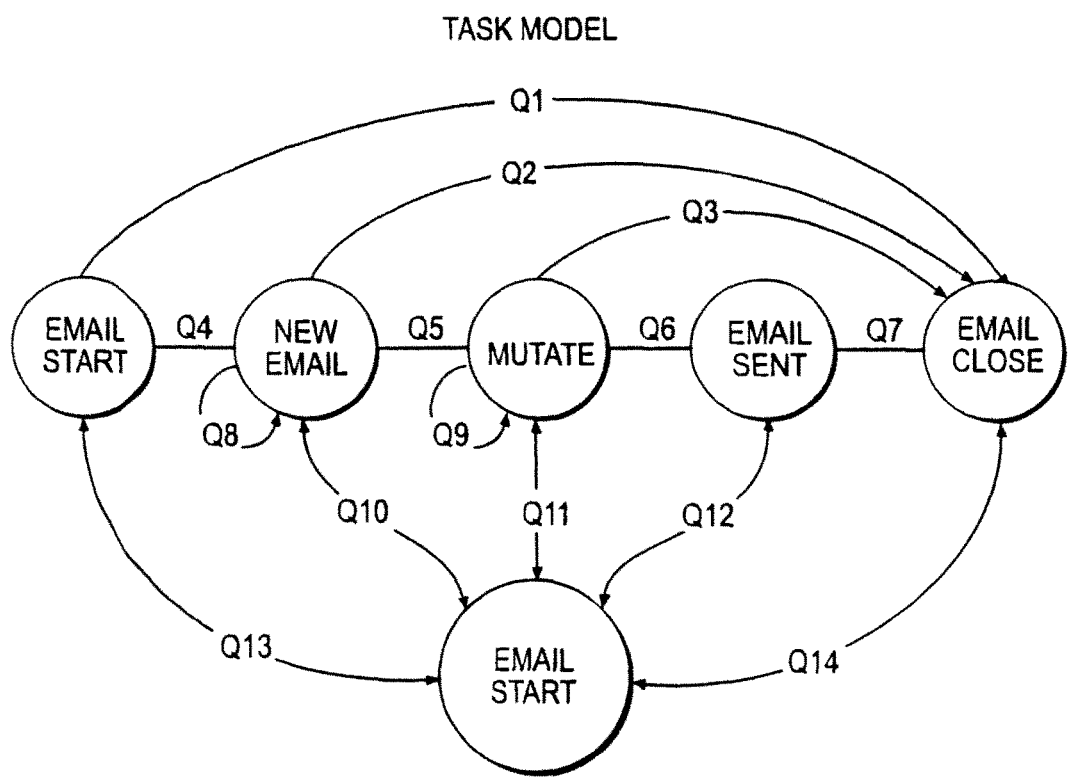
FIG. 24 illustrates an embodiment of a task model.

A task can be modeled as an Hidden Markov Model (HMM). A task may be a kind of Markov chain. Task steps are hidden states (represented by circles), deterministic events are observations (represented by rectangles). Each state may be associated with a transition probability to every state in the chain (including itself). Each observation (deterministic events) has an emission probability for each state. A Markov chain example. Refer to FIG. 24 "Task Model."

Figure 25:
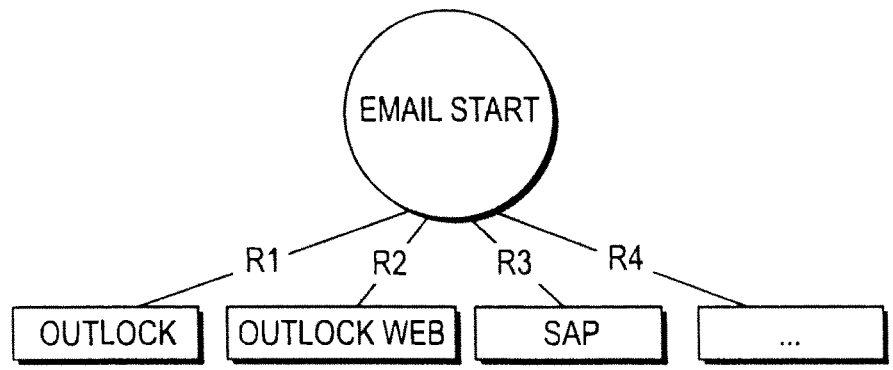
FIG. 25 illustrates an embodiment of an example of an emission probability.
Figure 26:
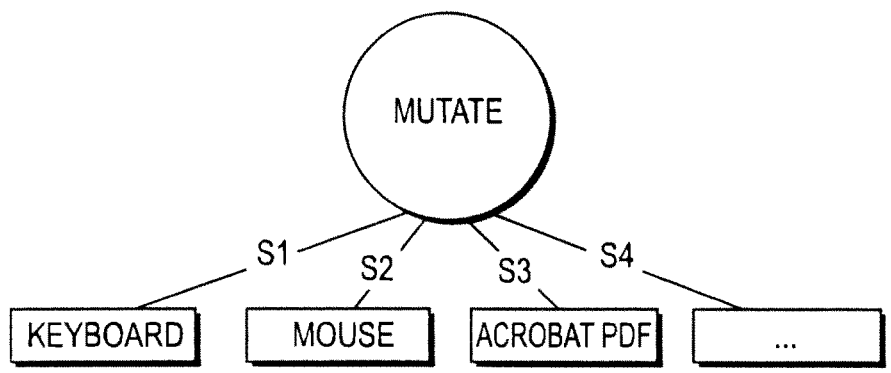
FIG. 26 illustrates an embodiment of another example of an emission probability.

Emission Probabilities Examples:

Refer to FIGS. 25 and 26 "Emission probabilities examples 1 & 2." Emission probabilities are the probabilities of observations reaching a particular state i.e. Email Start or Mutate respectively Current Task and Current State Each state may be associated with a probability of being in that state (per user). The state with the highest probability may be chosen as the current user state. The task defined by the Markov chain containing this state may be chosen as the task currently executed by the user.

Run Time Estimation and Anticipation

The probabilities are updated at each event or time increment allowing a run time task classification. It may be possible to anticipate the user behavior. With the previous example, we anticipate that:

If the user is in the "New Email" state, there may be 70% chances that he will start writing an email, 10% chances that he will open another "New Email" window, 10% chances that he will close the Email application and 10% chances that he will start doing something else.

Create Task Production Rules

There can be several ways of creating tasks:
- Use another DSL and write production rules for each task (it can be done in a more visual way if the user manually combine and assemble each step of a task)
- Record one or several task execution per task and generate the production rules
- Find tasks from an off-line analysis and extract production rules from them Specifying the emission probability of each deterministic event for each hidden state may be too complicated. So when one is creating a new task, a deterministic event may be used in order to build a state. This deterministic event will then have a high emission probability for this state. But every other event will have a small emission probability for that state.

Learning

By having an emission probability higher than 0 for each deterministic event for each existing step, we allow the task definition to be improved during a learning phase. If a set of users are performing a given task, the state transition probabilities and the emission probabilities can be modified in order to maximize the resulting likelihood of the task execution being in the task model. For example, a task model can contain a step that have been create with the "Notepad Instance" deterministic event. During the execution of this task, a lot of user are using "Word Instance" instead of "Notepad Instance" but the rest of the sequence may conform to the model. We then will be able to increase the emission probability of "Word Instance" for this step in order to have a more accurate model. This functionality also allow us to compare the difference between task models (as seen by managers) and task executions (as realized by end-users). Of course, a task model must have enough "anchor steps" in order to classify user activities.

Functions

Metric Functions

Metric functions are used to easily share the information produced by Synapse. Metric functions can:
- be applied on tokens
- be applied on deterministic events
- be applied on tasks
- be combined with each other
- operate in a certain sContext (per user, per application, per task . . . ) Examples:

COUNT( )
COUNT(PROCESSSTART)
COUNT(BrowserStart)
COUNT(BrowserStart) GROUP BY User COUNT(WriteEmailTask)
DURATION( )
DURATION(BrowserInstance) DURATION(WriteEmailTask)
SUM( )
SUM(DURATION(BrowserInstance))
AVG( )
AVG(DURATION(WriteEmailTask)) GROUP BY User Utility Functions Some symbol associations are common in the GEM grammar. For example, if one wants to get the focused time spent in each application, he would have to define the focused instance for each application:
BrowserStart=
(PROCESSSTART.pn=="internet explorer*")
Browserinstance=
BrowserStart.*(FOCUSEND.* FOCUSSTART)*PROCESSEND With a FOCUS( ) function, one would directly use:
Browserinstance=
BrowserStart.*PROCESSEND
FOCUS(BrowserInstance)
and be able to use metric functions on it:
SUM(DURATION(FOCUS(BrowserInstance)))
or
SUM(DURATION(FOCUS(NOTIDLE(BrowserInstance))))

Data Flow FIG. 19 DSL Data Flow

FIG. 19 "DSL Data Flow" shows the main data flow in the run time DSL module. In this example embodiment of the runtime analytic module, there are transformations taking place within each of its tiers.

Synapse Monitoring Points produce monitoring track messages received by and collected from sets of distributed edge components, e.g., Monitoring Points monitoring remote users. The Monitoring Points forward Track information to a collection point which provides an access interface for further processing by other server components. The interface can be any of a number of means to pass data from one component to another such as in a track file, shared memory, network, or other means to receive dynamic sets of track data in real time. As tracks are received token instances are created organized and forwarded to the Token Parser. The Token Parser generates events and sends those events to the SequenceEngine creates sequence instances and updates the repartition of the probabilities of being in each state and pre-computed probability models as incoming deterministic events, states and sequences are detected. Furthermore, various kinds of metrics can be in turn produced, calculations made, and forwarded to an External Application, e.g., an Analytical Application that correlates other external kinds of data such as infrastructure data.

Referring to the left side of FIG. 19 "DSL Data Flow," there can be interfaces where user input task definitions or other kinds of application definitions or priorities can be input and then configured into the analytical DSL runtime system. Other kinds of input include application grouping where classification of different kinds of important edge collected data can be made. Complexity reducing kinds of Classifications provide easier-to-use manageable interfaces to manipulate large sets of collected Monitoring Point data.

In embodiments, run-time data is provided by an agent from the block on the lower left labeled "edges." This raw data is converted to tracks (e.g., Session Start, Focus Start, Process Start, Session End, Metric) in the block labeled "Tracks."

In embodiments, the tracks are translated to tokens in the block labeled "Token and deterministic events." This translation is performed, in embodiments by comparing incoming streams of tracks to determined track type combinations and/or sequences. For example, the combination of an Outlook track with an OutlookWeb track indicates that the user ID is processing email, and an Email token may be assigned. In embodiments, an administrator may provide the track type combinations and/or sequences to use in assigning tokens. In embodiments, the track type combinations and/or sequences may be determined automatically based at least in part on one or more parameters.

In embodiments, a set of probabilistic directed networks may be generated and continually or periodically update or aperiodically updated, and/or may be accessed. This is represented by the block labeled "Probabilistic events." The drawing in this block shows two nodes, representing deterministic states, and different network transitions or paths from one state to the next state. Each of these transitions would have a weight indicating a probability that this transition path would be taken to get to the right node or state. In the drawing in this block, three transition paths are show to go from the left state to the right state, each with a probability or weight. In embodiments, electronic resource allocations may be made based at least in part on this information or the transition paths between states. For example, if 80% of user use the middle transition path, as reflected in the weights or probabilities, then the system may automatically shift additional electronic resources to components in this transition path (e.g., additional CPU cycles, faster I/O, more memory). In embodiments, this shift of the electronic resources may be performed at the discretion of an administer. Alternatively, if it is desired to change behavior of the users to motivate them to use a different transition path, then electronic resources may be shifted to this transition path to be favored and/or decreased to another of the transition paths. FIGS. 21 and 22 indicate examples of transition paths.

Note that the probabilistic directed networks may be built up (e.g., the transition paths determined and the potential for a user to use a given transition path) over time but by continuing to record the transitions between states by individual users and/or many users in a system or a subsystem.

FIG. 20 "DSL Components," shows an exemplary application or exemplary component of the Synapse System. It indicates first the use of different data Types to initialize the configuration for the principle tier engines namely, the deterministic Token Parser and the probabilistic Sequence Engine. This may be a configuration instantiation step that reads a set of inputs i.e. various Type Configuration data sets, e.g., Event, State, Sequence, that can be packaged in a variety of ways, e.g., files and databases. In embodiments, this input from the block "Input event, State Sequence type Configurations," comprises creating or receiving, by one or more computers, a language syntax to define at least in part: a plurality of rules for assigning token types to a stream of messages to obtain a stream of contextualized token instances; a plurality of production rules for detecting deterministic event instances from the stream of contextualized token instances; a plurality of state type rules for detecting state type instances, wherein a state type rule comprises one or more deterministic event types with respective probability weights, wherein a probability weight is the likelihood that, detecting the deterministic event type that results in the system, the respective state type is executed; and a plurality of respective pattern rules to define respective Markov chains, with each of the pattern rules comprising a set of state types and transition probability weights between the state types. This input is used in the TokenReader to apply the language syntax to the stream of messages to extract a stream of the contextualized token instances from the stream of messages based at least in part on the language syntax. Then the Token Parser detects, from the stream of the token instances, a stream of the deterministic user event instances, based at least in part on the language syntax.

The Sequence Engine is configured in embodiments to select a plurality of the Markov chains containing one or more of the state type instances that are implied from the stream of messages, based at least in part on the respective probability weights of the state types from the deterministic user event instances that were detected, and computing a probability that the observed system is executing the respective pattern type for each of the respective Markov chains selected.

The method createState&SeqTypes may be invoked and outputs a variety of types, e.g., an Event Type, and a State Type, which in turn is processed into a Sequence Type. In essence, the method createState&SeqTypes converts selected text strings into classifier patterns for use classifying event types and sequence types. In this example subsequently the Event and the Sequence Types are used to set up the engines to be ready for processing input. Configuration of the run time engines (Token Parser and SequenceEngine) are required prior to the first arrival of incoming data.

Discussion will now turn to the processing of generated monitoring data as unprocessed monitor streams (UMS).

A Monitoring Point (e.g., an agent) generates Tracks that are collected by a connected Synapse Server (the Receiver 945 in FIG. 9 "Actuation by Detection Points: Agent & Switch Detectors). The tracks are read by the Token Reader component of FIG. 20. The TokenReader may be one of several Observers in the exemplary system. The TokenReader reads data from the Trackfile that may, in embodiments, be being continually updated remotely from a Monitoring Point. The TokenReader in turn may be observable and observed by other components. Tokens are sent as they arrive to different observers, in particular the Token Parser. As noted, the Token Reader translates selected combinations and/or sequences of tracks into tokens.

As shown, in the exemplary system, the Token Parser may be an observer of the TokenReader. As Tokens are processed from the Monitor Point (agent), the Token Parser processes received Token instances, and compares patterns of tokens to patterns that define deterministic events (obtained from the createState&SeqTypes). When event patterns are recognized, the Token Parser generates Event Instances corresponding/matching those recognized event patterns, and then executes its update function. Generated Event Instances are in turn forwarded to the SequenceEngine, which as an observer of the Token Parser. The SequenceEngine generates Sequence Instances which in turn are based on Sequence States. Several channels are used to communicate output to other components of the Synapse System. For example, Http Post can be used to communicate with various user interfaces or visualization rendering components, e.g., SeqVisualizer, or to other means, e.g., Sequence File, to deliver output data to other components such as the Synapse Server. Input configuration files, whose input follows the DSL specification for each type, define various input Types, e.g., Event, State, and Sequence used to initialize run time patterns and behaviors of the Synapse System. Conditions i.e. regular expressions that define Event detection, are also provided. The Synapse model's State Types, State instances, and different State attributes for example, define whether a State may be an entry or exit point, may be do_something_else, and so on are defined in configuration inputs. Sequence types, in turn, are dependent on the State types. Note that there may be commonality between event, sequence instance and token instances through an sContext. An sContext contains detection details for capturing and processing real time Tracks generated by user or system activity and detected by a Monitor Point Agent or otherwise. The sContext also provides a means for calculating and processing dslMetrics that provide overviews, alerting, and many other management functions for the Synapse System.

The SeqVisualizer is a component used to display but is but not limited to, a variety of graphical representations, metrics, log information, and other calculated values deemed useful for the application of output aspect information from the engines.

In the example system, the main components of the DSL Synapse sub system may be comprised of first of a set of IO components namely a TokenReader that reads input from a Monitoring Point (agent), a SequenceWriter, followed by two main parser engines namely the Token Parser which may be for handling deterministic events and the Sequence Engine which may be for probabilistic event detection. There are several important data types, namely Event, State, and Sequence. Several configuration files provide input from other subsystems, e.g., analytics, user input, event definitions, or state definitions. The Observer Pattern may be the mechanism used to communicate between the main engines or other modules, e.g., the TokenReader via an implemented Observer interface.

Captured by a Monitoring Point, the event's definition may be in its most basic form, EventName=Detected String. A Token Parser detects defined event types set as shown in the "Event Expressions Example" in the first section of the DSL description. The parser inspects incoming tokens using logical expressions to describe categories of tokens generated by a Monitoring Point. For example the line entry "App1_Start=(TRK_WINDOW_TITLE.MESSAGE =="Knoa: Projects");" defines an Event named App1_Start which may be generated when a particular windows GUI object type named TRK_WINDOW_TITLE.MESSAGE" may be captured in a Token. This example shows how different lower level Tokens of the system generate events. This level of event can be mapped to any number of other Track events such that a "compound" event or hierarchy of events that can be defined. For example, a Track message type, e.g., TRK_WINDOW_TITLE can map to an event named WINDOW_TITLE. String expressions (e.g. ˆ at start of a string) can also be used to define a category of related strings contained in Track messages so that matches do not need to be literal or exacting. Therefore, when a track message matches any of this set of defined conditions, e.g., a window title, an event will be generated. Defined events in the event_types configuration file are treated by default with a higher processing priority when a track meets a defined condition. Regarding priority, there can be any number of priorities. In the example given there may be a "default" priority and a "higher" priority which ensures targeted patterns are detected within time constraints.

A component reads Track messages from the input mechanism which may be a Trackfile in the exemplary system. For every Track message in the current loaded set, if it matches an event entry in the loaded event set from the config_event.txt file, then the addToken method will create an "event" instance. A Collection of event types [EventTypesCollection] built from the Config Event types input file, and if an incoming token matches an entry within the Collection, a new event instance will be created. There can be several tokens required prior to adding a single event instance (hence hierarchy) to build more complex event instances. Created event instances are sorted by their priority. Subsequently all subscribed Observers are notified of the new delta event instances where all subscribed Observers would then update their input structure, e.g., trees, lists, etc. The notified Observer in this example, may be the Token Parser. Referring to the Event_Type configuration file, the Event's defining expression i.e. condition defined in the config_event configuration file, may be used to determine an Event (Token) match. The detecting expression, defined in the Event_Type configuration file, may be used to evaluate the event to detect the Event Type. A Token contains specific sContext information included with the newly detected event instances. A method called eventInstance.Update, performs the following: pre existing event instances containing separate sContexts are used to evaluate the current event's sContext. An update operation may be performed only when a match may be found otherwise it executes default handling such as the creation of new sContexts, errors if data may be missing, and so on. If an Event's sContexts are different between different tokens, they are not associated as related Token events. As TokenInstances are forwarded to the update method, Token structures are created. Note the transformation between Events and Tokens may be now taking place as an internal abstracted organization. In other words, Tokens are being generated. Note that Monitor Point generated Tracks are equivalent Tokens in this example application.

Observable may be a class representing an observable object. Observer may be an interface that may be implemented by classes that want to be informed of changes in observable objects. A class can extend/implement one or both class/interface. An "Observer" interface enables the creation of multiple connections to any number of observers for future extension. In the exemplary application, as previously mentioned, Observers are implemented resulting in a TokenReader being connected to the Token Parser, and the Token Parser in turn, may be connected to the SequenceEngine. If a Token Instance is generated, then a Token Filtering mechanism may be used to reduce the token traffic or control incoming token quality for the Token Parser.

Token Parser

The Token Parser may be also an observer of the Token Reader such that when a new token may be detected, the token instance may be sent to the Token Parser via the Update function as an Observer.

The parser parses token instances and produces event instances. Those event instances are sent to all the subscribing observers in adjacent or "upper" tiers. Through this Token to Event processing, the DSL system handles any kind of event types i.e. a collection of event types as defined in the configuration set. For example, if a particular Track received from a Monitoring Point may be detected, e.g., a window title containing a certain string or if it represents an application start, then a Token may be found and after filtering, an instance may be added using an AddToken method.

SequenceEngine

The Sequence Engine handles probabilistic events. Referring to FIG. 20 the Sequence Engine may be an observer that uses an update function to receive generated events from the Token Parser. For all events, if an Scontext matches, every sequence instance will be updated.

The following are Sequence Type definitions stored in a Sequence Type configuration file. The values to the right of the equal sign are State Types //Sequence Types
App 1_New_Writeboard=
  App 1_Start entry
  App 1_Project
  Project_Writeboard entry
  New_Writeboard
  New_Writeboard_Saved exit;
App 2_New_Lead=
  App 2_Login entry
  Noise optional
  App 2_Home
  Noise optional
  App 2_New_Lead
  Noise optional
  App 2_New_Lead_Saved exit;

App 2_Convert_Lead=
  App 2_Login entry
  Noise optional
  App 2_Home
  Noise optional
  App 2_Leads_Home
  Noise optional
  App 2_Edit_Lead
  Noise optional
  App 2_Convert_Lead
  Noise optional
  App 2_Home exit;

The following are example State Type definitions stored in a State Type configuration file. The values to the right of the equal sign are Events defined in the Event Type configuration file plus a probability. All pre configured or evaluated and computed definitions loaded into a Collection on initialization, are used in the construction of the Hidden Markov model at run time.
//STATE>>EVENT+Probability
Noise=WINDOW_TITLE 1.0
App 1_Start=App 1_Start 1.0
App 1_Project=App 1_Project 1.0
Project_Writeboard=Project_Writeboard 1.0
New_Writeboard=New_Writeboard 1.0
New_Writeboard_Saved=New_Writeboard_Saved 1.0
App 2_Start=App 2_Start 1.0
App 2_Login=App 2_Login 1.0
App 2_Home=App 2_Home 1.0
App 2_Leads_Home=App 2_Leads_Home 1.0
App 2_New_Lead=App 2_New_Lead 1.0
App 2_New_Lead_Saved=App 2_Lead 1.0
App 2_Edit_Lead=App 2_Lead 1.0
App 2_Convert_Lead=App 2_Convert_Lead 1.0

When receiving a new event instance here (from Token Parser), Monitoring Point agent session and script session sContexts are extracted from the event instance. For each sContext, there may be an associated collection of sequence instances and sContext Structures containing sContext identifying information such as user or system sessions information provided by Monitoring Points. For example, for a set of users (or different scopes) from one to N, each user has a collection of varying sequences and instances with different assigned probabilities. From incoming Events their sContexts are matched with the correct user and their respective sContexts previously collected.

Considering a single user as an example, with the incoming event instance, any new sequence instances of a given user (e.g. current user sessions) are added through a method, e.g., TaskSequenceInstance in the SequenceEngine. Given the sContext of the current event, a collection of SequenceInstances are retrieved which may be a first level filter of the set of all users. Then all the existing sequence instances are updated with the incoming sequence instances. Different sequence related probabilities and transition probabilities of the sequence are subsequently updated. Furthermore, the following steps are executed as part of the update process: keep only the agent session and script session sContext, update existing sequence instances before creating new sequence instances, create a new sequence instance if the event instance matches the entry point of a sequence type, Normalize probabilities and check if the sequence instance may be completed, and sequence instances statuses with respect to their most likely state probability. All unfinished sequence instances with the same sContext are removed.

Note that Normalizing probabilities may be based on the system's ability to account for non pre-defined states, e.g., do something else states.

In the method TaskSequenceInstance, based on each state as sequence instances are registered and processed, all the different transition probabilities and any initial probabilities, and emission probabilities are created along with new exit, entry, or do_something_else instances. The creation of the sequence instance may be a run time structure that provides handling of detected live events and may be part of the anticipating run time model. Construction of the transition probabilities may be part of the run time instance of the anticipating model.

The resulting run time solution may be that the most likely path can be tracked. Each state, except the exit states, are associated with a "something else" state. The number of states may be counted along with the number of EXIT states. Initial probabilities are calculated and distributed among the ENTRY states. States can have attributes such as ENTRY or EXIT meaning an action results in attributes associated with either an entry (or start) of a defined pattern or an exit of the same pattern.

States have probabilities assigned to them. For example, given a Task of 5 states (or steps), if a Task can be entered from any of two states i.e. the ENTRY states, then there may be a 50% chance that the user could enter through either one of the two states.

Sequence Instance Initialization i.e. creation of a new sequence instance, occurs when a user in real time, executes any ENTRY state, and if the event instance matches the ENTRY point of a defined sequence type, the event instance may be registered and subsequently persistently tracked. For each entry state the initial probabilities are evenly distributed.

Optional States: Extra states are also created to accommodate variations of user behavior as they navigate through different areas of the application, not part of the State model. For each state except exit states also create an inverted state instance i.e. "something else" state. For example if a probability may be 0.2 that state A may be followed by state B, then it's inverse would be 0.8.

An example of an optional state would be that if given 2 states A and B, where sometimes other unaccounted, or random states (C,D, etc.) appear between A and B, then the random states are handled using transition probabilities.
Transition Construction for Initial Instances A Transition Probability may be the probability that one state will follow another. Even random states occuring between a pair of "strongly connected" (high Trans Prob) states will be accommodated since random state transition probabilities are so low. Furthermore, as Optional states are created to handle state variations driven by user actions, the transition probabilities between states are also created as part of the run time hidden markov model via the TaskSequenceInstance method.

An example of the steps of transition construction would be to set the Transitions in a task instance as follows:
  Default transition probabilities
  Transition probability with the previous state
  Transition probabilities with skipped optional states
  Transition probabilities with the "something else" state
  Transition from the current state to the "something else" state
  Transition from the "something else" state to current state
  Transition from the "something else" state to the "something else" state Resulting complexity requires management of run time resources along with other processing scaling strategies know in the art. An example criteria for pruning sequence instances would be to examine sequence probability values, e.g., if a probability is very low for being in a particular sequence, such low probability sequences can be deleted. Note that as described, when a user enters a Task Sequence a new Sequence instance may be created but if later a sequence related Token arrives, a new Sequence will not be created or added.

The Synapse DSL System handles multiple concurrent tasks by maintaining multiple appropriate sContexts. The system updates the state probability (updateStateProbabilities) i.e. the probability of being in a particular state. For an incoming Event, the initial event probability may be generated in reference to a configured Task and a TaskSequence Instance generated. Then for each state emission probabilities (probability of Observations to being in various States) are generated. Probability calculation can be thought of as a vector calculation using emission probabilities to determine the most likely state an event may be in relative to state and task models. This update method can be also used for real time visualization to reflect user activity within sContexts relative to Task sequences. When generating state probabilities, checks are made to limit the number of state probability structures are added and if a threshold of extra states are breached, then the task instance can be a candidate for termination. In other words the user may have entered a task sequence but since executed too many non task sequence actions and hence non relevant events generated; therefore, the task instance should be abandoned and deleted. Finally, the most likely state path from the start of the sequence may be retrieved and the EventInstance may be added to the StateInstance. Normalization calculations are performed to scale the probability calculation for easier consumption or calculation. Checks are made to see if user actions result in sequences being aborted or changed in which case sequence instances are removed. State thresholds used to monitor run time parameters or constraints are also checked to reflect user application activity status.

The DSL System also produces metrics about Task Instances and Sequence execution in run time. On detection of a sequence, or for example, the detection of a completion or incompletion of a task, various states, a do_something_else state, etc. various metrics can be produced based on its internal data structures as part of a DSL self monitoring or functional report system. These DSL outputs can be marshaled, formatted, and sent either to other internal Synapse components such as MERTS, or forwarded (by proxy) to external applications via a Synapse MERT System and or other means. Refer to FIG. 19 "DSL Data FLow" "Synapse MERTS System." Synapse MERTS in turn may forward DSL metrics (refer to the Synapse MERTS discussion in the claimed system description) to an "External Application" such as an infrastructure analytic application as shown in FIG. 19 "DSL Data Flow."

DSL processing also includes specialized functions and operators for dealing with PUCI structures arriving from Monitoring Points as part of its Token, sContext, or Event model. At a DSL processing tier, various functions perform DSL specific processing relevant to an incoming Monitoring Point data or event. A PUCI instance may be detected, further processed, then forwarded to other Synapse tiers or processers such as the Synapse DSL System which handles prediction and anticipation functions. Furthermore, metrics communication directly to outside external components such as a Synapse Centralized Management (Synapse System FIG. 4), may also take place.

In embodiments, a method may comprise a step of determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications. In embodiments, the method may further comprise obtaining or receiving, by the one or more computers, a second rule set comprising a respective priority assigned to respective of the application context IDs and/or user IDs and/or business priorities or combinations of two or more thereof In embodiments, the method may further comprise receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer. In embodiments, the method may further comprise determining, by the one or more computers, respective application context IDs for respective applications and/or respective locations within applications running on the respective user IDs of a second plurality of the user IDs, based at least in part on the first rule set. In embodiments, the method may further comprise generating allocation data and/or prioritization data by the one or more computers, for a respective allocation of electronic resources for the first plurality of the respective user IDs, based at least in part on the second rule set. In embodiments, the allocation may comprise a specific allocation of the electronic resources to a user ID, and/or for an application, and/or for a department, and/or for a sub-system. In embodiments, the prioritization data may comprise a generic designation of priority for a respective user ID, and/or a respective application, and/or a respective department, and/or a respective sub-system, or it may be a relative priority. In embodiments, the priority designation may comprise a designation such as HIGHEST, IMPORTANT, MEDIUM, LOW, or A, B, C, D, or GOLD, SILVER, BRONZE, for example.

In embodiments, the method may further comprise sending signals, by one or more computers, based at least in part on the allocation data and/or the prioritization data. In embodiments, such data may be used to indicate a distribution of a respective level of one or more of the electronic resources to facilitate relative prioritization of applications against a universe of all applications that collectively share the electronic resources.

In embodiments, the method may further comprise wherein the first rule set and the second rule set comprised in a single comprehensive rule set, and the determining or obtaining or receiving a first rule set step and the obtaining or receiving a second rule set step comprised in a single step. In some embodiments, the determining respective application context IDs step and the generating allocation data and/or prioritization data step may be performed in a single step.

In embodiments, method steps may be performed of obtaining a level of the electronic resources currently provided by respective network infrastructure components to a third plurality of the user IDs; obtaining a level of the electronic resources currently being used directly or indirectly by the third plurality of the user IDs; determining, by the one or more computers, difference data based at least in part on a difference between the electronic resources currently available and the electronic resources currently being used; and providing or making accessible, by the one or more computers, this difference data.

In embodiments, the method may further comprise the sending signals step comprising sending signals to automatically distribute dynamically a respective level of one or more of the electronic resources to facilitate user application combinations, with a respective one of the user combinations comprising a respective application context ID and a respective user ID.

In embodiments, the method may further comprise the sending signals step comprising sending signals, by the one or more computers, to a graphical user interface of an administrator display screen, based at least in part on the allocation data, to facilitate decision-making and/or feedback on a dynamic distribution of the electronic resources to facilitate the user ID application and/or task to each of a respective third plurality of the user IDs.

In embodiments, the method may further comprise the run-time data comprising a detected user action and system state change in response to the detected user action for a third plurality of the user IDs and calculating, by the one or more computers, response time data for each of the third plurality of the respective user IDs, the response time data for a respective one of the user IDs based at least in part on the detected user action and system state change in response to the detected user action for the respective user ID. In embodiments, the method may further comprise determining, by the one or more computers, current application response data for each of the third plurality of the user IDs, wherein the current application response data for a respective one of the third plurality of the user IDs comprises performing a calculation on the application response data for all applications used by the respective user ID or for all detected user actions within an application, over a period of time; and comparing, by the one or more computers, the application response data for a respective one of the third plurality of the user IDs to prior application response data for the respective one of the third plurality of the user IDs, and sending and/or making this comparison information accessible. In embodiments, the method may further comprise the signals being sent or made available on the allocation data when selected changes in application response data occur, such as a difference between the current application response data and the prior application response data exceeds a level.

In embodiments, the method may further comprise the second rule set comprising a set of relative priorities for respective of the user IDs based on one or more selected from the group of user role, department, function, geography, and which market served, associated with the respective user ID.

In embodiments, the method may further comprise the second rule set comprising a set of respective applications that are to receive a higher relative priority compared to other of the applications.

In embodiments, the method may further comprise the second rule set comprising a set of relative priorities for user application combinations, with a respective one of the user application combinations comprising a respective application context ID and, optionally, a respective one of the user IDs, so that selected applications performed by respective of the user ID's are provided priority for the electronic resources relative to other of the user IDs.

In embodiments, the method may further comprise the second rule set comprising a set of relative priorities for respective of the user IDs based on a specific task to be carried out by selected ones of the user IDs in a given time frame, In embodiments, the method may further comprise the run-time data being normalized from the run-time instantiations of objects occurring on the monitored computer for the respective user ID, with the objects comprising one or more selected from the group of methods, object events, dynamic GUI objects, wherein the object events and dynamic GUI objects comprise at least one selected from the group of operating system events, application events, and web browser events generated or affecting directly or indirectly the respective monitored computer and network events.

In embodiments, the method may further comprise an agent associated with one of the monitored computers, comprising a set of programming code stored on a computer-readable medium, and configured for executing by the one or more computers, at run-time, performs the step of normalizing the run-time data associated with the respective monitored computer.

In embodiments, the method may further an agent, comprising a set of programming code stored on a computer-readable medium, and configured for executing by the one or more computers, at run-time, wherein the agent performs the steps: monitoring, by the one or more computers, a monitored computer of a respective one of the monitored computers to obtain the run-time data; detecting, by the one or more computers, whether a pattern in the run-time data corresponds to a rule in the first rule set that designates a respective one of the application context IDs; and determining, by the one or more computers, whether a rule in the second rule set applies based at least in part on respective application context ID.

In embodiments, the method may further comprise the agent configured to perform the step of generating and sending, by the one or more computers, actuation requests to change priorities and/or levels for one or more of the electronic resources provided or providable to or associated with the monitored computer which one or more electronic resources are locally controllable by the agent.

In embodiments, the method may further comprise the agent configured to perform the step of generating and sending, by the one or more computers and one or more electronic networks, actuation requests to change priorities and/or levels of the electronic resources provided or providable to monitored computer, to an actuation manager program running on one of the one or more other of the computers, which actuation manager program oversees control of electronic resources outside of control of the respective agent.

In embodiments, the method may further comprise the generating allocation data step comprising: developing, by one or more computers, a matrix of the respective user IDs versus the electronic resources used by the respective user IDs; and allocating, the electronic resources, by one or more computers, change the matrix based at least in part on the second rule set.

In embodiments, the method may further comprise generating and sending or making accessible, by the one or more computers, for an administrator graphical user interface, data for each of a plurality of the user IDs, the data for a respective one of the user IDs providing an indication of a level of the electronic resources allocated to the respective user ID.

In embodiments, the method may further comprise generating and sending or making accessible data, by the one or more computers, for a user graphical user interface for a respective one of the user IDs showing an indication of an electronic resource level allocated to the respective one user ID.

In embodiments, the method may further comprise generating and sending or making accessible data, by the one or more computers, for a user graphical user interface for a respective one of the user IDs an electronic ability to generate and send an electronic resource actuation request and/or a complaint.

In embodiments, the method may further comprise determining, by the one or more computers, a label or other indication for a relative level of importance or priority, based at least in part on the application context ID determined for a respective one of the user IDs; and generating and sending or making accessible, by the one or more computers, data for a user graphical user interface for a respective one of the user IDs, for the label or other indication for the relative importance or priority of current activity, based at least in part on the run-time data, performed by the respective user ID.

In embodiments, the method may further comprise the generating allocation data step comprising generating data to redistribute dynamically, by the one or more computers, the electronic resources allocated to a respective application server that serves a particular one of the applications based at least in part on a number of the user IDs currently accessing the application server and running the particular one application and/or based at least in part on a number of the user IDs currently accessing a different application server.

In embodiments, the method may further comprise generating, by the one or more computers, user ID profile data for each of a third plurality of users, the user ID profile data for a respective one of the third plurality of the user IDs based at least in part on the respective application context IDs detected from the run-time data for the respective one user ID aggregated over a period of time; and making this user ID profile data accessible electronically, by the one or more computers.

In embodiments, the method may further comprise the generating allocation data step further comprising determining a relative allocation level for two or more of the electronic resources selected from the group of CPU cycle allocation, disk input/output bandwidth allocation and memory allocation, to obtain a level of application performance; and generating adjustments in the allocation levels of the electronic resources, by the one or more computers, to optimize overall performance of a respective one of the monitored computers.

In embodiments, the method may further comprise sending, by the one or more computers, the allocation data to a plurality of nested-sub-controllers that each control an allocation of the electronic resources to a different respective infrastructure electronic component.

In embodiments, the method may further comprise detecting, by the one or more computers, a pattern comprising one or more selected from the group of an application, a combination of applications, and a combination of an application used by a specified one of the user IDs; determining a prediction rule for the determined pattern, by the one or more computers, from a prediction rule set, wherein the respective prediction rule in the prediction rule set is based at least in part on a past history of usage of the electronic resources when the pattern is detected; determining, by the one or more computers, a prediction of electronic resources that may be used at a future time or during a window of time when the pattern is detected based at least in part on the prediction rule set; and using the prediction of electronic resources, by the one or more computers, in one selected from the group of generating of the allocation data for the electronic resources and providing data or making the data accessible electronically that indicates a need for additional electronic resources.

In embodiments, the method may further comprise use of the prediction of electronic resources in generating the allocation data or providing of the data indicating a need for additional electronic resources only when a predicted level of electronic resources exceeds a current level of the electronic resources or exceeds the current level of the electronic resources by an amount that is predetermined or may change dynamically or n=may be set periodically or aperiodically.

In embodiments, the method may further comprise generating by agents the allocation data taking into account at least in part the prediction of electronic resources to increase or to decrease a level of the electronic resources allocated to be allocated, wherein a respective one of the agents comprises a set of programming code stored on a computer-readable medium, configured for executing at run-time, on a monitored infrastructure component.

In embodiments, the method may further comprise aggregating, by the one or more computers, predictions of electronic resources that may be used at the future time or in the window of time, for shared electronic resource pools, to obtain a predicted shared resource total; and generating and sending or making accessible, by the one or more computers, data for an administrator graphical user interface showing an indication of electronic resource needs based at least in part on the predicted shared resource totals.

In embodiments, the method may further comprise accessing, by the one or more computers, memory storing correlations from a past history of user ID interactions with applications correlated with electronic resource usage over time associated with use of the respective applications or application patterns; and generating, by the one or more computers, the prediction rule set from these correlations, by the one or more computers, for detected applications based on one or more parameters, wherein a respective one of the rules in the prediction rule set comprises a predicted level of one or more of the electronic resources when a respective application or application pattern is detected.

In embodiments, the method may further filtering out, by the one or more computers, data that does not correspond to a pattern of run-time data corresponding a rule in the first rule set.

In embodiments, the method may further comprise the filtering step being performed by agents, wherein a respective one of the agents comprises a set of programming code stored on a computer-readable medium, configured for executing at run-time, on a monitored infrastructure component.

In embodiments, the method may further comprise controlling, by the one or more computers, software agents disposed to monitor a plurality of virtual machines, to distribute over time the run-time data from the plurality of the virtual machines so that times for receipt of the run-time data from the different respective virtual machines is distributed over time.

In embodiments, the method may further comprise setting, using the one or more computers, a respective resource cap or caps for one or more of the electronic resources, to be allocated to respective ones of the monitored electronic computers or systems. In embodiments, the method may further comprise obtaining a level of the electronic resources currently being used directly or indirectly by one or more of the monitored computers or systems, and changing, using the one or more computers, one or more of the caps, based at least in part on the level of the electronic resources currently being used directly or indirectly by the one or more of the monitored computers or systems.

In embodiments, the method may further comprise generating one or more rules of the first rule set and/or the second rule set and/or a single comprehensive rule set that comprises a combination of the first and the second rule sets by identifying, by the one or more computers, respective identification strings in the run-time data. In embodiments, the strings may be generated by an agent using its sensors that detect the presence of objects on the user computer (e.g., windows, webpages, processes). In embodiments, the strings may be placed into prefix trees. Elements in one or more of the identification strings may then be reordered, by the one or more computers, based at least in part on one or more rules in a tokenizing rule set, to obtain reordered identification strings. Then the operation is performed of sorting the reordered identification strings to create hierarchal groups of adjacent (at the same level in the hierarchy) related strings.

In embodiments, data representing the hierarchical groups of adjacent related strings may be displayed to a user. In embodiments, the user may be provided on the interface with an electronic ability to select activities represented by strings that are of interest, for example, by placing a check mark or entering a descriptive name next to the data representing the string. In embodiments, a first rule may be created to provide an application context ID for this selected string. In embodiments, the user may be provided on the interface with an electronic ability to select a priority for strings, for example, by a pull-down menu next to the data representing the string. In embodiments, the user may provide a level of priority, e.g., gold, silver, bronze, or low, medium, high. For example, see FIG. 13, which displays a user interface with several rows of strings that are subgroups of the *intranet/* group of strings. Clicking on *intranet/projects/* would display the sub-groups of the *intranet/projects/* group. The row containing *intranet/qa/computers.asp displays some details expanded where priority may the set by clicking the pull-down menu in the priority column. The current priority is listed as "low," the lowest level of priority.

In embodiments, certain of the strings' contents may be reordered based at least on a predetermined or a dynamic tokenizing rule set.

Such embodiments provide a way, such as the Apriori algorithm, to find repeated patterns in the strings of run-time data, and then reorder the text within the strings. For example, strings may be detected in the run-time data of a customer name, followed by an edit account, followed by a designation of an application titled Customer Management. Another string might have a different customer name, followed by a close account, followed by the designation for the application titled Customer Management. Another string might have a different customer name, followed by a payment received, followed by the designation for the application titled Customer Management. The repeated pattern in the strings of Customer Management is common to these strings. The string's contents may then be reordered to begin with "Customer Management," followed by the action (e.g., edit, or close, or payment received), followed by the customer name. In embodiments, the contents of the strings may be reordered according to rules to move the most general portions to the left and the most detailed portions toward the right end. In embodiments, the reordered strings may be stored in a prefix tree (or any variations like a patricia trie). Thus, in embodiments the reordered strings are placed in a hierarchy structure, and in embodiments, duplicate strings removed, to thereby reduce memory requirements. In embodiments, the tree algorithm may be used to alphabetize the strings at each level in the tree.

In embodiments, the user may designate selected reordered identification strings shown on a screen as application context IDs of interest. In embodiments, the user may designate the priority level for selected of the reordered identification strings.

In embodiments, initial groupings of strings may be performed automatically based at least in part on a detection within multiple of the strings of an application name, e.g., Customer Management, or certain text in a Windows title detected frequently, or a particular mail group, to name a few.

In embodiments, a rule in at least one selected from the group of the first rule set and the second rule set and the single comprehensive rule set, may be generated, based at least in part on the selected one or more of the reordered identification strings.

In embodiments, the method may further comprise operations of identifying, by the one or more computers, respective identification strings in the run-time data; hierarchically grouping, by the one or more computers, the identification strings using a hierarchy algorithm; generating presentation data, by the one or more computers; and sending or making accessible the presentation data, by the one or more computers, for selection of certain of the identification strings for use in generating one or more rules for the first rule set and/or for the second rule set and/or for a single comprehensive rule set that comprises a combination of the first and the second rule sets.

In embodiments, the method may further comprise determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications; receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer; and determining, by the one or more computers, respective application context IDs for applications and/or respective locations within applications running on the respective user IDs of a second plurality of the user IDs, based at least in part on the first rule set. In embodiments, the method may further comprise detecting, by the one or more computers, a pattern comprising one or more selected from the group of an application, a combination of applications, and a combination of an application used by a specified one of the user IDs. In embodiments, the method may further comprise determining a prediction rule for the determined pattern, by the one or more computers, from a prediction rule set, wherein the respective prediction rule in the prediction rule set is based at least in part on a past history of usage of the electronic resources when the pattern is detected. In embodiments, the method may further comprise determining, by the one or more computers, prediction data for of electronic resources that may be used at a future time or during a window of time when the pattern is detected based at least in part on the prediction rule set; and using the prediction data for electronic resources, by the one or more computers, in one selected from the group of generating of the allocation data for the electronic resources and providing data or making the data accessible electronically that indicates a need for additional electronic resources.

In embodiments, the method may further comprise an agent, comprising a set of programming code stored on a computer-readable medium, configured for executing by the one or more computers, at run-time, wherein the agent performs the steps: monitoring, by the one or more computers, a monitored computer of a respective one of the user IDs to obtain the run-time data; and detecting, by the one or more computers, whether a pattern determined from the run-time data corresponds to a prediction rule in the prediction rule set.

In embodiments, the method may further comprise the agent further performing the step of generating and sending, by the one or more computers, an actuation request to provide to modify one or more of the electronic resources provided or providable to or associated with the monitored computer which one or more electronic resources are locally controllable by the agent.

In embodiments, the method may further comprise the agent configured to perform the step of generating and sending, by the one or more computers and one or more electronic networks, an actuation request to change a level of the electronic resources provided or providable to a respective monitored computer, to an actuation manager program running on one of the one or more other of the computers, which actuation manager program oversees control of electronic resources outside of control of the respective agent.

In embodiments, the method may further comprise receiving or obtaining, by the one or more computers, slowdown data indicating a slow down of a first one of the monitored computers. In embodiments, the method may further comprise the prediction data for electronic resources including resource shift data, and further comprising generating, by the one or more computers, the allocation data to increase the electronic resources to the first monitored computer and to decrease the electronic resources to one or more other of the monitored computers on a temporary basis and then to return the electronic resources to those monitored computers to previous levels.

In embodiments, the method may further comprise receiving or obtaining, by the one or more computers, slowdown data indicating a slow down of a first one of the monitored computers; determining, by the one or more computers, a resource shift rule applicable at a time of receiving or obtaining the slowdown data, the resource shift rule for taking electronic resources from one or more other monitored computers, the resource shift rule comprising a shift pattern comprising one or more selected from the group of a time of day, a day of the month, a company department, an application, wherein the respective resource shift rule in the resource shift rule set is based at least in part on a past history of usage of the electronic resources when the shift pattern is detected; determining, by the one or more computers, using the resource shift rule the one or more other of the monitored computers from which to take the electronic resources; and generating automatically allocation data, by the one or more computers, for shifting additional of the electronic resources to the first monitored computer, to be taken at least in part from the one or more other monitored computers only on a temporary basis and then returning the electronic resources allocated to the first monitored computer and the other monitored computers to previous levels before the shifting.

In embodiments, the method may further comprise monitoring, by one or more computers, a plurality of monitored computers; and detecting from a plurality of the monitored computers, by the one or more computers, respective data patterns, with each data pattern comprising one or more selected from the group of an application context ID, a combination of application context IDs, and a combination of an application used by a specified user ID, wherein the generating automatically allocation data for shifting additional electronic resources is performed only when predetermined data patterns from the plurality of the data patterns are detected.

In embodiments, a method, system and program product are disclosed to generate a next predicted prioritization data for electronic resources for the observed system and/or a predicted level of electronic resources that may be needed by the system generating the messages. The method may comprise, in embodiments, creating or receiving, by one or more computers, a language syntax.

In embodiments, the language syntax may be comprised, at least in part of a plurality of rules for assigning token types to a stream of messages to obtain a stream of contextualized token instances.

In embodiments, token instances may be contextualized, e.g., issued for streams of messages in a particular context. Note that in embodiments, as an example, a contextualized token may be issued for detection of a send button click while in the context of an Outlook windows state.

In embodiments, the language syntax may be comprised of a plurality of production rules for detecting deterministic event instances from the stream of contextualized token instances.

In embodiments, the language syntax may be comprised of a plurality of state type rules for detecting state type instances, wherein a state type rule comprises one or more deterministic event types with respective probability weights, wherein a probability weight is the likelihood that, detecting the deterministic event type that results in the system, the respective state type is executed.

In embodiments, the language syntax may be comprised a plurality of respective pattern rules (Sequence Types) to define respective Markov chains, with each of the pattern rules comprising a set of state types and transition probability weights between the state types.

The creation of a language syntax to defines types that serve as classifiers for tokens within a message. In essence, a language may be provided to declaratively capture useful information from a stream of data.

In embodiments, the method may comprise receiving or obtaining or being presented, by the one or more computers, with the run-time data comprising a stream of messages for systems of a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer.

In embodiments, the method may further comprise parsing, by the one or more computers, to apply the language syntax to the stream of messages to extract a stream of the contextualized token instances from the stream of messages based at least in part on the language syntax.

In embodiments, the method may further comprise detecting, by the one or more computers, from the stream of the token instances, a stream of the deterministic user event instances, based at least in part on the language syntax. For example, detecting that a send button has been pressed, e.g., a deterministic user event instance, in the context of an Outlook state for the system, has a probability of going to a send state.

In some embodiments, the observed deterministic user event instances imply one or more states with differing probability weights. The probabilistic sequence of states can then be compared to the available list of Markov chain definitions (and their sequence of states) and a new probability of each Markov chain being the actual observed sequence calculated. If a 'most likely' sequence emerges, this can then be used to predict the next system state.

In embodiments, the method may further comprise selecting, by the one or more computers, a plurality of the Markov chains or sequence or patent instances containing one or more of the state type instances with probability weights that are implied from the stream of messages, e.g., based at least in part on the respective probability weights of the state types from the deterministic user event instances that were detected.

In embodiments, the method may further comprise computing, by the one or more computers, a probability that the observed system is executing the respective pattern type for each of the respective Markov chains selected.

In embodiments, the method may further comprise determining, by the one or more computers, based at least in part on one or more of the selected Markov chains and next state transitions in the respective Markov chains selected and/or one or more of predicted states in the respective Markov chains selected, predicted prioritization data for electronic resources for the observed system and/or a predicted level of electronic resources that may be needed by the system generating the messages.

In embodiments, a further step may be performed of evaluating, by the one or more computers, whether to remove one of the Markov chains that was selected and/or to add at least one new pattern rule to define a new Markov chain, based on a subsequently identified state type instance, where a pattern rule for a respective one of the Markov chains need not include every observed state type instance to remain in the plurality of the Markov chains selected. In embodiments, the operation may be performed off-line in a machine learning process. In embodiments, the operation may be performed in a machine learning process during the evaluation process.

In embodiments, the method may further comprise updating, by the one or more computers, the transition probability weights for one or more of the Markov chains, based at least in part on the occurrence of one or more of the identified deterministic event instances. In embodiments, the operation may be performed off-line in a machine learning process. In embodiments, the operation may be performed in a machine learning process during the evaluation process.

In embodiments, the method may further comprise accessing, by the one or more computers, a database containing a plurality of the respective Markov chains; and associating, by the one or more computers, a priority and/or a level of electronic resources to be allocated for the Markov chain that was selected.

In embodiments, the method may further comprise the determining step determining a predicted level of electronic resources that may be needed by the system generating the messages, and generating data, by the one or more computers, for display based at least in part on the predicted level of electronic resources for the system generating the messages.

In embodiments, the method may further comprise the determining step determining a predicted level of electronic resources that may be needed by the system generating the messages, and generating data, by the one or more computers, to adjust available electronic resources in the system generating the messages, based at least in part on the predicted level of electronic resources for the system generating the messages.

In embodiments, the method may further comprise receiving or obtaining, by the one or more computers, a ranking rule set for ranking applications and/or user IDs; generating ranking data providing a ranking of a plurality of the user IDs, by the one or more computers, based at least in part on the ranking rule set; and sending or making accessible, by the one or more computers, the ranking data.

In embodiments, the method may further comprise generating, by the one or more computers, based at least in part on the ranking data for a second plurality of the systems of user IDs, a predicted level of electronic resources that may be needed by the second plurality of the systems of user IDs. In embodiments, the method may further comprise obtaining, by the one or more computers, a level of electronic resources allocated to the second plurality of the systems of the user IDs; comparing, by the one or more computers, the level of electronic resources allocated to the second plurality of the systems of the user IDs with the predicted level of the electronic resources that may be needed by a second plurality of the systems of user IDs to obtain comparison data; and generating and sending or making accessible electronic resource change data, by the one or more computers, based at least in part on the comparison data.

In embodiments, the system may be communicatively coupled to one or more networks via a communication interface. The one or more networks may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface may be implemented accordingly. The network serves the purpose of delivering information between connected parties.

In embodiments, the Internet may comprise the network. The system may also or alternatively be communicatively coupled to a network comprising a closed network (e.g., an intranet). The system may be configured to communicate, via the one or more networks, with respective computer systems of multiple entities.

The system may comprise, in embodiments, a computing platform for performing, controlling, and/or initiating computer-implemented operations, for example, via a server and the one or more networks. The computing platform may comprise system computers and other party computers. The system may operate under the control of computer-executable instructions to carry out the process steps described herein. Computer-executable instructions comprise, for example, instructions and data which cause a general or special purpose computer system or processing device to perform a certain function or group of functions. Computer software for the system may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system may comprise one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few.

Embodiments include program products comprising machine-readable media with machine-executable instructions or data structures stored thereon. Such machine-readable media may be any available storage media which can be accessed by a general purpose or special purpose computer or other machine with a processor. By way of example, such machine-readable storage media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced with one or multiple computers in a networked environment using logical connections to one or more remote computers (including mobile devices) having processors. Logical connections may include the previously noted local area network (LAN) and a wide area network (WAN) that are presented here by way of example and not limitation. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form further embodiments with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method comprising:

determining or obtaining or receiving, by one or more computers, a first rule set comprising a plurality of patterns of run-time data used to distinguish among a plurality of applications and/or locations within applications running on monitored computers associated with respective user IDs and to provide respective application context IDs that designate respective applications incorporating application locations within applications;

receiving or obtaining or being presented, by the one or more computers, with run-time data for a first plurality of the user IDs, wherein the runtime data for a respective one of the user IDs comprises and/or is derived from run-time instantiations of objects occurring on the monitored computer for the respective user ID, with the objects comprising one or more selected from the group of methods, system objects, object events, dynamic GUI objects, network component objects, wherein the object events comprise at least one selected from the group of operating system events, application events, and web browser events and network events generated or affecting directly or indirectly the respective monitored computer;

determining, by the one or more computers, respective application context IDs for applications and/or respective locations within applications running on the respective user IDs of a second plurality of the user IDs, based at least in part on the first rule set;

detecting, by the one or more computers, a pattern comprising one or more selected from the group of an application, a combination of applications, and a combination of an application used by a specified one of the user IDs;

determining a prediction rule for the determined pattern, by the one or more computers, from a prediction rule set, wherein the respective prediction rule in the prediction rule set is based at least in part on a past history of usage of the electronic resources when the pattern is detected;

determining, by the one or more computers, prediction data for of electronic resources that may be used at a future time or during a window of time when the pattern is detected based at least in part on the prediction rule set; and using the prediction data for electronic resources, by the one or more computers, in one selected from the group of generating of the allocation data for the electronic resources and providing data or making the data accessible electronically that indicates a need for additional electronic resources.

2. The method as defined in claim 1, wherein an agent, comprising a set of programming code stored on a non-transitory computer-readable medium, configured for executing by the one or more computers, at run-time, wherein the agent performs the steps: monitoring, by the one or more computers, a monitored computer of a respective one of the user IDs to obtain the run-time data; and detecting, by the one or more computers, whether a pattern determined from the run-time data corresponds to a prediction rule in the prediction rule set.

3. The method as defined in claim 2, wherein the agent further performs the step:

generating and sending, by the one or more computers, actuation requests to change selected priorities or levels of the electronic resources provided or providable to or associated with the monitored computer which one or more electronic resources are locally controllable by the agent.

4. The method as defined in claim 2, wherein the agent further performs the step:

generating and sending, by the one or more computers and one or more electronic networks, actuation requests to change selected priorities or levels of the electronic resources provided or providable to a respective monitored computer, to an actuation manager program running on one of the one or more other of the computers, which actuation manager program oversees control of electronic resources outside of control of the respective agent.

5. The method as defined in claim 1, receiving or obtaining, by the one or more computers, slowdown data indicating a slow down of a first one of the monitored computers;

wherein the prediction data for electronic resources further includes resource shift data, and further comprising generating, by the one or more computers, the allocation data to increase the electronic resources to the first monitored computer and to decrease the electronic resources to one or more other of the monitored computers on a temporary basis and then to return the electronic resources to those monitored computers to previous levels.

* * * * *